US010851877B2

(12) United States Patent
Sanders et al.

(10) Patent No.: US 10,851,877 B2
(45) Date of Patent: *Dec. 1, 2020

(54) POWER DELIVERY DEVICES FOR RECIPROCATING ENGINES, PUMPS, AND COMPRESSORS, AND RELATED SYSTEMS AND METHODS

(71) Applicant: Enfield Engine Company, LLC, Enfield, NH (US)

(72) Inventors: Nicholas A. Sanders, Enfield, NH (US); Ryan Thomas Kiley Sanders, Enfield, NH (US)

(73) Assignee: Enfield Engine Company, LLC, Enfield, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/537,406

(22) Filed: Aug. 9, 2019

(65) Prior Publication Data
US 2019/0360560 A1    Nov. 28, 2019

Related U.S. Application Data

(63) Continuation-in-part of application No. 15/356,171, filed on Nov. 18, 2016, now Pat. No. 10,436,296, (Continued)

(51) Int. Cl.
*F16H 19/02* (2006.01)
*F04B 9/04* (2006.01)
(Continued)

(52) U.S. Cl.
CPC .............. *F16H 19/02* (2013.01); *F01B 9/04* (2013.01); *F02B 75/042* (2013.01); *F02B 75/20* (2013.01);
(Continued)

(58) Field of Classification Search
CPC .... F01B 9/04; F01B 9/047; F01B 1/08; F01B 2009/045; F02B 75/042; F02B 75/20;
(Continued)

(56) References Cited

U.S. PATENT DOCUMENTS 1,056,746 A    3/1913  Pitts
1,090,647 A    3/1914  Pitts
(Continued)

FOREIGN PATENT DOCUMENTS

BE    1006128 A3    5/1994
CN    1800609 A     7/2006
(Continued)

OTHER PUBLICATIONS

International Search Report and Written Opinion of the International Searching Authority issued from Korean Intellectual Property Office for related International Application No. PCT/US2014/040722, dated Sep. 23, 2014. 12 pages.
(Continued)

*Primary Examiner* — Hung Q Nguyen
*Assistant Examiner* — Ruben Picon-Feliciano
(74) *Attorney, Agent, or Firm* — Proskauer Rose LLP

(57) ABSTRACT

In some aspects, reciprocating engines can include a first reciprocating mechanism that includes an axially translating y-axis component configured to reciprocate substantially along a y-axis with a reciprocating motion of a piston assembly relative to a base to which the y-axis component is slidingly attached. The first reciprocating mechanism can include an x-axis component slidingly coupled to and translating with the y-axis component along the y-axis, the x-axis component being: i) configured to reciprocate substantially perpendicularly to the y-axis relative to the y-axis component, ii) comprising an orbital output component, and iii) comprising an orbital linking component disposed substan-
(Continued)

tially concentric with the orbital output component. The first reciprocating mechanism can include a stationary output component and a stationary linking component that are substantially concentric and disposed in a direction that is substantially perpendicular to the x-y plane.

23 Claims, 40 Drawing Sheets

Related U.S. Application Data which is a continuation of application No. 15/231,322, filed on Aug. 8, 2016, now Pat. No. 9,958,041, which is a continuation-in-part of application No. 14/294,977, filed on Jun. 3, 2014, now Pat. No. 9,410,477.

(60) Provisional application No. 61/830,456, filed on Jun. 3, 2013, provisional application No. 62/717,551, filed on Aug. 10, 2018, provisional application No. 62/871,044, filed on Jul. 5, 2019.

(51) Int. Cl.
| | | |
|---|---|---|
| *F02B 75/20* | (2006.01) | |
| *F04B 53/16* | (2006.01) | |
| *F04B 53/14* | (2006.01) | |
| *F04B 35/01* | (2006.01) | |
| *F02B 75/04* | (2006.01) | |
| *F02B 75/40* | (2006.01) | |
| *F02B 75/32* | (2006.01) | |
| *F04B 9/02* | (2006.01) | |
| *F01B 9/04* | (2006.01) | |
| *F04B 19/22* | (2006.01) | |
| *F16C 3/06* | (2006.01) | |

(52) U.S. Cl.
CPC ............. *F02B 75/32* (2013.01); *F02B 75/40* (2013.01); *F04B 9/02* (2013.01); *F04B 9/045* (2013.01); *F04B 19/22* (2013.01); *F04B 35/01* (2013.01); *F04B 53/14* (2013.01); *F04B 53/16* (2013.01); *F01B 9/047* (2013.01); *F16C 3/06* (2013.01)

(58) Field of Classification Search
CPC .......... F02B 75/32; F02B 75/40; F02B 75/24; F04B 19/22; F04B 35/01; F04B 53/14; F04B 53/16; F04B 9/02; F04B 9/045; F04B 1/0538; F04B 27/0538; F04B 39/0022; F04B 53/144; F16C 3/06; F16C 9/02; F16H 19/02
See application file for complete search history.

(56) References Cited

U.S. PATENT DOCUMENTS

| | | | |
|---|---|---|---|
| 3,886,805 | A | 6/1975 | Koderman |
| 4,013,048 | A | 3/1977 | Reitz |
| 4,433,649 | A | 2/1984 | Shin |
| 5,067,456 | A | 11/1991 | Beachley et al. |
| 5,178,038 | A | 1/1993 | Heniges |
| 5,528,946 | A | 6/1996 | Yadegar |
| 5,873,339 | A | 2/1999 | Isogai |
| 5,934,243 | A | 8/1999 | Kopystanski |
| 6,510,831 | B2 | 1/2003 | Wiseman |
| 9,316,249 | B2 | 4/2016 | Yoshizawa et al. |
| 9,958,041 | B2* | 5/2018 | Sanders ................ F02B 75/32 |
| 10,138,807 | B2 | 11/2018 | Yoshizawa et al. |
| 10,436,296 | B2* | 10/2019 | Sanders .................. F01B 9/04 |
| 2002/0185101 | A1 | 12/2002 | Shaw |
| 2005/0217618 | A1 | 10/2005 | Watanabe et al. |
| 2006/0005793 | A1 | 1/2006 | Ward |
| 2006/0207358 | A1 | 9/2006 | Tung |
| 2008/0223320 | A1 | 9/2008 | Chepettchouk |
| 2009/0272259 | A1* | 11/2009 | Cook ...................... F02B 75/22 92/140 |
| 2010/0031916 | A1 | 2/2010 | Wiseman |
| 2010/0109343 | A1 | 5/2010 | Lemke et al. |
| 2011/0107998 | A1 | 5/2011 | Xiong et al. |
| 2011/0138939 | A1 | 6/2011 | Carr |
| 2012/0312273 | A1 | 12/2012 | Weverka |
| 2013/0186365 | A1 | 7/2013 | Laimboeck |

FOREIGN PATENT DOCUMENTS

| | | |
|---|---|---|
| CN | 1928337 A | 3/2007 |
| CN | 100419234 C | 9/2008 |
| DE | 348020 C | 2/1922 |
| FR | 2927122 A1 | 8/2009 |
| WO | 03087556 A1 | 10/2003 |
| WO | 2004072441 A1 | 8/2004 |
| WO | 2008124816 A1 | 10/2008 |
| WO | 2009120715 A1 | 10/2009 |

OTHER PUBLICATIONS

"Power Delivery Devices for Reciprocating Engines and Related Systems and Methods", Specification, Drawings, and Prosecution History of U.S. Appl. No. 14/294,977, filed Jun. 3, 2014, by Nicholas Sanders.

Shelley, "Planetary gears do away with side forces", Tom Shelley, web address: http://www.shelleys.demon.co.uk/faug04ge.htm, available on online as early as Aug. 7, 2016.

Shelley, "Planetary gears do away with side forces", Eureka Magazine, Tom Shelley, web address: http://www.eurekamagazine.co.uk/design-engineering-features/technology/planetary-gears-do-away-with-side-forces/2773/, published: Aug. 9, 2004.

YouTube Video, titled "Short Stroke Reciprocating Mechanism", purportedly uploaded by user "mekanizmalar" on May 5, 2013, web address: https://www.youtube.com/watch?v=6ACFhNJT2Hs. Screenshot provided (taken on Aug. 22, 2016).

YouTube Video, titled "Super-Efficient Engine (Inventor: Genaro Tabag)", purportedly uploaded by user "Genaro Tabag" on Jul. 28, 2012, web address: https://www.youtube.com/watch?v=PmtWuOzFC98. Screenshot provided (taken on Aug. 22, 2016).

YouTube Video, titled "Major Engine Problems Solved by the Francis Daimler Tabag Engine", purportedly uploaded by user "Genaro Tabag" on Sep. 28, 2012, web address: https://www.youtube.com/watch?v=2Sj9GWs_Bm4. Screenshot provided (taken on Aug. 22, 2016).

Kinematic Models for Design Digital Library: UK032, "Model: UK032 Hypocycloid Two-gear Straight-line Mechanism." Web address: http://kmoddl.library.cornell.edu/model.php?m=346, available on online as early as Aug. 7, 2016.

Kinematic Models for Design Digital Library: S16, "Model: S16 Hypocycloid Straight-line Mechanism." Web address: http://kmoddl.library.cornell.edu/model.php?m=137&movie=hide, available on online as early as Aug. 7, 2016.

"Power Delivery Devices for Reciprocating Engines and Related Systems and Methods", Specification, Drawings, and Prosecution History of U.S. Appl. No. 15/231,322, filed Aug. 8, 2016, by Sanders et al.

International Search Report and Written Opinion of the International Searching Authority issued from Korean Intellectual Property Office for related International Application No. PCT/US2016/046033, dated May 4, 2017. 12 pages.

Yoshizawa, T., et al., "Development of a Mechanism for a Higher Efficiency Compressor Using an Orthogonal Double-Slider Joint," The 2nd IFToMM Asian Conference on Mechanism and Machine Science, Nov. 7-10, 2012, Tokyo, Japan, 7 pages.

(56) References Cited

OTHER PUBLICATIONS

Yoshizawa, T., et al., "Experimental analysis of a water-pump driving mechanism using an orthogonal double-slider joint," Mechanical Engineering Journal, vol. 3, No. 1, 2016, 12 pages.

* cited by examiner

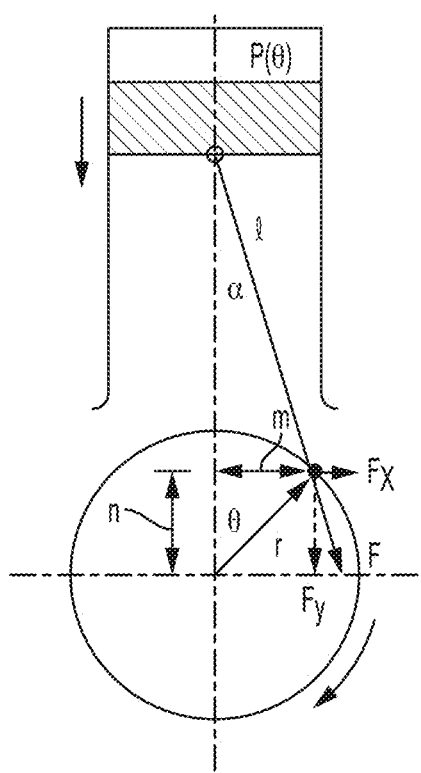
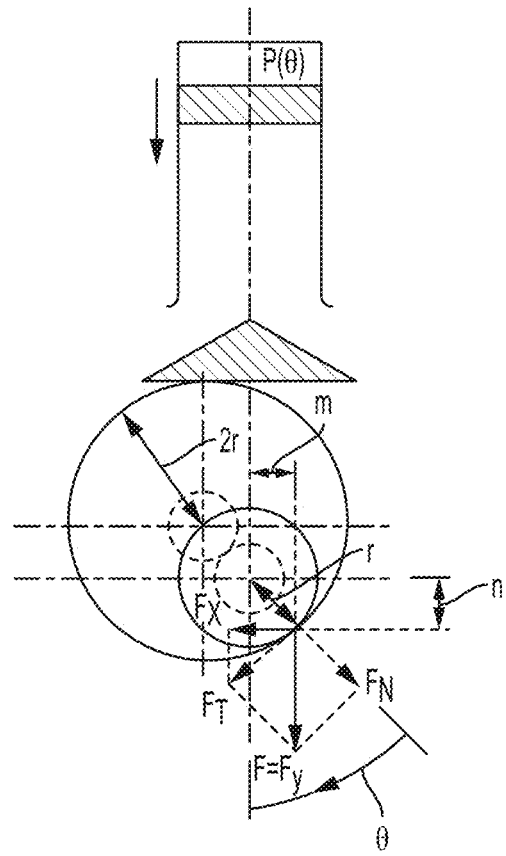
FIG. 11
FIG. 12

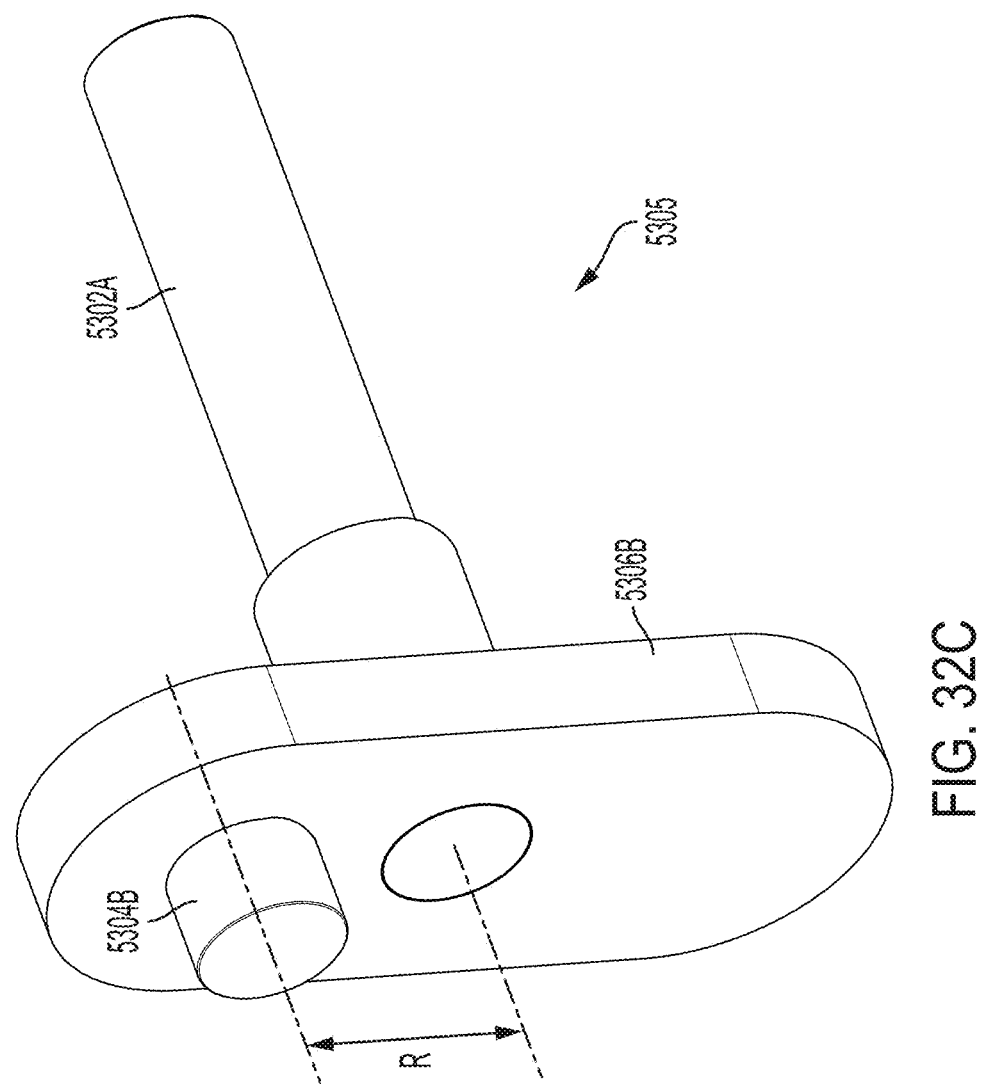

POWER DELIVERY DEVICES FOR RECIPROCATING ENGINES, PUMPS, AND COMPRESSORS, AND RELATED SYSTEMS AND METHODS

RELATED APPLICATIONS

This application claims the benefit of and is a continuation-in-part of U.S. patent application Ser. No. 15/356,171 filed Nov. 18, 2016, entitled "Power Delivery Devices for Reciprocating Engines and Related Systems and Methods," which is a continuation of U.S. patent application Ser. No. 15/231,322 filed Aug. 8, 2016, entitled "Power Delivery Devices for Reciprocating Engines and Related Systems and Methods," which is a continuation-in-part of U.S. patent application Ser. No. 14/294,977 filed Jun. 3, 2014, entitled "Power Delivery Devices for Reciprocating Engines and Related Systems and Methods," which claims the benefit of U.S. Provisional Patent Application Ser. No. 61/830,456 filed Jun. 3, 2013, entitled "Power Delivery Devices for Reciprocating Engines and Related Systems and Methods," the contents of each which are hereby incorporated herein by reference in their entirety. This application also claims the benefit of U.S. Provisional Patent Application Ser. No. 62/717,551 filed Aug. 10, 2018, entitled "Power Delivery Devices for Reciprocating Engines and Related Systems and Methods" and U.S. Patent Application Ser. No. 62/871,044 filed Jul. 5, 2019, entitled "Power Delivery Devices for Reciprocating Engines, Pumps, and Compressors, and Related Systems and Methods," the contents of each of which are hereby incorporated herein by reference in their entirety.

TECHNICAL FIELD

This disclosure generally relates to reciprocating engines, pumps, compressors, and more particularly to power delivery devices for reciprocating engines, pumps, and compressors, and to related systems and methods.

BACKGROUND

A reciprocating engine generally uses a crankshaft to convert the linear reciprocating motion of one or more pistons translating within cylinders into the rotational motion of the crankshaft and vice versa. For example, the internal combustion engine (IC engine) is the most common type of reciprocating engine. Reciprocating engines are generally used to convert the chemical energy released during the combustion of various fuels (such as gasoline) or thermal energy (such as energy derived from steam) into kinetic energy (e.g., mechanical rotating motion), which can be more readily usable to move things (e.g., propel objects). The crankshaft of a reciprocating engine is typically the engine element that is connected to output devices used to move various devices or vehicles, such as automobiles, generators, trucks, airplanes, welders, ships, bulldozers, motorcycles, boats, etc.

One challenge with power delivery devices generally has been to maximize the amount of usable power that is able to be extracted from the device. This is true for reciprocating engines (e.g., internal combustion engines) along with other types of engines. Traditional power delivery devices are not necessarily capable of optimal power delivery due to constraints that are often a result of the way the power delivery device itself is constructed. Especially where industries in which power delivery devices are used become increasingly focused on minimizing energy consumption where possible, there is a need for more efficient power delivery devices, including those from which power can be more effectively extracted from the device as compared to traditional, previously-available devices.

SUMMARY

In some aspects, a reciprocating engine can include a first reciprocating mechanism. The first reciprocating mechanism can include an axially translating y-axis component configured to reciprocate substantially along a y-axis with a reciprocating motion of a piston assembly relative to a base to which the y-axis component is slidingly attached. The first reciprocating mechanism can include an x-axis component slidingly coupled to and translating with the y-axis component along the y-axis, the x-axis component being: i) configured to reciprocate substantially perpendicularly to the y-axis relative to the y-axis component, ii) comprising an orbital output component, and iii) comprising an orbital linking component disposed substantially concentric with the orbital output component. The first reciprocating mechanism can include a stationary output component rotatably attached to the base in a direction that is substantially perpendicular to both the x-axis and the y-axis, the stationary output component engaging with the orbital output component via a first integral interconnecting output link and a stationary linking component rotatably attached to the base in a direction that is substantially concentric with the stationary output component, the stationary linking component engaging with the orbital linking component of the x-axis component via the first integral interconnecting output link. In some embodiments, various different interconnecting links can be used in lieu of a dedicated interconnecting output link. In some embodiments, the described linking elements can be combined to form a continuous drive shaft or continuous crank shaft that links the components of the reciprocating mechanism together.

In some embodiments, the stationary linking component can include a second integral interconnecting link configured to engage with a second orbital output component of a second x-axis component of a second reciprocating mechanism. The second integral interconnecting link can be disposed at an orientation 180 degrees from the first integral interconnecting link. The reciprocating engine, e.g., the first reciprocating mechanism and second reciprocating mechanism (and/or additional further interconnected reciprocating mechanisms) can be included in one or more of, or a combination of, i) an engine, ii) a pump, or iii) a compressor. In some embodiments, the first integral interconnecting output link is an output pinion gear and an internal ring gear gearset, the stationary output component is a rotatable output pinion gear and shaft set and the orbital output component is an internal ring gear. The pitch diameter of the output pinion gear can be substantially equal to a stroke length of the reciprocating engine and a pitch diameter of the internal ring gear can be substantially equal to two times the stroke length of the reciprocating engine and a distance between centerlines of the orbital linking component and the stationary linking component can be substantially equal to one-half a stroke length of the reciprocating engine In some embodiments, the first integral interconnecting output link is an integral crank arm, the stationary output component is a first output shaft and the orbital output component is a second output shaft. In some embodiments, the first integral interconnecting link is a crank arm, the stationary output component is a first output shaft and the orbital output component is a second output shaft. In some embodiments, the first integral interconnecting link is a set of engaged pinion gears, the stationary linking component is a first pinion gear and the orbital linking component is a second pinion gear.

The first integral interconnecting link can include a weight configured to counterbalance rotational forces of the link and movement of the x-axis component. In some embodiments, a second integral interconnecting link or other integral interconnecting links can include a weight configured to counterbalance rotational forces of the link, the x-axis component, and/or other forces generated by other components of the drive mechanism.

In some embodiments, the distance between centerlines of the orbital output component and the stationary output component can be substantially equal to one-half a stroke length of the reciprocating engine. The distance between centerlines of the orbital linking component and the stationary linking component can be substantially equal to one-half a stroke length of the reciprocating engine, and the sum of the pinion gear radii can be substantially equal to one-half a stroke length of the reciprocating engine. In some embodiments, the set of engaged pinion gears is a set of rollers. In some embodiments, the x-axis component drives a (y+90) axis component disposed 90 degrees from the y-axis component.

In some aspects, there is a drive mechanism for generating a rotational motion output from a reciprocating motion input of an assembly of a reciprocating device and/or for generating reciprocating motion output from a rotational motion input that includes an axially translating y-axis component configured to reciprocate substantially along a y-axis with the reciprocating motion of the assembly of the reciprocating device relative to a base to which the y-axis component is attached. The drive mechanism can include an x-axis component slidingly coupled to and translating with the y-axis component substantially along the y-axis, the x-axis component being: i) configured to reciprocate substantially perpendicularly to the y-axis relative to the y-axis component, ii) comprising an orbital output component, and iii) comprising an orbital linking component disposed substantially concentric with the orbital output component. The drive mechanism can include a stationary output component rotatably attached to the base in a direction that is substantially perpendicular to both the x-axis and the y-axis, the stationary output engaging with the orbital output component of the x-axis component via a first integral interconnecting link, and a stationary linking component rotatably attached to the base in a direction that is substantially concentric with the stationary output component, the stationary linking component interfacing and rotatably engaging with the orbital linking component of the x-axis component via the first integral interconnecting link.

In some embodiments, the stationary linking component of the drive mechanism can include a second integral interconnecting link configured to engage with a second orbital output component of a second x-axis component of a second reciprocating mechanism. The second integral interconnecting link can be disposed at an orientation 180 degrees from the first integral interconnecting link. The drive mechanism (including any further interconnected drive mechanisms) can be included in one or more of, or a combination of, i) an engine, ii) a pump, or iii) a compressor. In some embodiments, the x-axis component drives a (y+90) axis component disposed 90 degrees from the y-axis component.

In some aspects, there is a method of converting an axial force from a reciprocating motion input of a reciprocating element to a torque applied to an output shaft assembly and/or converting a torque applied from the output shaft assembly to an axial force to the reciprocating motion of the reciprocating element. The method includes applying an axial force to move an axially translating y-axis component configured to reciprocate along a y-axis with the reciprocating motion input of a piston assembly relative to a base to which the y-axis component is slidingly attached. The method includes transmitting the axial force through an x-axis component which is slidingly coupled to and translating with the y-axis component substantially along the y-axis, the x-axis component being: i) configured to reciprocate substantially perpendicularly to the y-axis relative to the y-axis component, ii) comprising an orbital output component and transmitting the axial force from the x-axis component to the output shaft assembly via a first interconnecting link integral to the output shaft and rotatably connected to the orbital output component of the x-axis component, transmitting consistently applied torque and vice versa.

In some embodiments, the method can include transmitting the axial force from the x-axis component to a second x-axis component which is slidingly coupled to and translating with a second y-axis component, including in the manner substantially described herein with respect to, e.g., the first and second reciprocating mechanisms. In some embodiments, the method can include driving the motion of a (y+90)-axis component with the motion of the x-axis component, the (y+90)-axis component disposed 90 degrees from the x-axis component.

In some aspects, reciprocating engines can include an engine block defining at least one cylinder; at least one piston assembly reciprocating within the at least one cylinder; and a drive mechanism for generating a rotational motion output from a reciprocating motion input of the piston assembly, where the drive mechanism includes an axially translating y-axis component configured to reciprocate along a y-axis with the reciprocating motion input of the piston assembly relative to a base to which the y-axis component is slidingly attached; an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; an output shaft assembly rotatingly coupled to a base and having an output pinion gear that interfaces with and engages tangentially with the internal ring gear; and a stationary engagement component coupled to, or integrally formed along, the base and substantially concentric with the output shaft assembly, the stationary engagement component interfacing and tangentially engaging with the orbital engagement component of the x-axis component, the interfacing between the stationary engagement component and the orbital engagement component of the x-axis component applying a force to the x-axis component to maintain contact between the internal ring gear and the output pinion gear as the internal ring gear orbits about and drives the output pinion gear to drive a drive gear of an engine drive shaft assembly.

Embodiments can include one of more of the following features.

The reciprocating engine can be an opposed piston multiple cylinder engine, wherein the axially translating y-axis component is coupled to two opposing pistons. The stationary engagement component comprises a rotatable element. The stationary engagement component can include a recess with which the orbital engagement component interfaces. The orbital engagement component can include a gear or roller. A pitch diameter of the output pinion gear can be substantially equal to a stroke length of the reciprocating engine and a pitch diameter of the internal ring gear can be substantially equal to two times the stroke length of the reciprocating engine and the sum of respective pitch diameters of the orbital engagement component and the stationary engagement component can be substantially equal to a stroke length of the reciprocating engine. The output shaft assembly can include a torque transfer gear which transfers torque from the output shaft assembly to the drive gear of the engine drive shaft assembly. The torque transfer gear comprises a sprocket and chain assembly. The base can include a portion of the engine block. The y-axis component can include a linear bearing surface along which the y-axis component slides relative to the base with the reciprocating motion input. The linear bearing surface can limit the y-axis component from moving relative to the base except for in the direction of the reciprocating motion input. The x-axis component can include a linear bearing surface along which the x-axis component slides substantially perpendicularly to the direction of the reciprocating motion input.

In some aspects, drive mechanisms for generating a rotational motion output from a reciprocating motion input of a piston assembly of a reciprocating engine can include an axially translating y-axis component configured to reciprocate along a y-axis with the reciprocating motion input of the piston assembly relative to a base to which the y-axis component is attached; an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; an output shaft assembly rotatingly coupled to the base and having an output pinion gear that interfaces with and engages tangentially with the internal ring gear; and a stationary engagement component coupled to, or integrally formed along, the base and substantially concentric with the output shaft assembly, the stationary engagement component interfacing and tangentially engaging with the orbital engagement component of the x-axis component, the interfacing between the stationary engagement component and the orbital engagement component of the x-axis component applying a force to the x-axis component to maintain tangential engagement between the internal ring gear and the output pinion gear as the internal ring gear orbits about and drives the output pinion gear to drive a drive shaft of the engine.

In some aspects, drive mechanisms for generating a rotational motion output from a reciprocating motion input and/or for generating a reciprocating motion output from a rotational motion input can include: an axial translating y-axis component configured to reciprocate along a y-axis with the reciprocating motion input relative to a base to which the y-axis component is attached; an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; an output shaft assembly rotatingly coupled to the base and having an output pinion gear that interfaces with and engages tangentially with the internal ring gear; and a stationary engagement component coupled to, or integrally formed along, the base and substantially concentric with the output shaft assembly, the stationary engagement component interfacing and tangentially engaging with the orbital engagement component of the x-axis component, the interfacing between the stationary engagement component and the orbital engagement component of the x-axis component applying a force to the x-axis component to maintain tangential engagement between the internal ring gear and the output pinion gear as the internal ring gear orbits about the output pinion gear.

In some aspects, reciprocating compressor or pump can include: a cylinder block defining at least one cylinder; at least one piston assembly reciprocating within the at least one cylinder; and a drive mechanism for generating a reciprocating motion of the piston assembly from a rotational motion input, where the drive mechanism includes: an axially translating y-axis component configured to reciprocate along a y-axis with the reciprocating motion input of the piston assembly relative to a base to which the y-axis component is slidingly attached; an x-axis component slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; an input shaft assembly rotatingly coupled to a base and having an input pinion gear that interfaces with and engages tangentially with the internal ring gear; and a stationary engagement component coupled to, or integrally formed along, the base and substantially concentric with the input shaft assembly, the stationary engagement component interfacing and tangentially engaging with the orbital engagement component of the x-axis component, the interfacing between the stationary engagement component and the orbital engagement component of the x-axis component applying a force to the x-axis component to maintain contact between the internal ring gear and the output pinion gear as the internal ring gear orbits about and is driven by the input pinion gear of the input shaft assembly.

Embodiments can include one or more of the following features.

The reciprocating engine can include an opposed piston multiple cylinder engine, wherein the axially translating y-axis component is coupled to two opposing pistons. The reciprocating engine can be an internal combustion engine. The reciprocating engine can be an in-line multiple cylinder combustion engine. The stationary engagement component can be a rotatable element. The rotatable element can be a gear. The stationary engagement component can be a recess with which the orbital engagement component interfaces. The orbital engagement component can be a gear or roller. The orbital engagement component can include a shaft device. The shaft device can be fixedly coupled or integrally formed within the x-axis component. A pitch diameter of the output pinion gear can be substantially equal to a stroke length of the reciprocating engine and a pitch diameter of the internal ring gear can be substantially equal to two times the stroke length of the reciprocating engine and the sum of respective pitch diameters of the orbital engagement component and the stationary engagement component can be substantially equal to a stroke length of the reciprocating engine. The output shaft assembly can include a torque transfer gear which transfers torque from the output shaft assembly to the drive shaft. The torque transfer gear can include a sprocket and chain assembly. The base can be a portion of an engine block. The base can be a component attached to the engine block. The y-axis component can include a linear bearing surface along which the y-axis component slides relative to the base with the reciprocating motion. The linear bearing surface can limit the y-axis component from moving relative to the base except for in the direction of the reciprocating motion input. The x-axis component can include a linear bearing surface along which the x-axis component slides substantially perpendicularly to the direction of the reciprocating motion input.

In some aspects, methods of converting an axial force from a reciprocating motion input of a reciprocating element to a torque applied to an output shaft assembly and/or converting a torque applied from the output shaft assembly to an axial force to the reciprocating motion of the reciprocating element can include: applying an axial force to move an axially translating y-axis component configured to reciprocate along a y-axis with the reciprocating motion input of a piston assembly relative to a base to which the y-axis component is slidingly attached; transmitting the axial force through an x-axis component which is slidingly coupled to and translating with the y-axis component along the y-axis, the x-axis component being: i) configured to reciprocate substantially perpendicularly to the y-axis relative to the y-axis component, ii) comprising an internal ring gear, and iii) comprising an orbital engagement component disposed substantially concentric with the internal ring gear; transmitting the axial force to an output shaft assembly rotatingly coupled to the base and having an output pinion gear that interfaces with and engages tangentially with the internal ring gear, wherein a stationary engagement component coupled to, or integrally formed along, the base and substantially concentric with the output shaft assembly interfaces with and tangentially engages with the orbital engagement component of the x-axis component, the interfacing between the stationary engagement component and the orbital engagement component of the x-axis component applying a force to the x-axis component to maintain tangential engagement between the internal ring gear and the output pinion gear as the axial force is transmitted from the internal ring gear to the output pinion gear as consistently applied torque and vice versa.

Embodiments can include one or more of the following.

The stationary engagement component can include a rotatable element. The orbital engagement component can include a gear or roller. The y-axis component can include a linear bearing surface along which the y-axis component slides relative to the base with the reciprocating motion. The x-axis component can include a linear bearing surface along which the x-axis component slides substantially perpendicularly to the direction of the reciprocating motion input.

In some aspects, methods of converting a reciprocating axial force from a reciprocating motion of a reciprocating element into a torque applied to an output shaft can include: applying the axial force to slide an axial translating component with the reciprocating motion of the reciprocating element relative to the output shaft, wherein the axial translating component is axially coupled to an internal ring gear engaged with the output shaft and the internal ring gear is configured to slide relative to the axial translating component in a direction substantially perpendicular to the reciprocating motion of the reciprocating element; maintaining contact between the internal ring gear and the output shaft using an idler assembly fixed substantially concentrically relative to the internal ring gear; and as the axial translating component and internal ring gear coupled thereto slide axially relative to the output shaft, permitting the internal ring gear to slide in the direction substantially perpendicular to the reciprocating motion of the reciprocating element under applied by the idler assembly, thereby causing the internal ring gear to orbit about, and consistently apply the torque to, the output shaft during reciprocation of the reciprocating element.

Embodiments can include one or more of the following features.

The permitting the internal ring gear to slide in the direction substantially perpendicular to the reciprocating motion of the reciprocating element can include permitting the internal ring gear to move relative to the axial translating component along one or more bearing surfaces. The maintaining contact between the internal ring gear and the output shaft using the idler assembly can include applying a force, using a stationary engagement component coupled to, or integrally formed along, a base and substantially concentric with the output shaft, to an orbital engagement component disposed substantially concentric with the internal ring gear.

BRIEF DESCRIPTION OF DRAWINGS

FIG. 11 is a diagram of example force vectors and torque calculation of a conventional crankshaft connecting rod reciprocating mechanism.

FIG. 12 is a diagram of example force component vectors and example related torque calculations of the torque applied to the output shaft by the drive mechanism described herein.

FIG. 32C is a perspective view of an example output link assembly according to an embodiment of the invention.

DETAILED DESCRIPTION

The power delivery devices shown and described herein offer improvements over the limitations of previously-available power delivery devices. The power delivery devices shown and described herein are capable of providing more efficient power output. In some embodiments, the power delivery devices shown and described herein reduce the number of failure points present in traditional power delivery devices by combining or eliminating components that are present in traditional power delivery devices. Certain of the power delivery devices shown and described herein eliminate the need for certain components to be geared, including by replacing certain traditionally-geared components with stationary components, e.g., shafts and links, to improve on the efficiency and reliability of the system.

Figure 1:
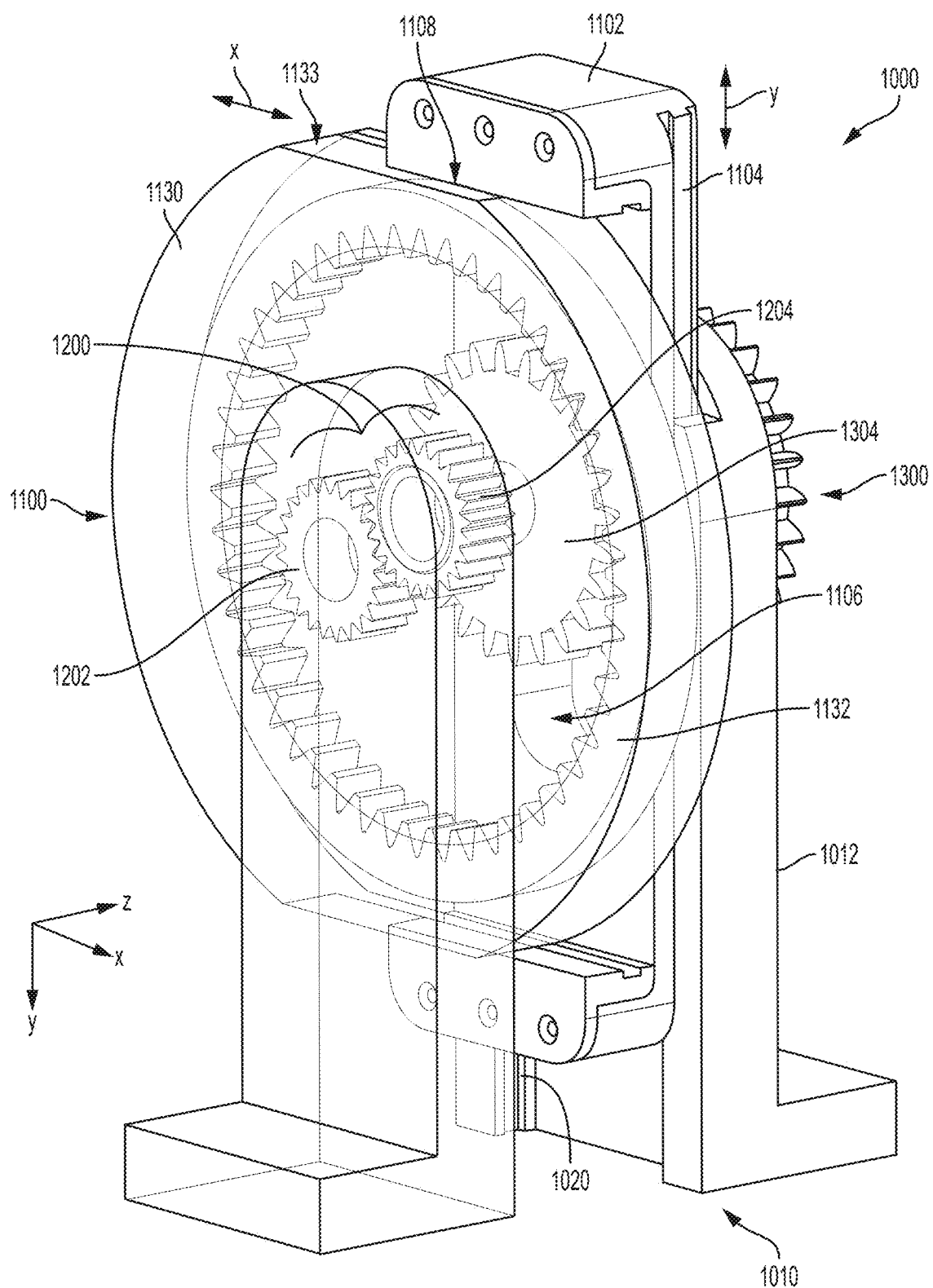
FIG. 1 is a perspective view of an example drive mechanism for converting reciprocating motion into a rotation of an output shaft, illustrating an idler assembly.
Figure 2:
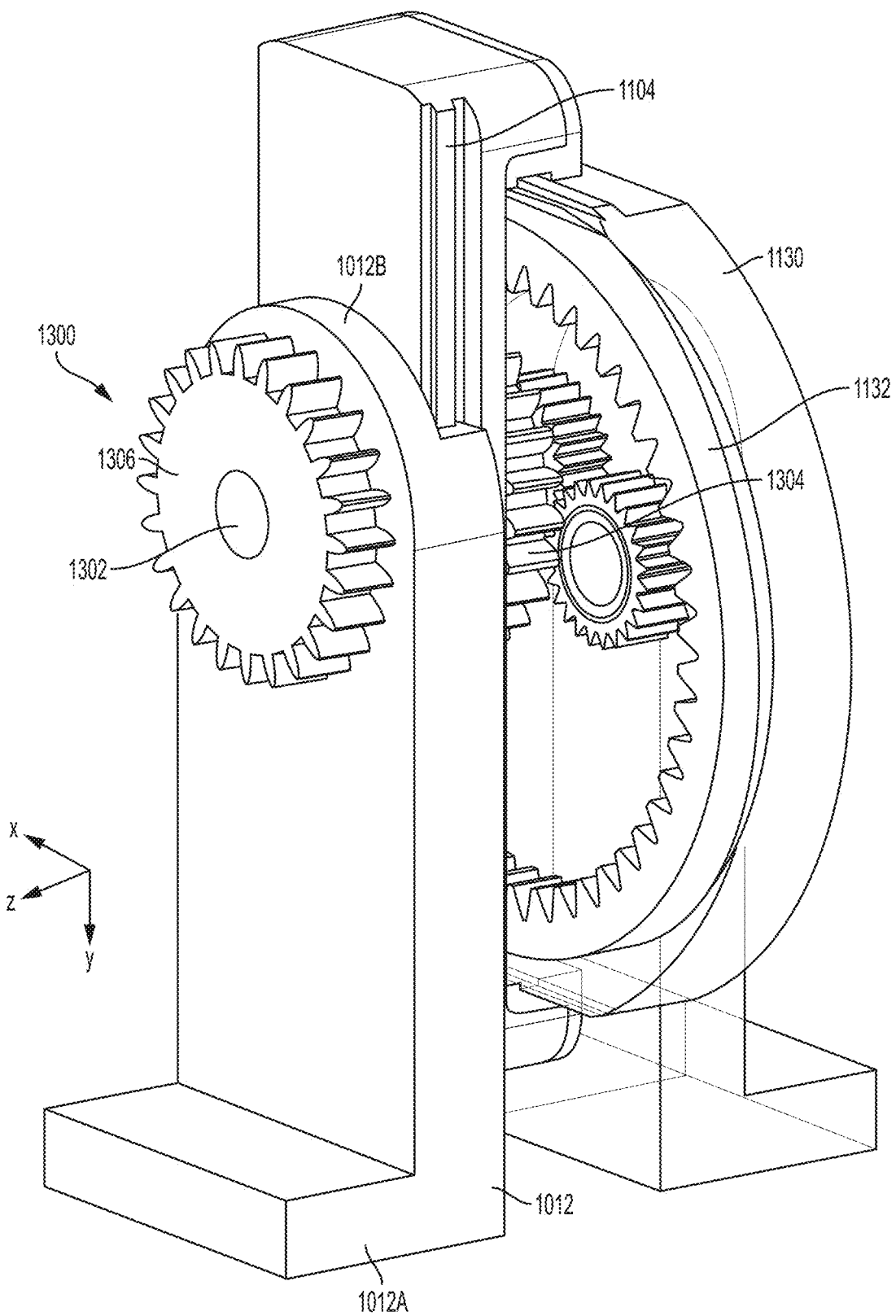
FIG. 2 is another perspective view of the example drive mechanism, illustrating the output shaft.

In the power delivery device shown in FIGS. 1 and 2, a drive mechanism 1000 can include a base 1010, an oscillating assembly 1100 coupled to the base 1010 and configured to interface with a reciprocating element (e.g., a piston), and a rotating output shaft assembly 1300 that engages with the oscillating assembly 1100 to provide a rotational power output, for example, to a drive shaft.

The base 1010 can serve as a mounting and positioning surface for other components of the drive mechanism, such as the oscillating assembly 1100 and output shaft assembly 1300. In some cases, the base can be an integral portion of an engine, such as part or region of an engine block or head, or can be a separate component attached to the engine. The base 1010 can include a first base plate 1012 through which the output shaft assembly 1300 (i.e., an output shaft 1302) can pass and rotate. The first base plate 1012 can define a hole or recess that serves as a bearing surface along which the output shaft 1302 can rotate. In some embodiments, the first base plate 1012 can be in the form of a multi-piece assembly, for example, formed of a journal portion 1012A and a cap portion 1012B which can be fastened to one another. In some cases, bearings can be used between the base plate 1012 and the shaft 1302. For clarity, portions of the base has been illustrated as transparent in FIGS. 1 and 2.

At least one of the portions of the base, for example, the first base plate 1012, can include an interface surface along which the one or more components of the oscillating assembly can interface. For example, the first base plate 1012 can define a sliding engagement surface 1020 along which the oscillating assembly 1100 can move. As discussed below, the engagement surface 1020 can couple a component of the oscillating assembly so that the component can freely translate axially (along the y-axis) generally in direction that the reciprocating piston translates but is generally coupled with respect to an x-axis direction. The y-axis is typically the direction of piston reciprocation (or motion of other reciprocating input) and the x-axis is substantially perpendicular the y-axis and the reciprocation.

The oscillating assembly 1100 can include an axial translating y-axis component (e.g., frame) 1102 and an x-axis component 1130 that is configured to interface with, and move along the x-axis relative to, the frame 1102, as well as engaging a portion of the output shaft assembly 1300. For clarity, the x-axis component in FIGS. 1 and 2 has been illustrated as transparent. The frame 1102 can be configured to provide a y-axis movement that allows the oscillating assembly to move along with the reciprocating motion of an engine's piston. Thus, the frame 1102 can include one or more sliding surfaces 1104 that couple the frame 1102 along the x-axis but permit the frame 1102 to translate along the y-axis with the motion of the piston. In some cases, the sliding surfaces 1104 can be configured to mate and interface with sliding surfaces 1020 of the base (e.g., of the first base plate 1012). Additionally, the sliding surfaces 1104 and 1020 can individually or together limit the frame 1102 from sliding or otherwise moving along a z-axis direction.

Figure 5:
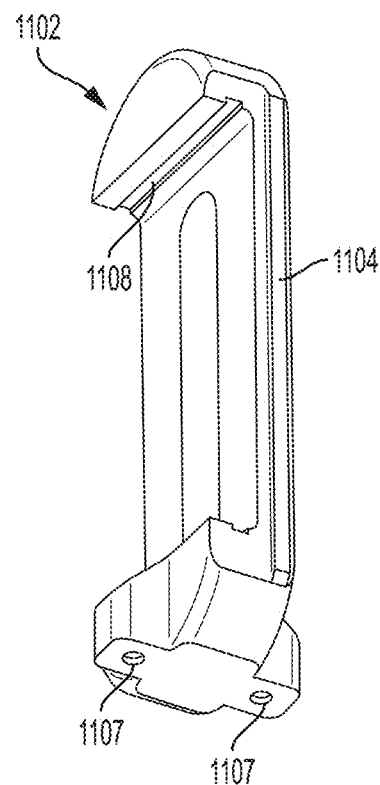
FIG. 5 is a perspective view of an example translating y-axis component illustrating sliding surfaces and attachment points for connecting to a reciprocating piston.

The frame 1102 can also include an opening (e.g., a hole) 1106 through which the output shaft 1302 can be disposed. The opening 1106 can provide clearance for the shaft 1302 as the frame oscillates in the y-axis direction with the motion of the reciprocating piston. The frame 1102 can be coupled to a reciprocating piston in any of various ways. For example, referring briefly to FIG. 5, a frame can include one or more attachment points (e.g., threaded holes) 1107 in which a tension member can connect to drive the frame. In some embodiments, as depicted, a frame can have two attachment points 1107 balanced on two sides of the frame 1102. As a result of the balanced attachment points, force applied by the reciprocating piston can be evenly applied to the frame.

The frame 1102 can be made of any of various structurally suitable materials. For example, the frame 1102 can be made of a light weight, high strength material, for example, aluminum (e.g., alloys; 4032, 7055, 6061, 7068, 5052, 2024, 2618), titanium (e.g., alloy; Ti-6242), steel (e.g., ASM alloys; 6516, 6414, 6419, 6512, 6425, 6532, 5844), magnesium (e.g., ASM alloys; 4429, 4425). The x-axis component 1130 can be made of any of various structurally suitable materials. For example, the x-axis component 1130 can be made of a light weight, high strength material, for example, aluminum (e.g., alloys; 4032, 7055, 6061, 7068, 5052, 2024, 2618), titanium (e.g., alloy; Ti-6242), steel (e.g., ASM alloys; 6516, 6414, 6419, 6512, 6425, 6532, 5844), magnesium (e.g., ASM alloys; 4429, 4425).

Figure 6:
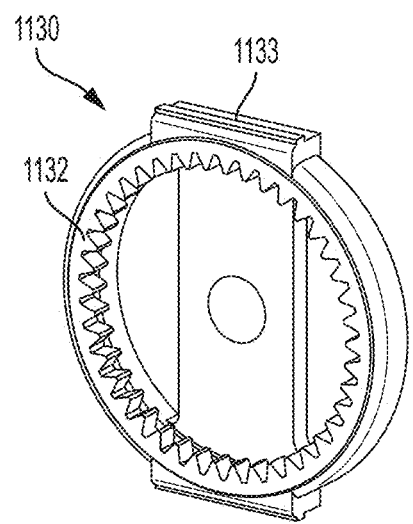
FIG. 6 is a perspective view of an example x-axis component illustrating sliding surfaces to oscillate relative to the translating y-axis component.

The x-axis component 1130 (also illustrated in FIG. 6) of the oscillating assembly 1100 is configured to move with the frame 1102 as the frame moves along the y-axis. That is, with respect to the direction of the motion of the piston, the x-axis component 1130 is coupled to the frame 1102. However, the x-axis component 1130 can be configured to move with respect to the frame 1102 along the x-axis generally perpendicular to the piston motion. For example, the x-axis component 1130 can include one or more sliding surface 1133 configured to mate and slidingly engage with one or more sliding surfaces 1108 of the frame 1102. The sliding surfaces 1133, 1108 which help permit the x-axis component 1130 to move with respect to the frame 1102 can be substantially perpendicular to the sliding surfaces 1104, 1020 that permit the frame 1102 to move with respect to the base 1010. In some embodiments, the sliding surfaces 1104, 1020 that permit the frame 1102 to move with respect to the base 1010 can be disposed substantially along the y-axis (generally in-line with the motion of the piston) which can be substantially perpendicular to the sliding surfaces 1133, 1108 which help permit the x-axis component 1130 to move with respect to the frame 1102, which can be disposed along the x-axis. Due to the complementary sliding surfaces that help to permit the x-axis component 1130 to move in both the y-direction (axially) and the x-direction (laterally), the x-axis component 1130 can orbit (e.g., move along a substantially circular path), for example, about the output shaft 1302. Additionally, the sliding surfaces 1133 and 1108 can individually or together limit the x-axis component 1130 from sliding or otherwise moving along a z-axis direction.

The sliding surfaces can be designed and implemented in any of various forms. For example, the sliding surfaces can define smooth and/or surfaces. The sliding surfaces can also define features that help to limit relative motion between components other than in the desired directions. That is, in some cases, the sliding surfaces may permit relative motion in the x and y directions, but limit relative motion along a z-axis (e.g., the z direction) to help keep the drive mechanism assembled and together during use. For example, complementary sliding surfaces can include a protrusion (e.g., flange) on one component and a recess (e.g., a groove) configured to receive the flange along the other component. In some cases, the flange and grooves can disposed in the x or y direction and limit relative motion in the z direction. In some embodiments, the sliding surfaces can include removable and/or replaceable surfaces such as ball bearing or rolling bearing slides (e.g., commercial linear bearing surfaces, such as Schneeberger type M/V). As appreciated by one skilled in the art, lubricating all sliding surfaces and surfaces of bearing and gearing contact, including metal to metal surfaces, is important in order to facilitate smooth, low friction movement, and to prevent damaging, sticking, galling, and vibration. This includes forced lubrication (e.g., oiling) of all sliding surfaces by a pumped lubricant, or a sealed system lubrication by sealing the lubricant (e.g., grease) into the sliding contact area of the moving components, or by applied non-stick surface coatings such as Teflon.

The circular motion imparted on the x-axis component 1130 by the reciprocation of the piston can be used to impart a circular (e.g., rotational) motion on the output shaft 1302. As a result, the drive mechanism 1000 converts purely axial movement (e.g., along the y-direction, in-line with the piston motion) into a movement having an x-direction component and a y-direction component to propel the output shaft with a continuous tangential force. That is, as the x-axis component 1130 travels around the output shaft, the force driving the output shaft can be consistently applied tangentially, regardless of the position of the piston between top dead center and bottom dead center. For example, the x-axis component 1130 can include an outer engaging device (e.g., an annular power transfer internal ring gear) 1132 that is configured to interface with a mating device of the rotating output shaft assembly 1300, such as a rotating pinion gear 1304 coupled to the output shaft 1302. As a result of the consistent circular motion of the x-axis component 1130 around the pinion gear 1304, the x-axis component 1130 applies a torque force to the pinion gear at a consistent moment arm length as it travels in various directions in the x-axis and y-axis.

The outer engaging device 1132 is typically coupled (e.g., fixed) with respect to the x-axis component 1130. The outer engaging device 1132 can be coupled to the x-axis component 1130 in any of various ways including a press-fit or heat-shrink connection, using fasteners, adhesives, or mechanical joining (e.g., welding). In some cases, the outer engaging device 1132 and the x-axis component 1130 can be manufactured as an integral component having features (e.g., gear teeth of interfacing grooves) machined or cast or otherwise formed directly into the x-axis component 1130.

The pinion gear 1304 and outer engaging device 1132 can be sized and configured based on aspects of the engine with which the drive mechanism is used. For example, the diameter of the outer engaging device 1132 (e.g., the pitch diameter in the case of an internal ring gear), can be two times the stroke length of the engine. Forming the outer engagement device to be double the stroke length can permit the oscillating assembly 1100 travel along the y-axis the same distance as the piston travels during a stroke. The diameter (e.g., pitch diameter) of the pinion gear 1304 is typically approximately equal to the piston stroke length of the engine. As a result, the oscillations of the drive mechanism can be in closer harmony with the reciprocation of the pistons. The diameters of the pinion gear 1304 and the internal ring gear 1132 thus configured allow for one complete 360 degree orbit of the x-axis component around the pinion gear 1304 as the pinion gear moves through one complete revolution, from top-dead-center to bottom-dead-center and back.

The drive mechanism 1000 can also include an idler (e.g., engagement) assembly 1200 that can provide a force to order to keep the outer engaging device 1132 in consistent contact with the pinion gear 1304. For example, the idler assembly 1200 can apply a force so that gear teeth of the outer engaging device 1132 are firmly meshed with gear teeth of the pinion gear 1304 throughout the full stroke of the piston. In some embodiments, the idler assembly 1200 can be offset in a z-direction relative to the driving outer engaging device 1132 and the driven pinion gear 1304 and can include an orbital engagement component (e.g., a positioning element (e.g., a post, roller, pulley wheel, sprocket, or gear)) 1202 coupled to, or integrally formed within, the x-axis component 1130. That is, the idler assembly 1200 can be on an opposite side of the x-axis component 1130 than the outer engaging device 1132. The positioning element 1202 can interface with an engagement component (e.g., a stationary engagement component (e.g., complementary feature (e.g., a post, roller, pulley wheel, belt, sprocket, chain, gear, or feature in which the orbital engagement component can engage, such as a groove or recess)) 1204 coupled to the base 1010. The positioning element 1202 is typically positioned substantially centrally (e.g., concentrically) within the center of the outer engaging device 1132. The complementary feature 1204 can be aligned (e.g., coaxially, concentrically) with the pinion gear 1304. By aligning the positioning element 1202 with the outer engaging device 1132 and the complementary feature 1204 with the pinion gear 1304, the outer engaging device 1132 can move smoothly about and continuously engage the pinion gear 1304 causing the output shaft 1302 to rotate continuously as the frame 1102 reciprocates in the y direction and the x-axis component 1130 reciprocates in the x direction providing movement and torque from the reciprocating device to the output shaft. As a result, the drive mechanism 1000 can be more balanced than some other drive devices, for example, those where an output shaft is not aligned with piston translation.

As illustrated, in some cases, the positioning element 1202 can be disposed on a side of the x-axis component 1130 that is opposite the output shaft 1302. The positioning element 1202 can be rotationally fixed to the x-axis component 1130, such as a fixed gear, and the complementary feature 1204 can be a rotatable gear attached from the base. However, in some cases, the positioning element 1202 can be configured to rotate and the complementary feature 1204 can be stationary. In some cases, both the positioning element 1202 and the complementary feature 1204 can be configured to rotate. In some embodiments, as illustrated, the idler assembly can be configured and positioned such that an interfacing contact point between the positioning element 1202 and the complementary feature 1204 is opposite an interfacing contact point between the engaging device 1132 and the pinion gear 1304 with respect to a rotational axis of the output shaft 1302. The sizes of the respective positioning element 1202 and complementary feature 1204 can vary. In the case of rollers or gears, the combined diameters (e.g., pitch diameters) of the positioning element 1202 and complementary feature 1204 are typically equal to the diameter of the pinion gear 1304. This sizing can help provide consistent contact force to keep the pinion gear 1304 in contact with the engaging device 1132. In some embodiments, the pitch diameters of the various gears can be configured in a relationship to one another such that a continuous tangential drive can be accomplished. For example, the pinion gear 1304 pitch diameter is substantially equal to the piston stroke, the engagement device (e.g., internal ring gear) 1132 is substantially equal to two times the pitch diameter of the pinion gear 1304, and the sum of the widths (e.g., pitch diameters) of the components of the idler assembly (positioning element 1202 (as a pinion gear) and the complimentary feature 1204 (as a pinion gear)) is substantially equal to the pitch diameter of the pinion gear 1304.

It is expected that the drive mechanisms described herein can be used to capture more power from an internal combustion engine and convert more linear force from a reciprocating piston into rotational torque than with conventional crank shaft systems. For example force and torque relationships of drive mechanism 1000 in comparison to the force and torque relationships of a conventional crankshaft reciprocating mechanism are depicted in FIGS. 10, 11, 12, and 13 and discussed below.

Figure 10:
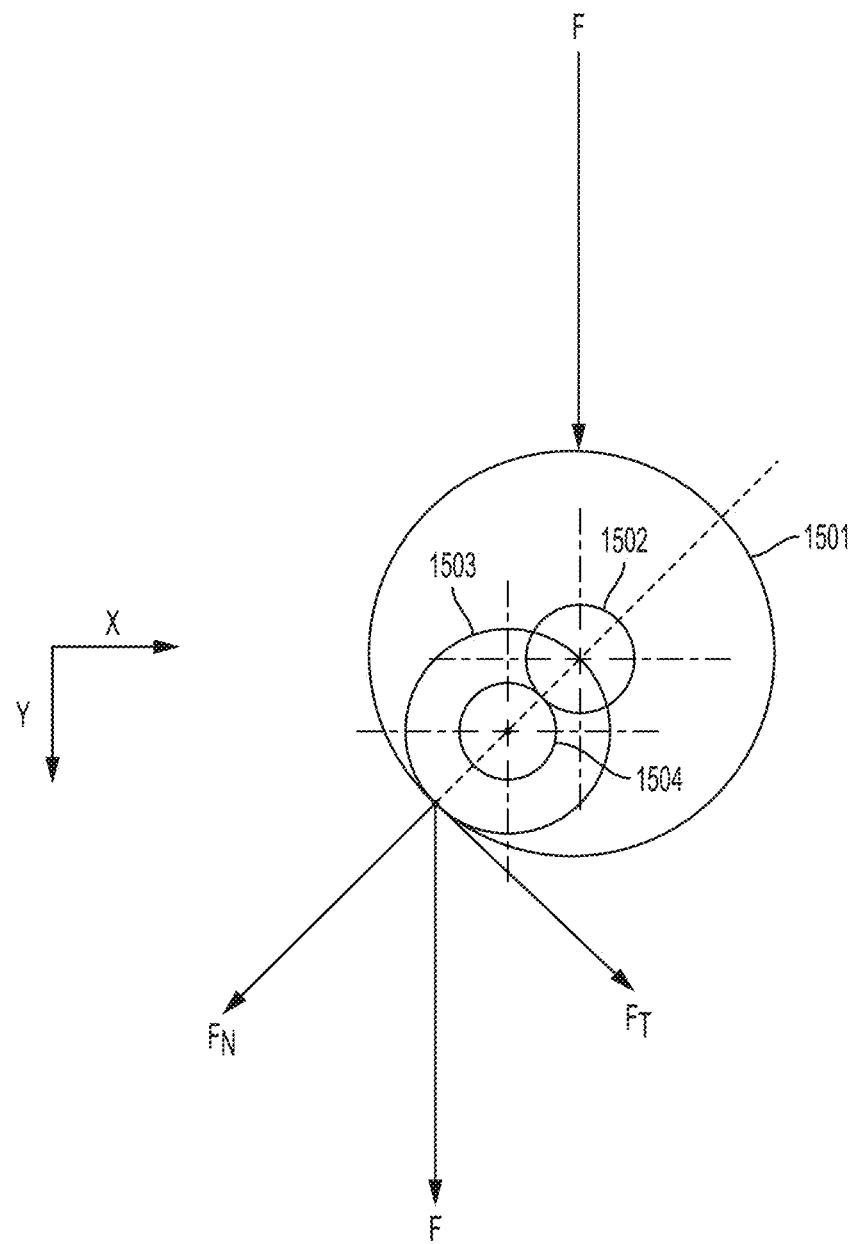
FIG. 10 is a diagram of example force component vectors interacting with pitch diameters of gears within the drive mechanism.

FIG. 10 shows a relationship between the force vectors on the gears of example mechanism 1000 as represented by the pitch diameters of the various gears (e.g., pitch diameter 1501 of the engagement device (internal ring gear) 1132, pitch diameter 1503 of pinion gear 1304, pitch diameter 1502 of the positioning element 1202, and pitch diameter 1504 of the complimentary feature 1204.) In the example drive mechanism 1000, pitch diameters 1501 and 1502 are substantially fixed in relationship with one another so that a movement in one will correspond to a movement in the other and a force applied to one will be a force applied to the other (e.g., internal ring gear 1132 and positioning element 1202 move as a unit). Additionally, in the example drive mechanism 1000, pitch diameters 1503 and 1504 are stationary in the x-y coordinates and do not translate. The pinion gear 1304 associated with the pitch diameter 1503 is allowed to rotate. As shown, vertical force F (i.e., which can be the force from a reciprocating piston) is applied to pitch diameters 1501 and 1502, and this force is simultaneously divided into two component forces, the normal force component $F_N$ and the tangent component $F_T$. The normal force vector $F_N$ is perpendicular to the tangent force vector $F_T$, and is typically directed through all of the four gear axes. At the top dead center position (TDC) of the gearing, the normal force $F_N$ is equal to the total vertical force F with no tangent force $F_T$ component. At the exact TDC position the vertical force typically does not induce rotational movement and movement through this condition is carried through by the momentum of the rotating gearing and all that is coupled to the gearing (e.g., drive trains, generators, pumps, etc.). This condition at the exact TDC position is substantially the same condition experienced by the conventional crankshaft connecting rod mechanism. Forces on and through the gears of the drive mechanism 1000 and acting on various parts of those gears (e.g., gear faces) are large and continuously varying. This puts a very high requirement for material strength on all of the gears of mechanism 1000. Materials for the gearing can be any high strength material and in some cases include materials that have been surface harden. Example materials may include any of a number of materials including case hardening steels such as; DIN-EN MnCr Steel (e.g., 20MnCr5, 20MoCr4, 20CrMo5), DIN-EN NiCrMo Steel (e.g., 20NiCrMo6-4, 18CrNiMo7-6, 14NiCrMo13-4, 17NiCrMo6-5).

Figure 36:
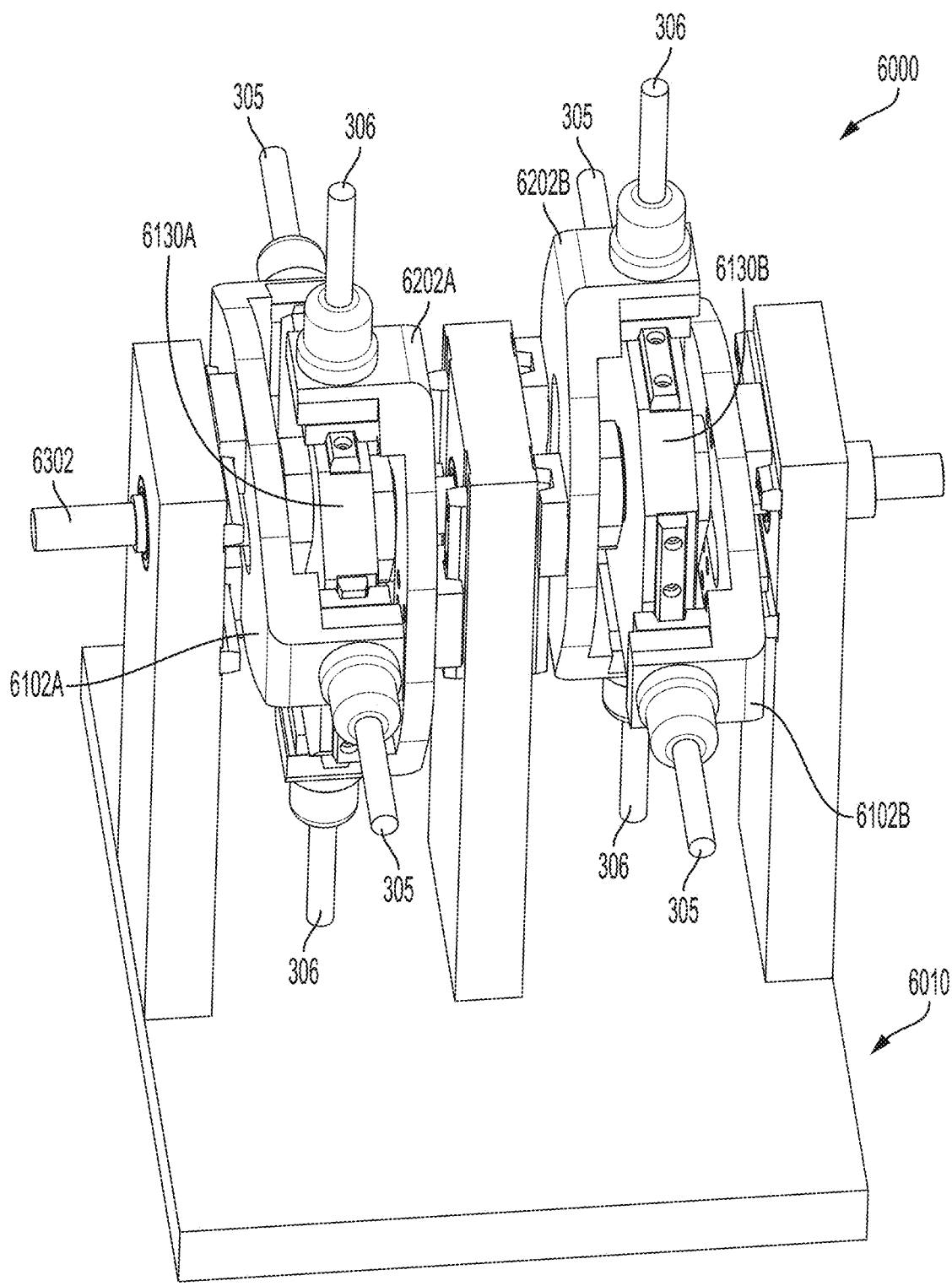
FIG. 36 is a perspective view of the example drive mechanism of FIG. 36.

FIG. 12 further breaks the force components into x and y components and shows a mathematical relationship for torque as a function x and y forces and angular distance from the top of a mechanism stroke. As depicted in FIG. 36, the vertical force F can be represented as $F=F_y=P(\theta)\cdot A$, where $P(\theta)$ is the cylinder pressure as a function of angle from TDC and A is the piston area; $m=r\cdot\sin\theta$, where r is the radius of the pinion gear 1304 (or one half the pitch diameter 1503) and represents the length of the torque arm; $n=r\cdot\cos\theta$; $F_T=F_y\cdot\sin\theta$; $F_X=F_T\cdot\cos\theta$; and $F_X=F_y\cdot\sin\theta\cdot\cos\theta$. As a result, the overall torque, T, applied to the output shaft as a result of the two component forces can be represented as follows: $T=F_X\cdot n+F_Y\cdot m=F_y\cdot\sin\theta\cdot\cos\theta\cdot r\cdot\cos\theta+F_y\cdot r\cdot\sin\theta$. These expressions can be simplified to: $T=P(\theta)\cdot A\cdot r\cdot\sin\theta\cdot\cos^2\theta+P(\theta)\cdot A\cdot r\cdot\sin\theta$.

FIG. 11 shows a mathematical relationship for torque as a function of x and y forces and angular distance from the top of a stroke for a conventional crankshaft reciprocating mechanism. As depicted in FIG. 11, the vertical force F can be represented as $F=F_y=P(\theta)\cdot A$, where $P(\theta)$ is the cylinder pressure as a function of angle from TDC and A is the piston area; $\sin\alpha=m/l$, where $\alpha$ is an angle of the connecting rod and l is the length of the connecting rod; $m=r\cdot\sin\theta$, where r is the radius of the crankshaft; $n=\cos\theta$; $\alpha=\sin^{-1}((r\cdot\sin\theta)/l)$; $F_X=F\cdot\sin\alpha$; and $F_Y=F\cdot\cos\alpha$. As a result, the overall torque, T, applied to the crankshaft can be represented as follows: $T=F_X\cdot n+F_Y\cdot m=F\cdot\sin\alpha\cdot r\cdot\cos\theta+F\cdot\cos\alpha\cdot r\cdot\sin\theta$. The torque T thus equals $T=F\cdot r(\sin\alpha\cdot\cos\theta)+F\cdot r(\cos\alpha\cdot\sin\theta)$. Simplying the expression, $T=P(\theta)\cdot A\cdot r\cdot(\sin\alpha\cdot\cos\theta)+P(\theta)\cdot A\cdot r\cdot(\cos\alpha\cdot\sin\theta)$.

Figure 13:
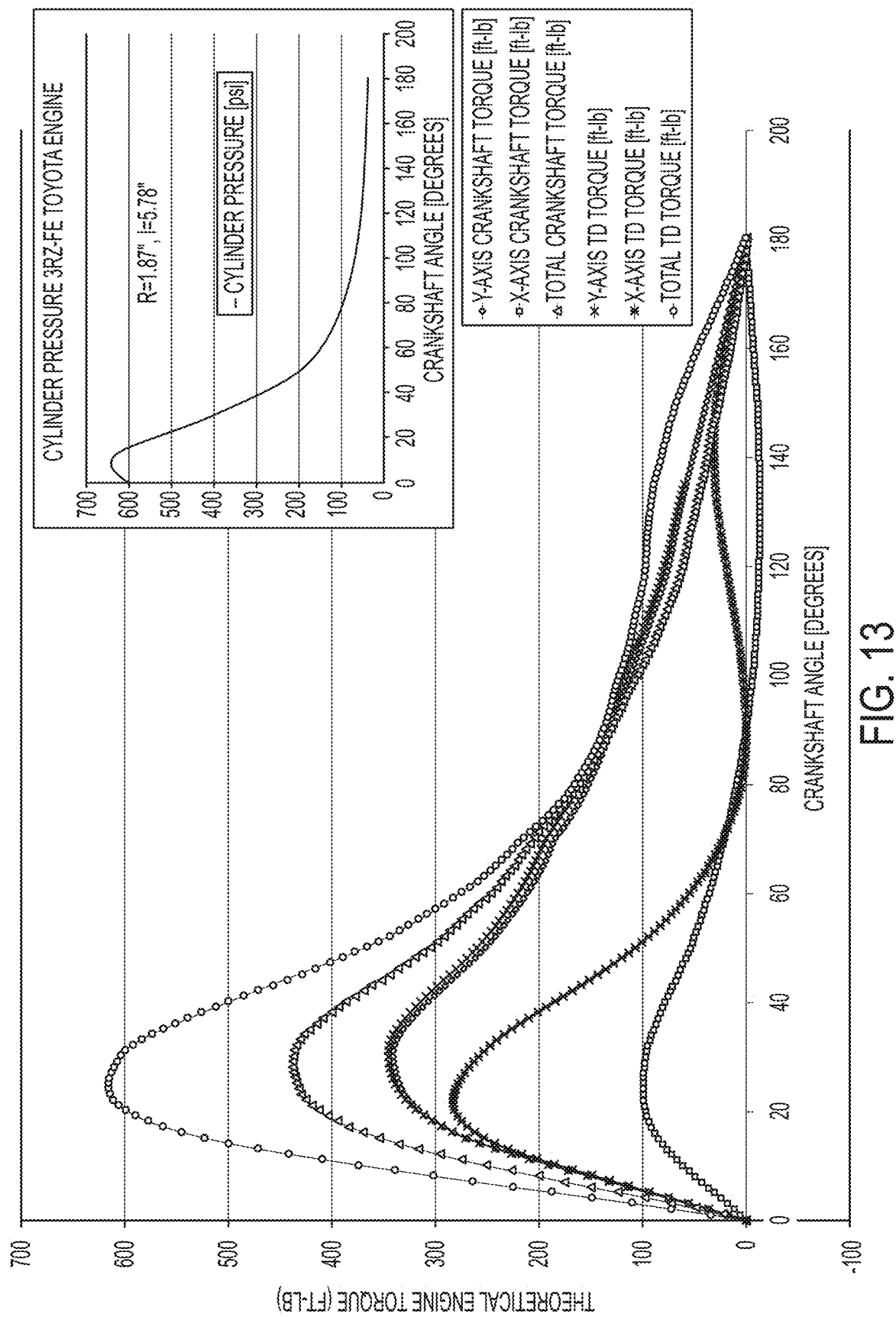
FIG. 13 is a comparison plot of calculated torque output of an example tangent drive mechanism, such as those described herein, as compared to a conventional crankshaft connecting rod reciprocating mechanism for the same input pressure (or force) function.
Figure 14:
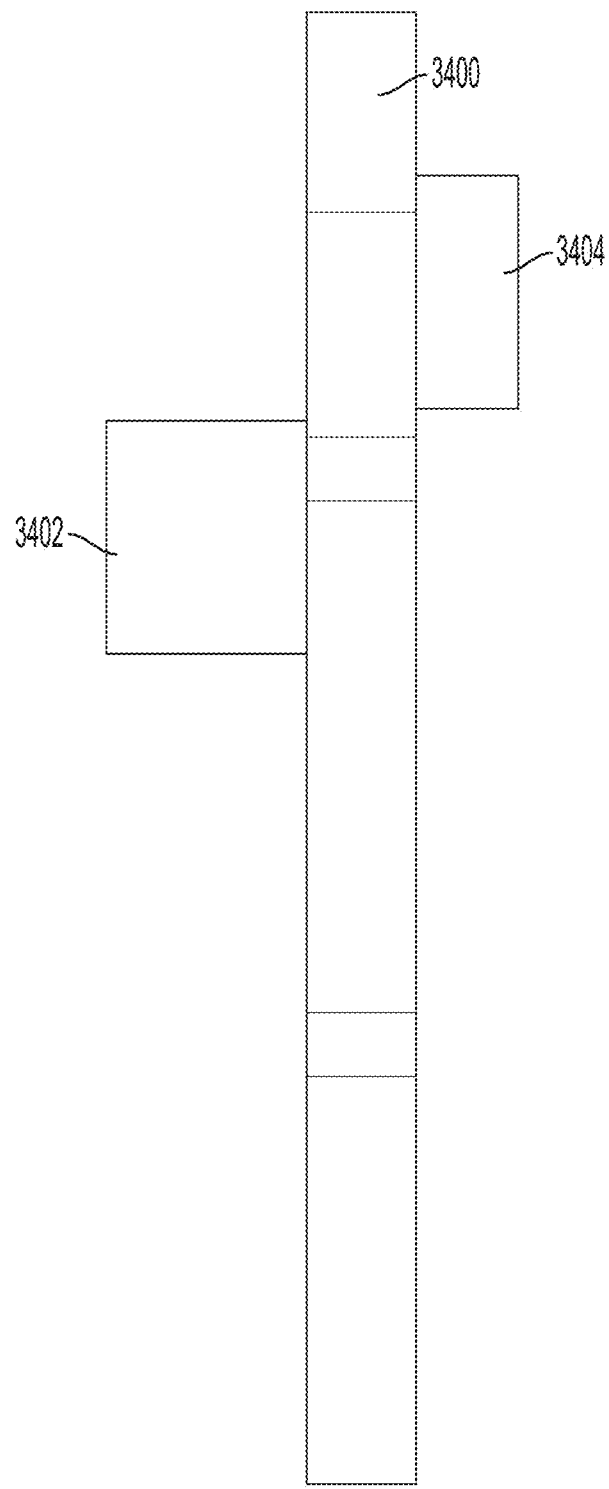
FIG. 14 is a side elevation view of an example interconnecting link according to one embodiment of the invention.
Figure 15:
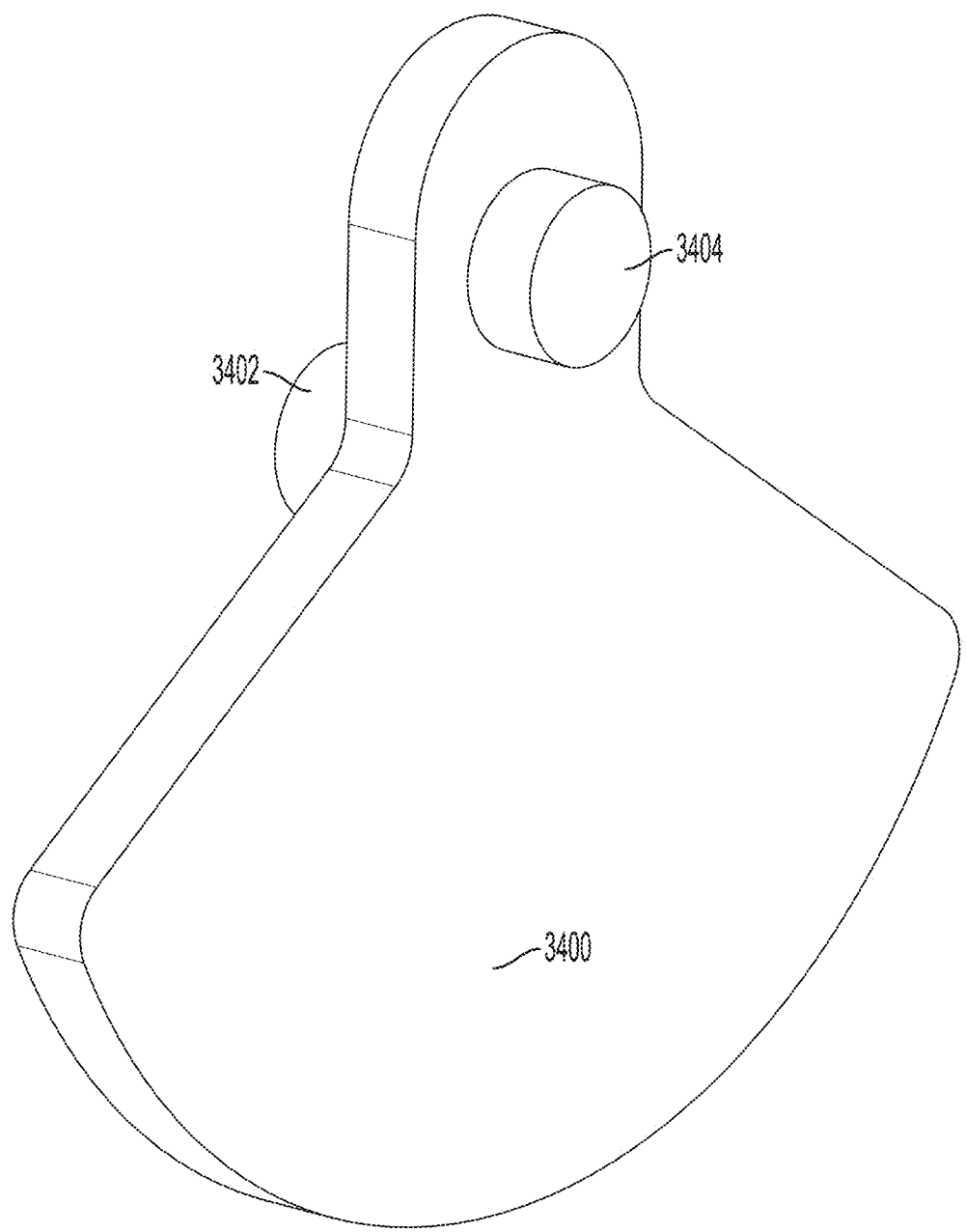
FIG. 15 is a perspective view of the example interconnecting link of FIG. 14.
Figure 16:
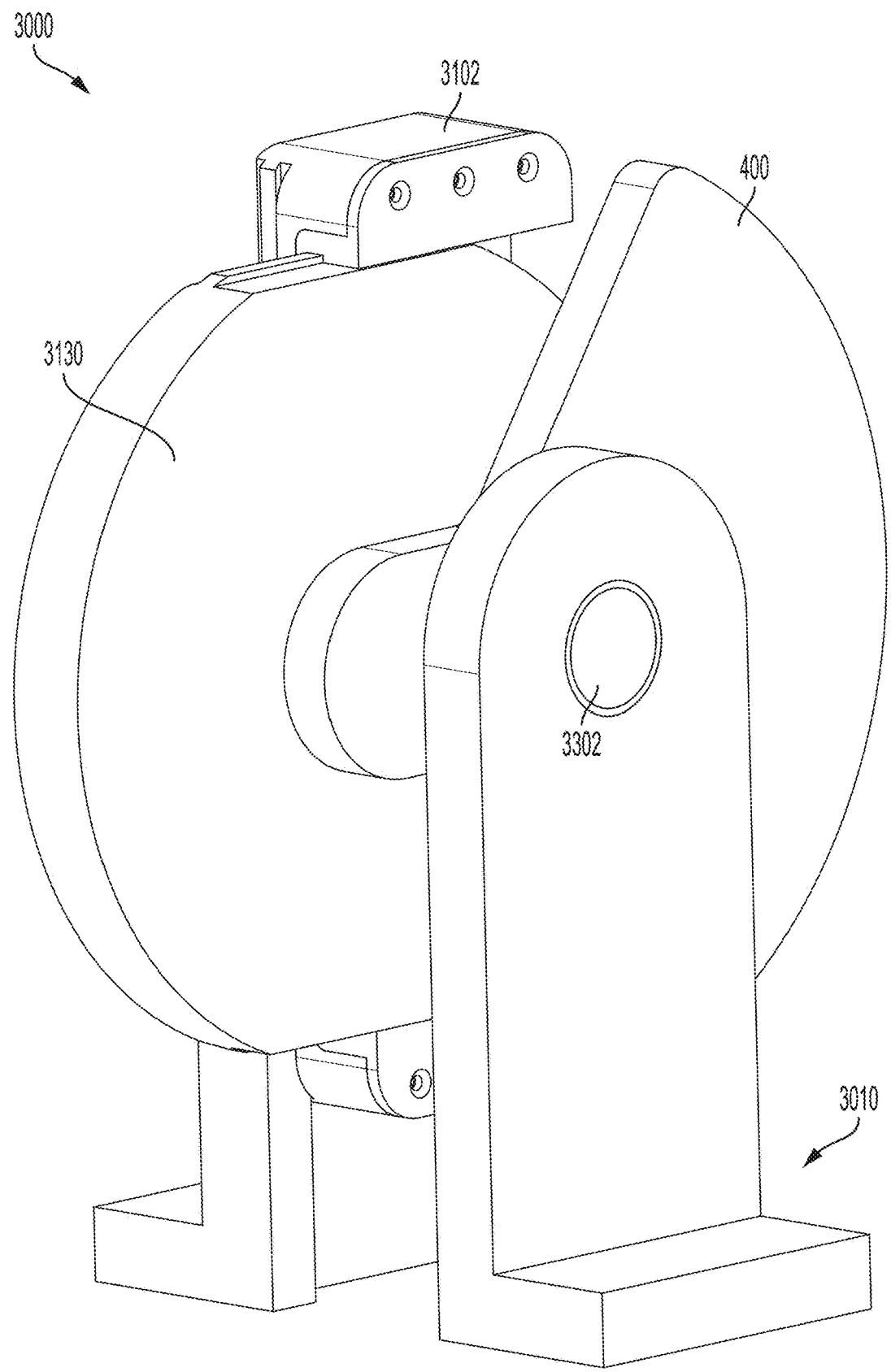
FIG. 16 is a perspective view of an example drive mechanism illustrating connections between the y-plate assembly, x-plate assembly, and interconnecting link.
Figure 17:
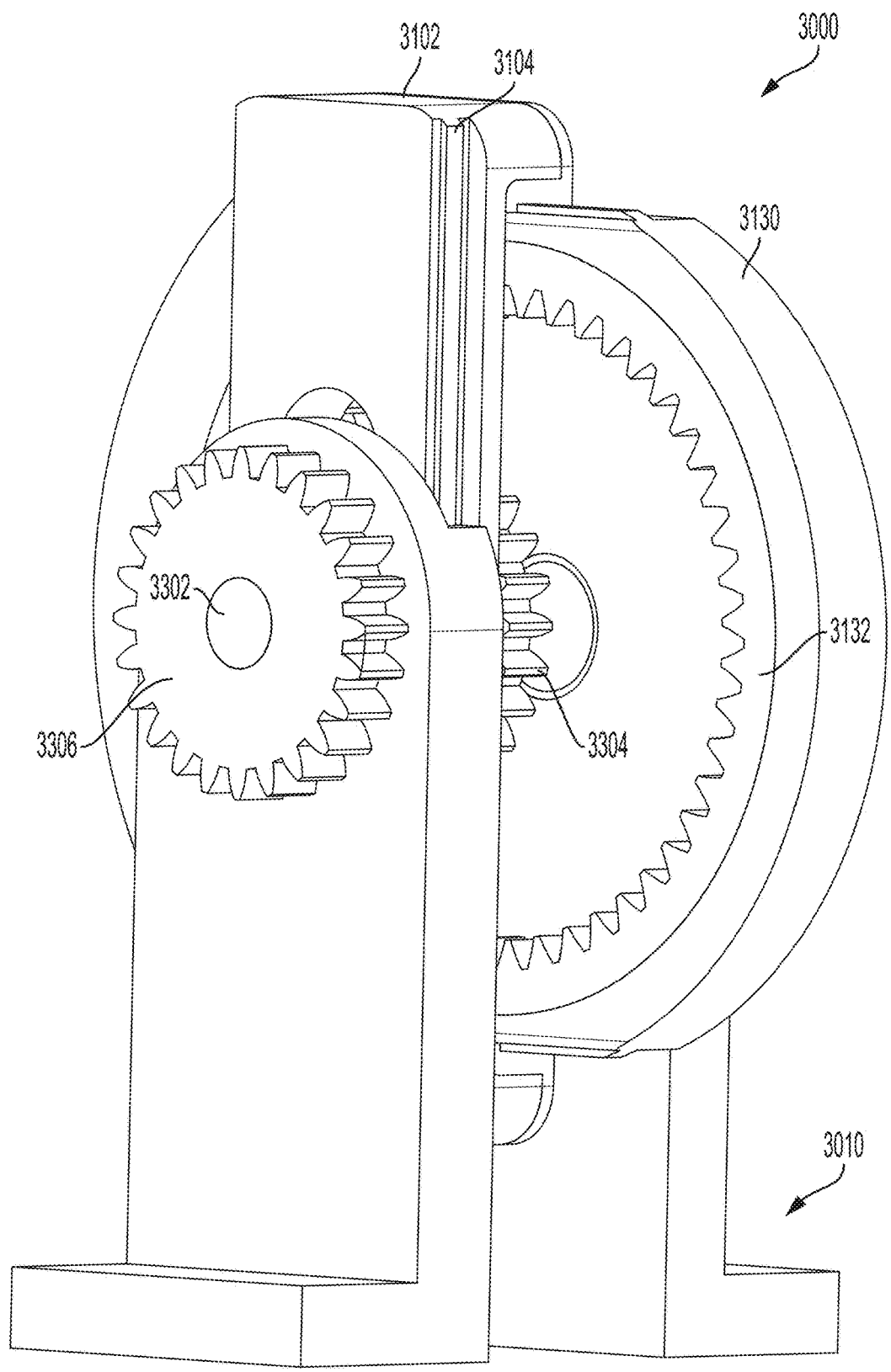
FIG. 17 is a perspective view of the example drive mechanism of FIG. 16 illustrating connections between the y-plate assembly, x-plate assembly, and interconnecting link.
Figure 18:
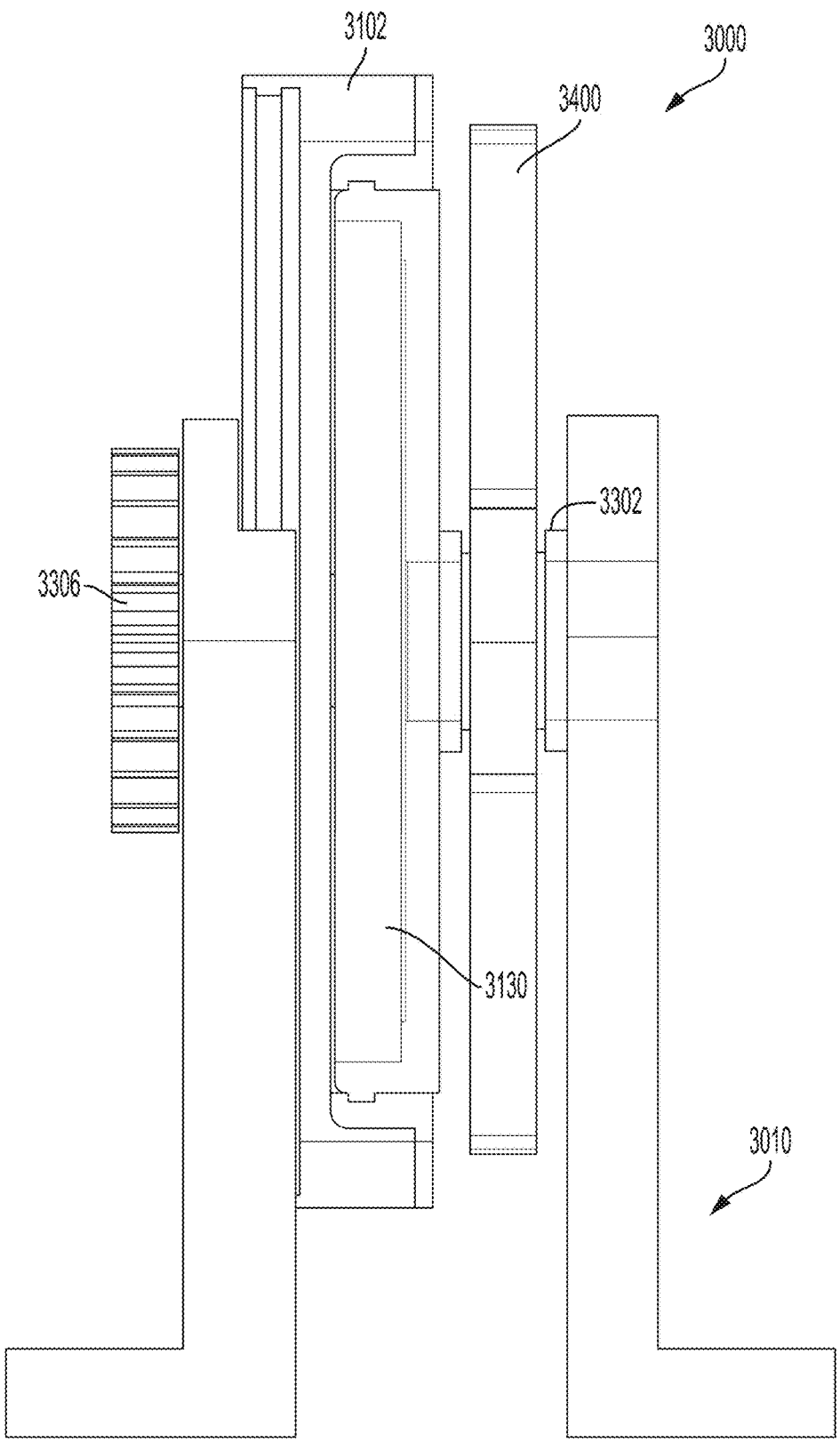
FIG. 18 is a side elevation view of the example drive mechanism of FIG. 16 illustrating connections between the base, stationary shaft, and interconnecting link.
Figure 19:
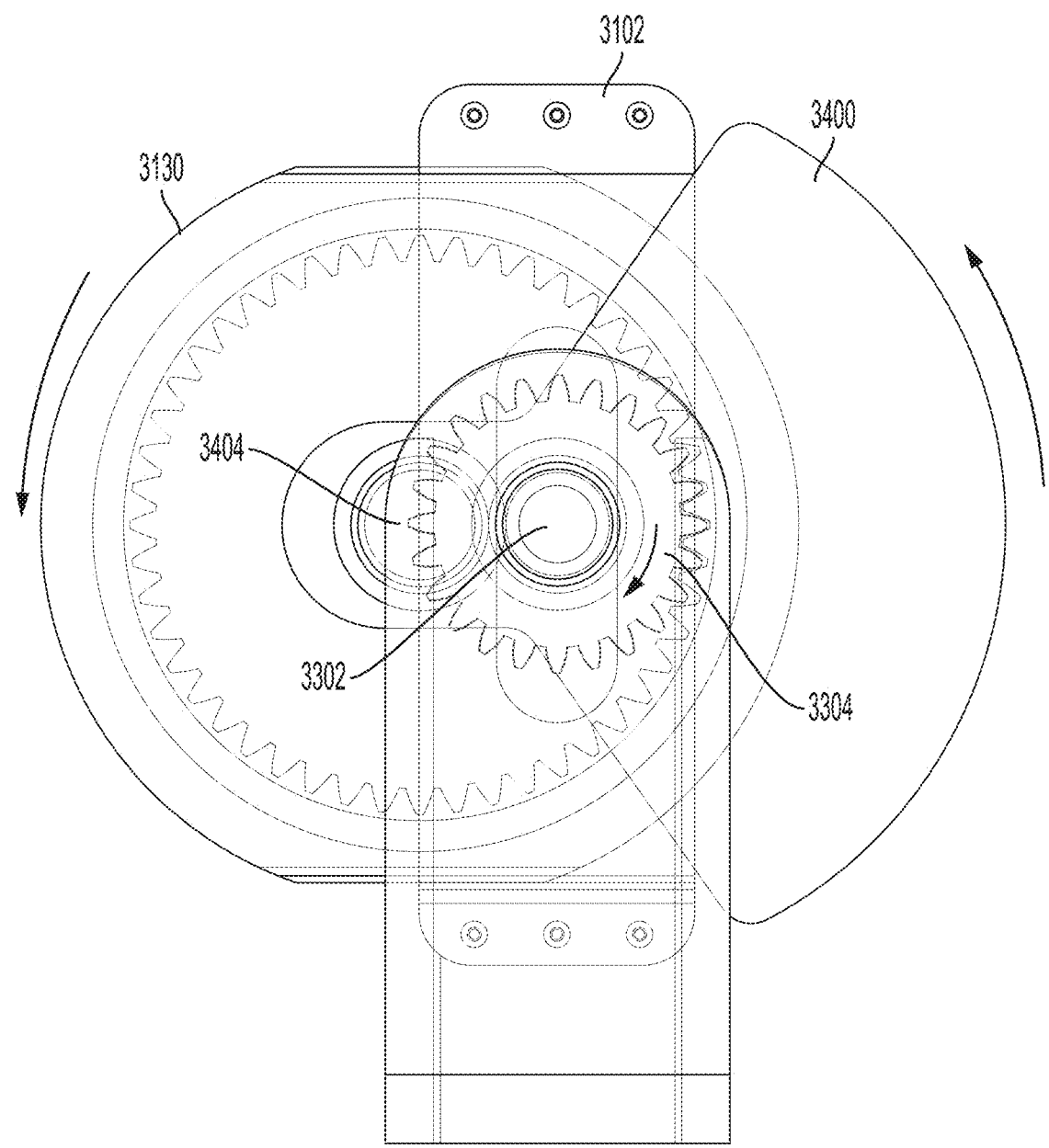
FIG. 19 is a front elevation view of the example drive mechanism of FIG. 16, with details of the x-plate assembly and the interconnecting link shown as transparent for clarity, illustrating connections between the stationary shaft, orbital shaft, x-plate assembly, and interconnecting link.
Figure 20:
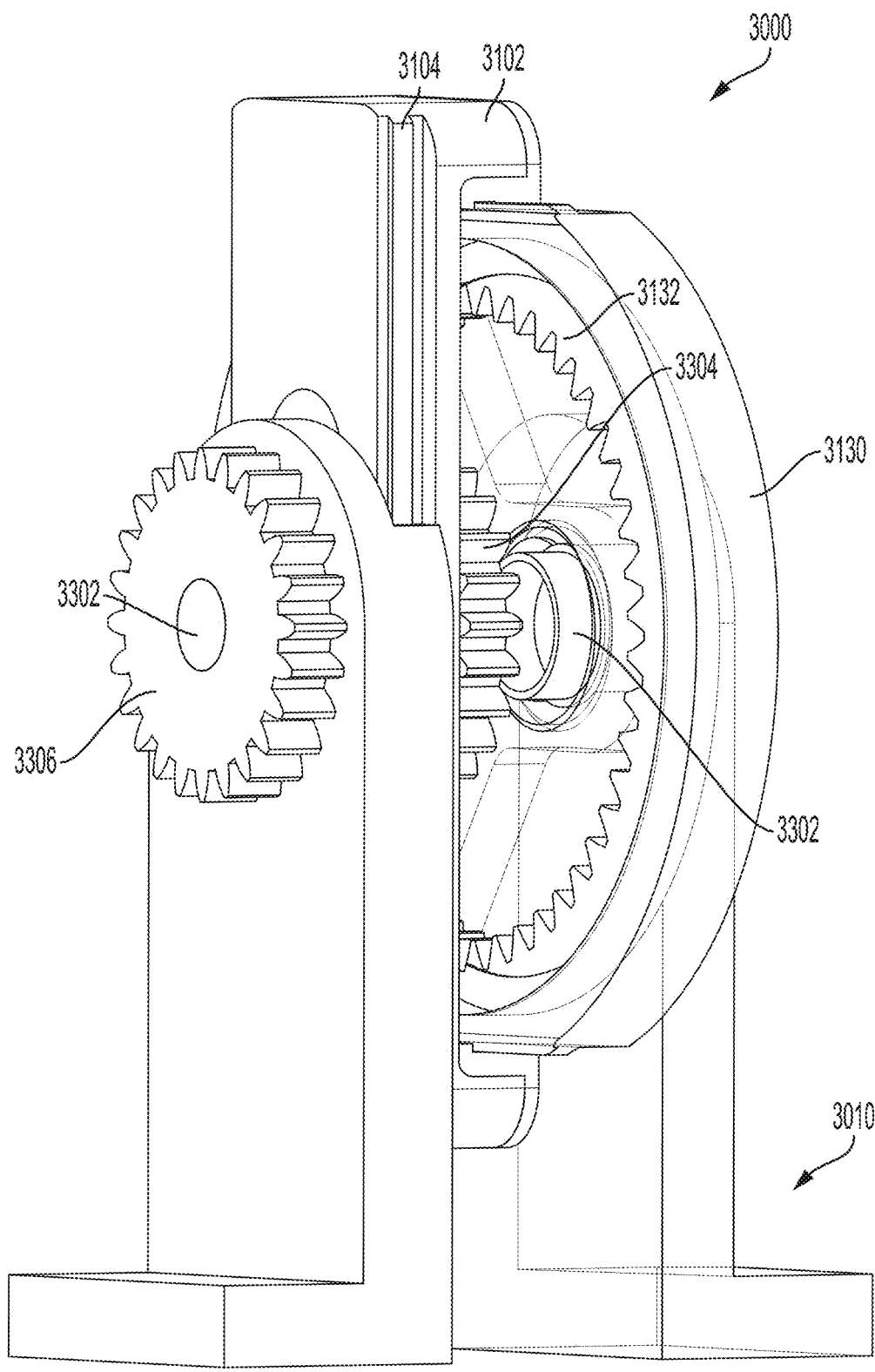
FIG. 20 is a perspective view of the example drive mechanism of FIG. 16, with details of the x-plate assembly shown as transparent for clarity, illustrating connections between the internal ring gear and the pinion gear.
Figure 21:
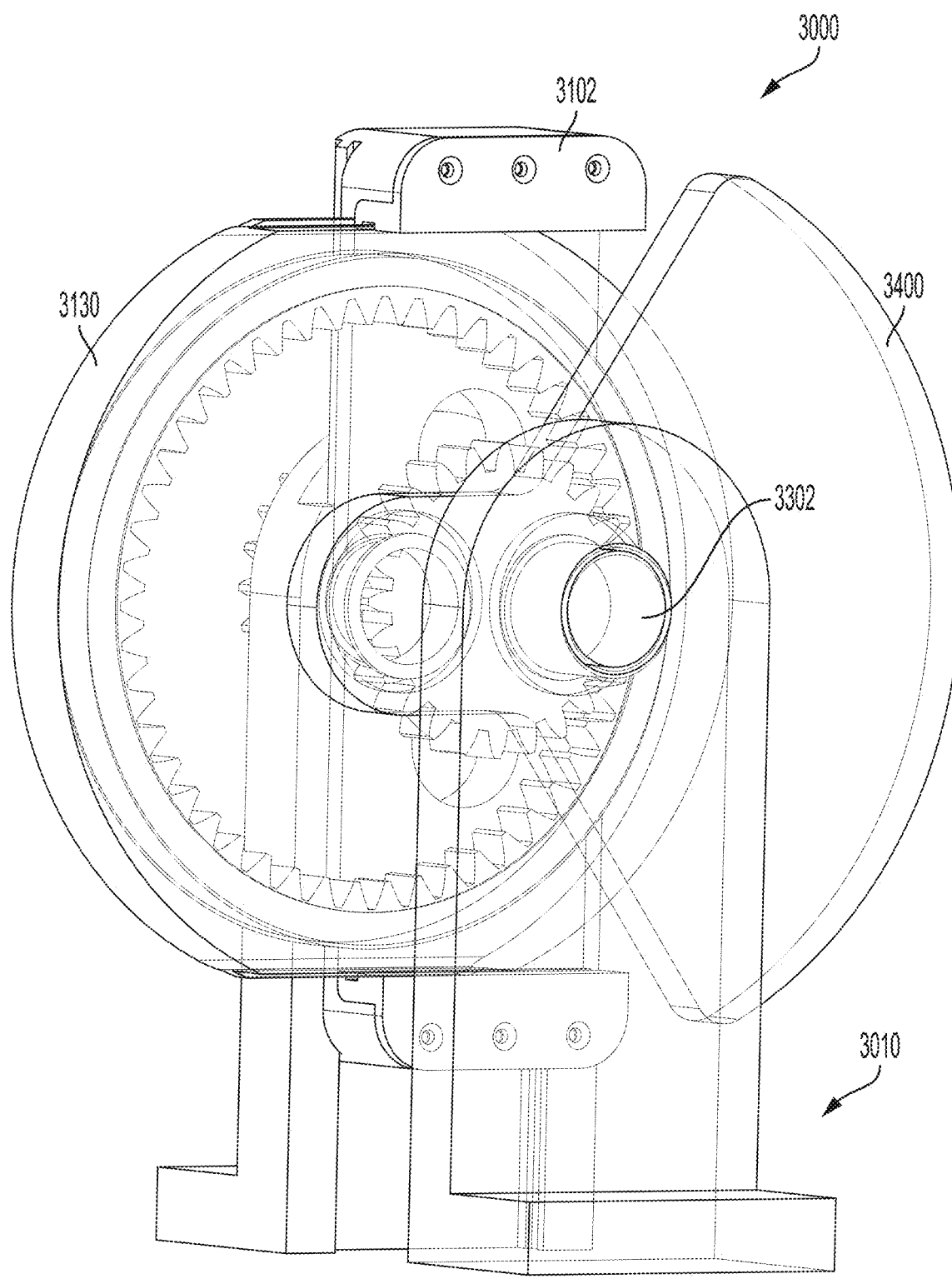
FIG. 21 is a perspective view of the example drive mechanism of FIG. 16, with details of the x-plate assembly and the interconnecting link shown as transparent for clarity, illustrating connections between the stationary shaft, orbital shaft, x-plate assembly, and interconnecting link.
Figure 35:
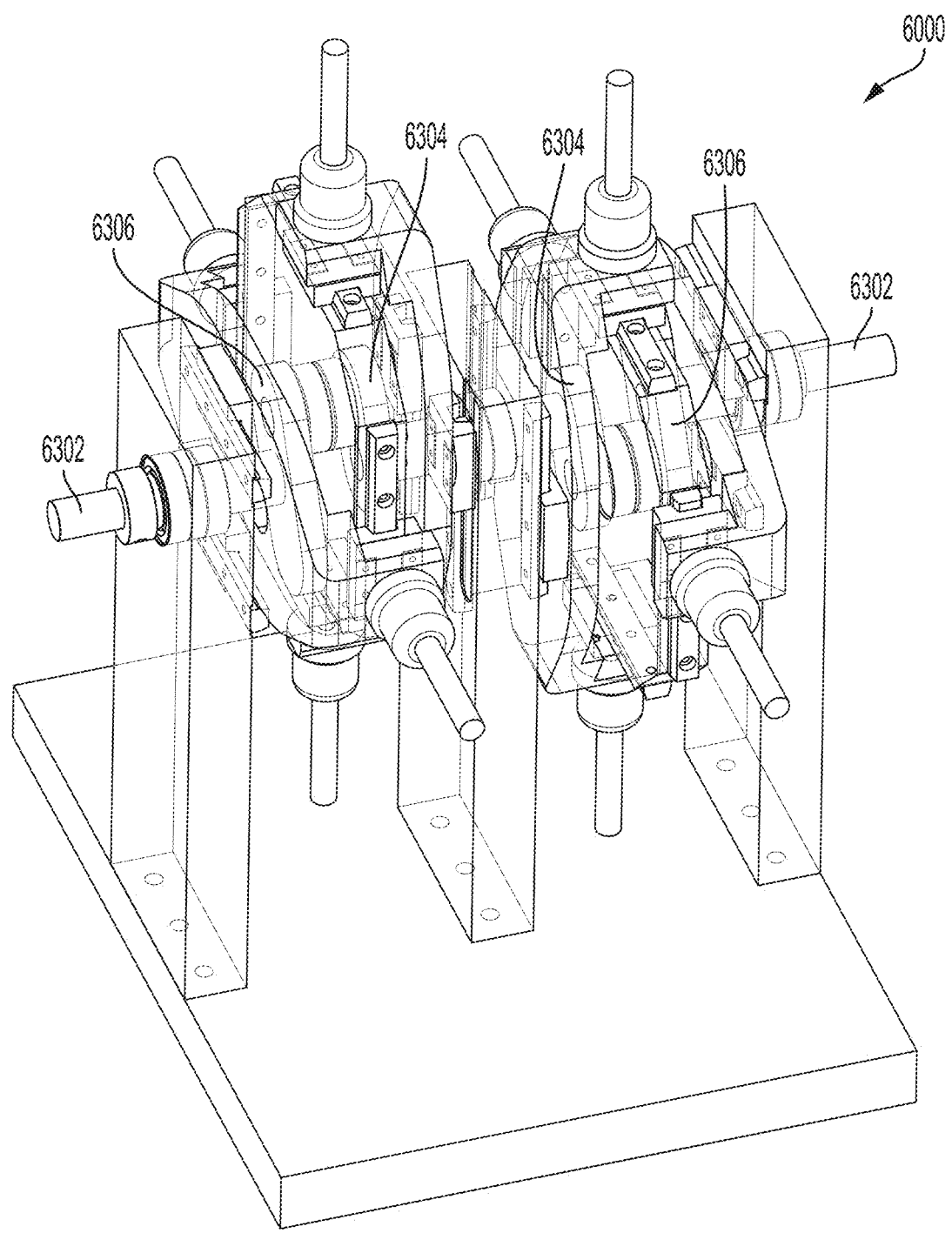
FIG. 35 is a perspective view of the example drive mechanism of FIG. 36, with the interconnected sets of x- and y-plate assemblies shown as transparent.
Figure 37:
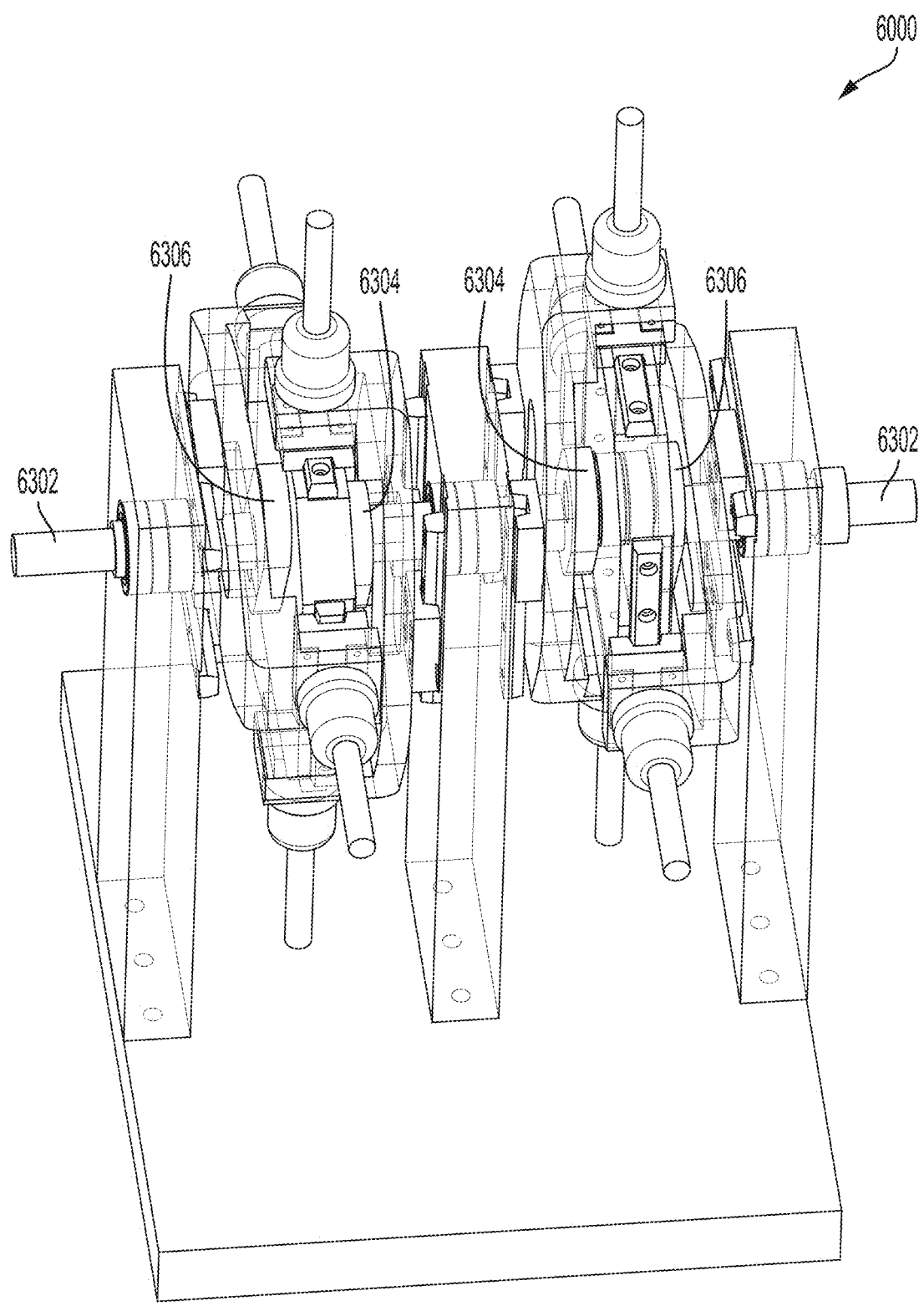
FIG. 37 is a perspective view of the example drive mechanism of FIG. 36, with the interconnected sets of x- and y-plate assemblies shown as transparent.
Figure 38:
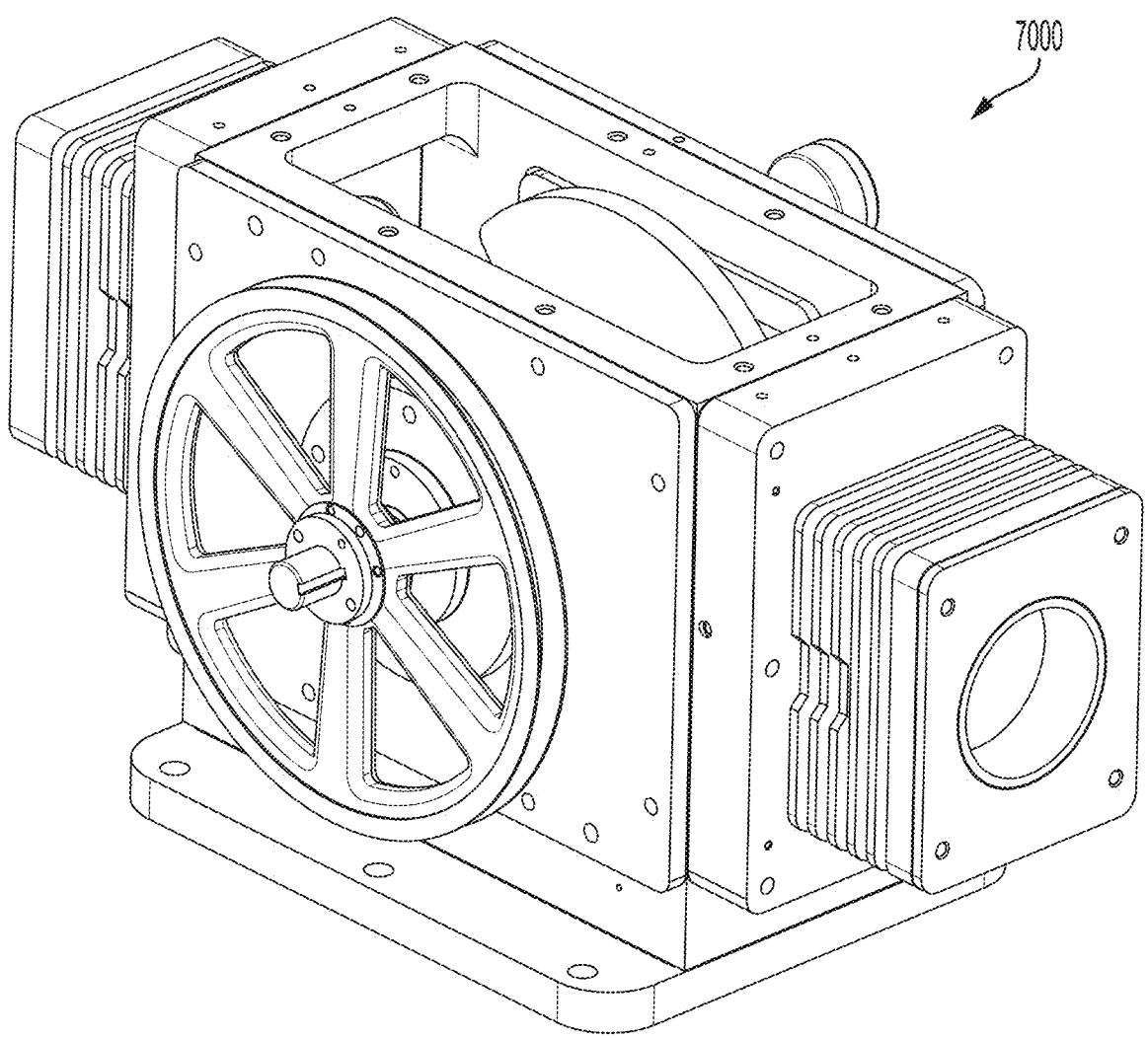
FIG. 38 is a perspective view of an example drive mechanism enclosed within an engine block.
Figure 39:
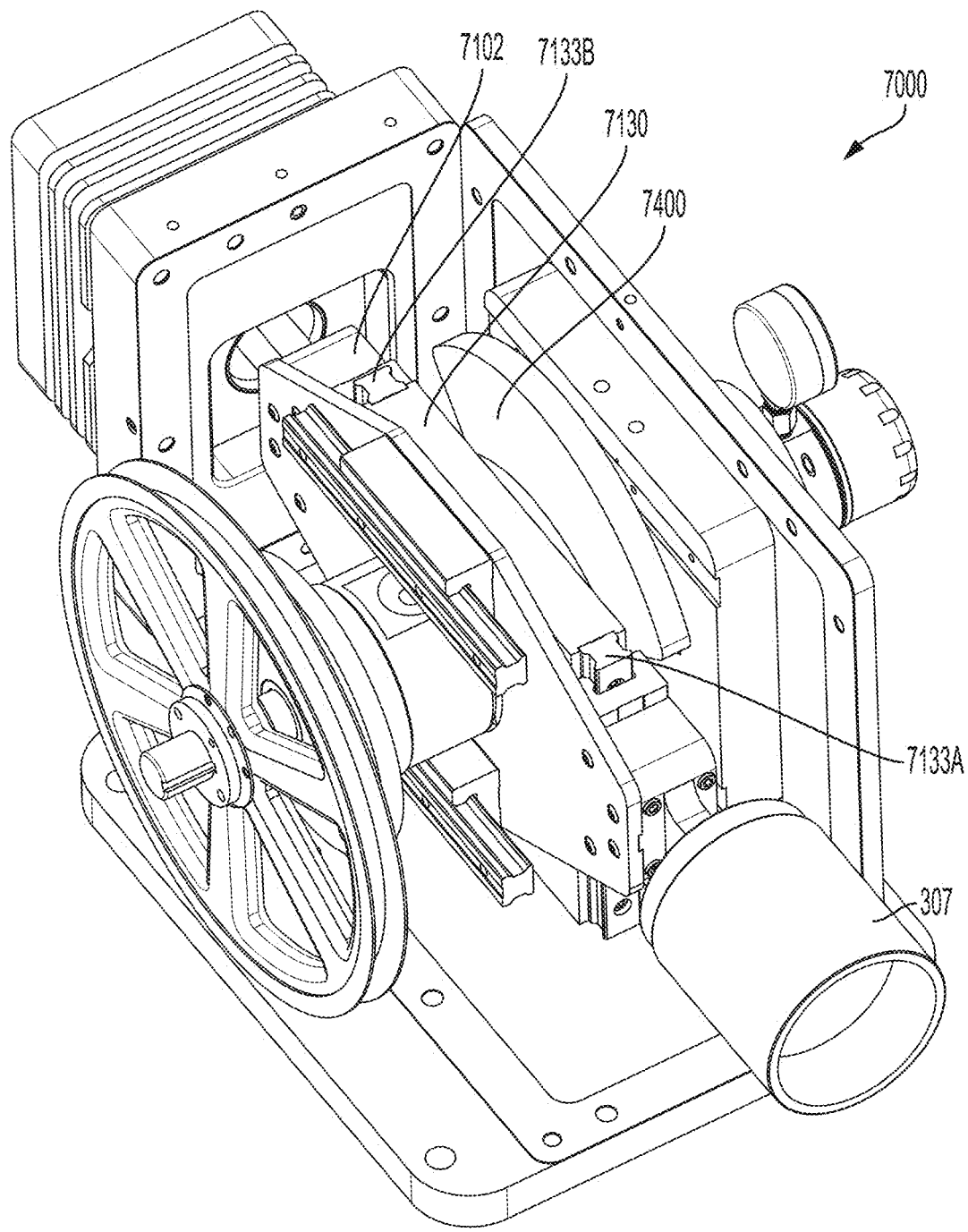
FIG. 39 is a perspective view of the example drive mechanism of FIG. 40 with portions of the engine block removed for clarity.
Figure 40:
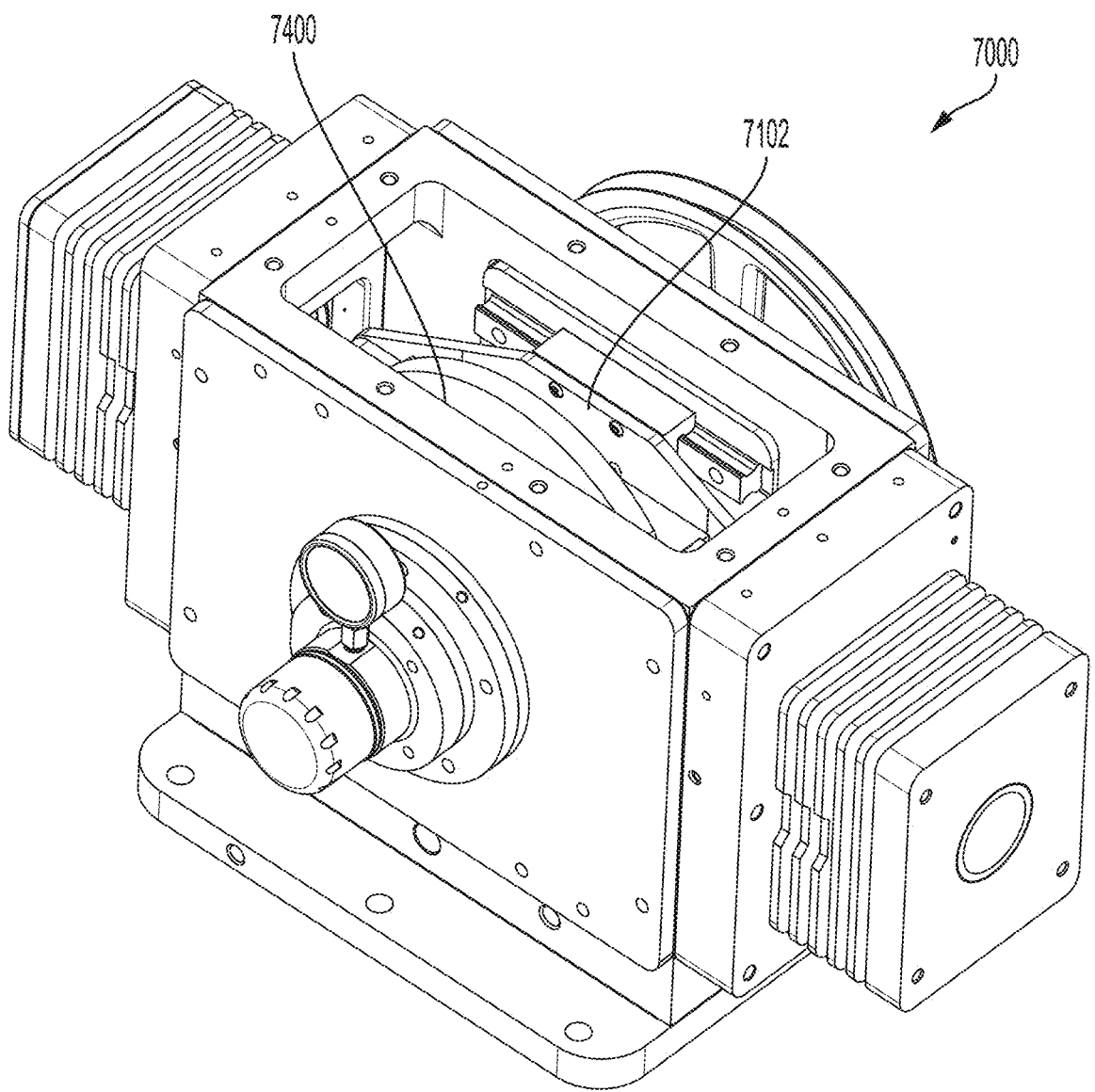
FIG. 40 is a perspective view of the example drive mechanism of FIG. 40 with portions of the engine block removed for clarity.
Figure 41:
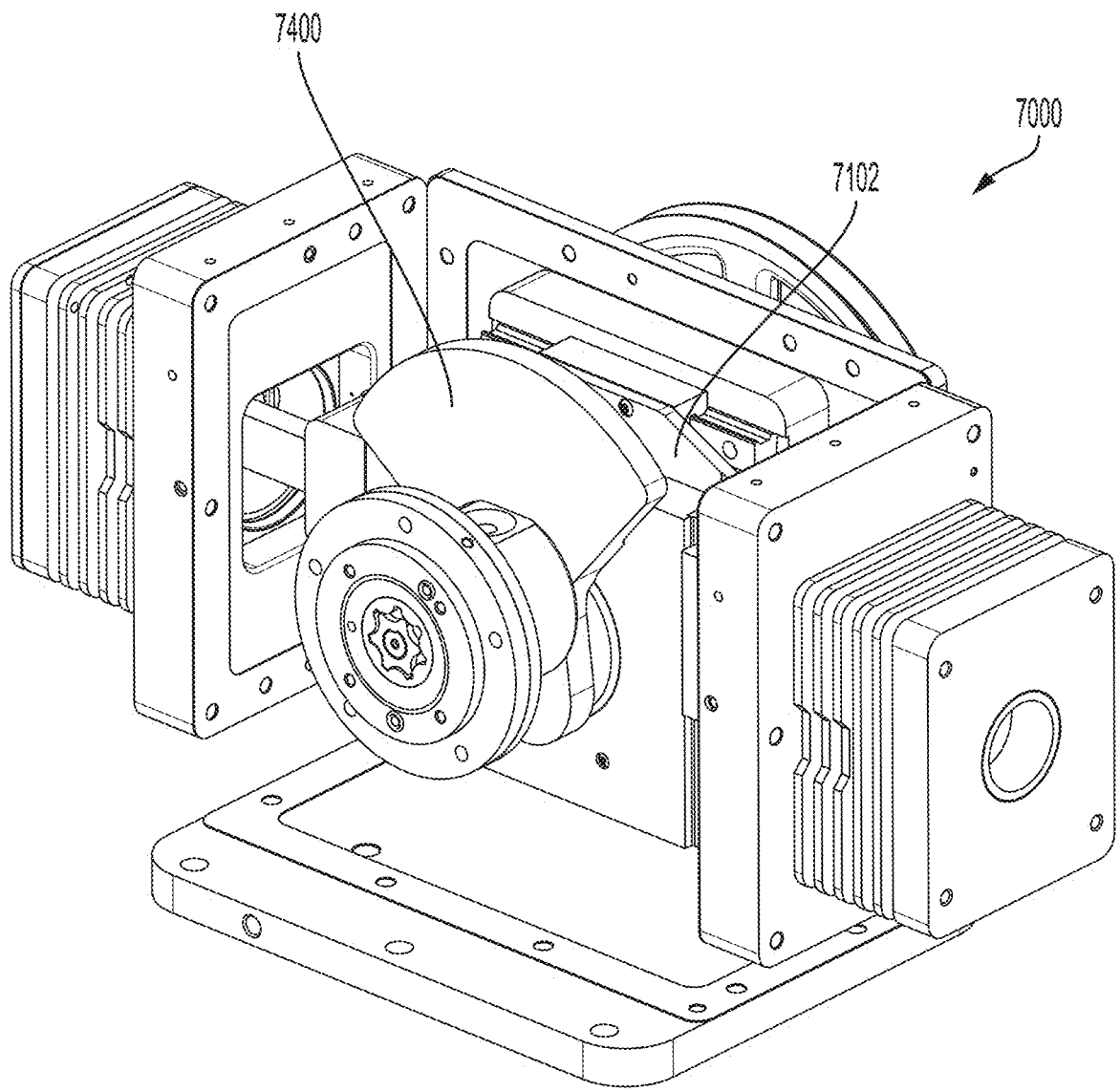
FIG. 41 is a perspective view of the example drive mechanism of FIG. 40 with portions of the engine block removed for clarity.

FIG. 13 is a plot of a calculation of example torques calculated for the tangent drive mechanism 1000 applied to an internal combustion engine, whose torque is depicted in FIG. 36, as compared to the example torque of a conventional crankshaft connecting rod mechanism applied to an internal combustion engine, whose torque is depicted in FIG. 35, both using the same pressure (force) as a function of angle, the same torque arm length, r=1.8", and for the case of the conventional crankshaft connecting rod engine a typical value for connecting rod length is used, l=5.78". Torque values are plotted for both x and y components and totals and plotted over the same 180 degrees of a power stroke. As can be seen in FIG. 37, the drive mechanism 1000 instantaneous torque is consistently greater than that of the crankshaft mechanism and the overall average torque for the drive mechanism 1000 is about 33% higher than that of the conventional crankshaft connecting rod mechanism. Also, apparent in FIG. 37 is the negative impact of the x-axis movement (e.g., away from and towards the central longitudinal axis of the piston) of the connecting rod of the crankshaft mechanism, where it has a negative impact on torque after 90 degrees. This effect of varying x-axis position is not present in the drive mechanism 1000.

Referring back to FIGS. 1-9, the output shaft 1302 can be connected to one or more additional drive train components depending on the desired implementation or field of use of the drive mechanism. As shown, in some embodiments, an output gear 1306 can be coupled to the output shaft 1302.

Figure 3:
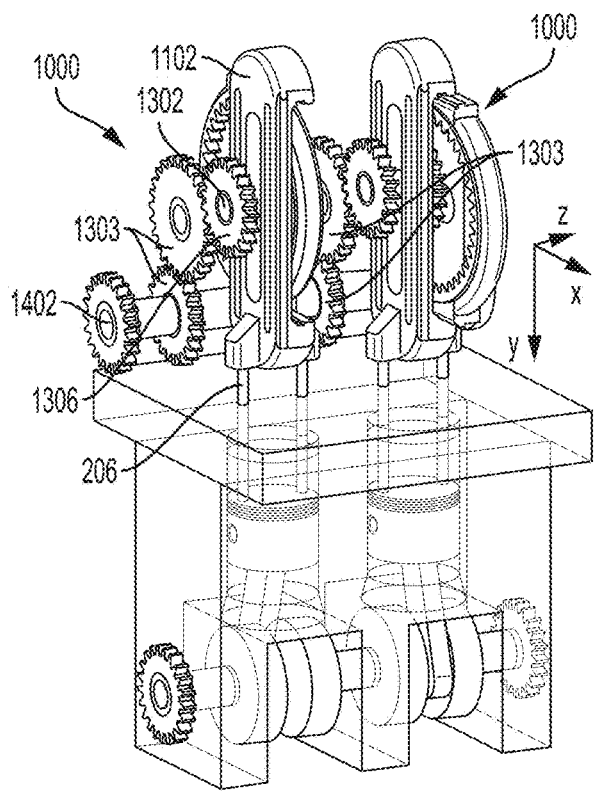
FIG. 3 is a perspective view of example drive mechanisms coupled to reciprocating pistons of an engine through their respective combustion chambers, illustrating each of the drive mechanisms coupled to a combined drive shaft.
Figure 4:
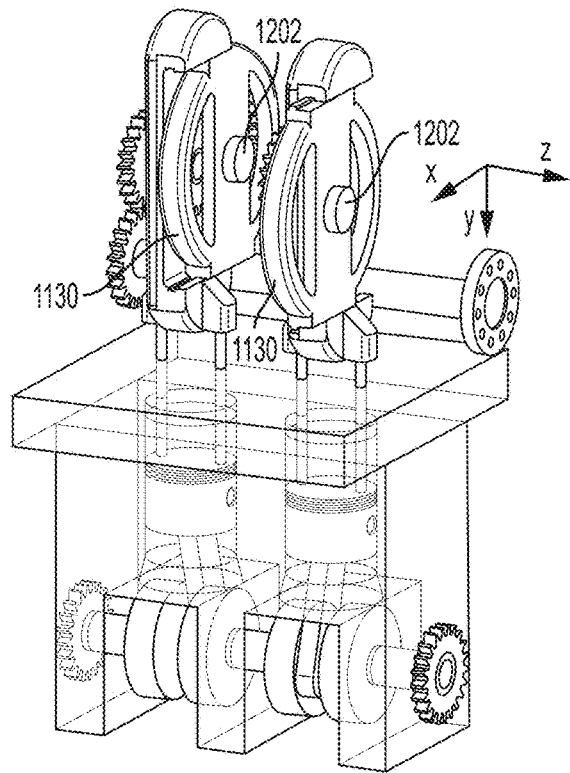
FIG. 4 is another perspective view of the example drive mechanisms and engine of FIG. 3 illustrating idler assembly portions of respective x-axis components.

As discussed herein, the drive mechanisms that convert reciprocating axial motion into a substantially continuous radial motion can be used in a variety of different applications. For example, the drive mechanism 1000 can be implemented and used in a similar manner as the power delivery device 400 to interface with an internal combustion engine. In some embodiments, tension devices (e.g., pull rods) can axially couple the frame 1102 to the reciprocating piston in a similar manner as the pull rods 206 discussed above. An example implementation is depicted in FIGS. 3 and 4. For clarity, the example shown in FIGS. 3 and 4 is illustrated with the base 1010, onto which the complementary feature 1204 is typically mounted, removed to provide an unobstructed view of the drive mechanisms. However, the base could be manufactured into separate components that attach to the engine or into the structure that couples the drive mechanisms 1000 to the engine block.

As shown in FIGS. 3 and 4, multiple drive mechanisms 1000 can be used together where the respective output shafts 1302 are mechanically coupled to a combined drive shaft 1402. Any of various devices can be used to drive the combined drive shaft 1402 with the individual output shafts 1302, such as belts and pulleys, chains and sprockets, gears, etc. The examples illustrated include a gear set 1303 to connect the drive mechanisms (e.g., the output gear) 1306 to the combined drive shaft 1402. As discussed above, while power can be extracted from the engine using the drive mechanisms 1000 and combined drive shaft 1402, the engine can include a crankshaft and connecting rods, which can serve to facilitate reciprocating of the pistons and return the pistons to top dead center. In some embodiments, the multiple drive mechanisms can be coupled together in a manner that does not require geared components, e.g., through the use of shafts or links that couple each of the components together and to the drive shaft itself.

Figure 7:
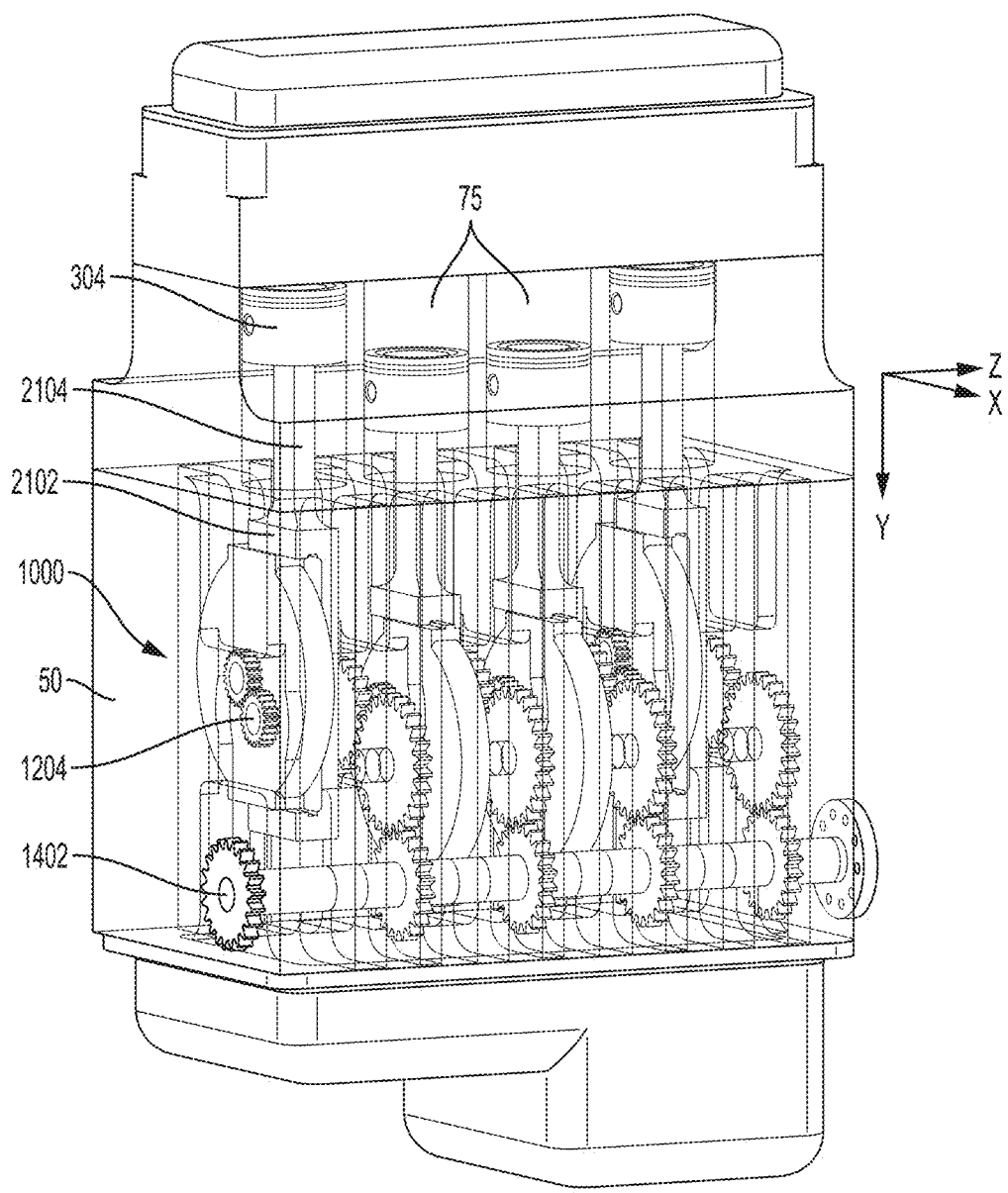
FIG. 7 is a perspective view of an example internal combustion engine using example drive mechanisms in place of a conventional crankshaft mechanism.
Figure 8:
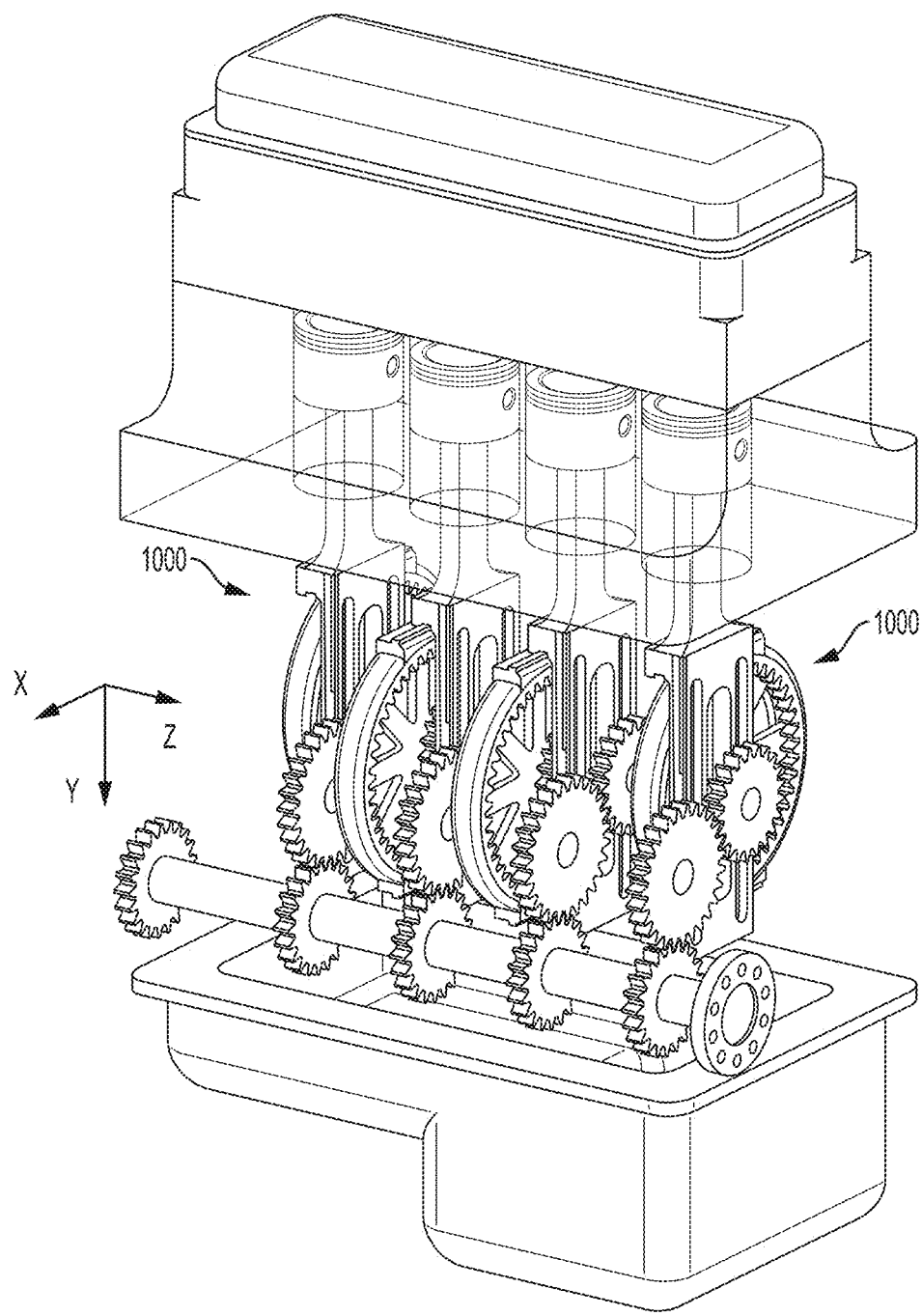
FIG. 8 is another perspective view of the example engine of FIG. 7 with the engine block removed for clarity, illustrating connections between the drive mechanism and a drive shaft.

Drive mechanisms, such as those described above as drive mechanism 1000, can additionally or alternatively be implemented to replace conventional crankshaft and connecting rod systems to delivery internal combustion engine power to a rotating drive shaft. As illustrated in FIGS. 7 and 8, rather than connecting to a piston using a pull rod device disposed through a combustion chamber, the drive mechanism 1000 can be disposed within an engine block 50 between a piston and a drive shaft 1402. For example, a frame 2102 can be coupled directly to a piston 304 within the block 50 of an engine opposite the combustion chamber 75 in place of a conventional connecting rod. As illustrated, the frame 2102 can be designed and structured similar to a connecting rod having a beam-like neck portion 2104 that connects to the piston, for example, using a wrist pin or similar connection.

In some embodiments, the block 50 can serve as the base to which the drive mechanism 1000 can be connected (e.g., fastened, coupled). Specifically, the complementary feature 1204 can be mounted in the engine block 50, for example, in a manner similar to which crankshafts are mounted in conventional engines, for example, using journals and bearings. For clarity, the example in FIG. 7 has been illustrated with a transparent engine block 50 and FIG. 8 has been illustrated without the engine block 50 to clearly show the drive mechanisms 1000.

Since the drive mechanisms 1000 are disposed within the engine block 50 in these embodiments, other top end components of the engine, such as the, air intake, heads, valving, fuel injection, and ignition (e.g., spark plugs or compression ignition) could remain similar or essentially the same as used in other conventional internal combustion engines.

Figure 9:
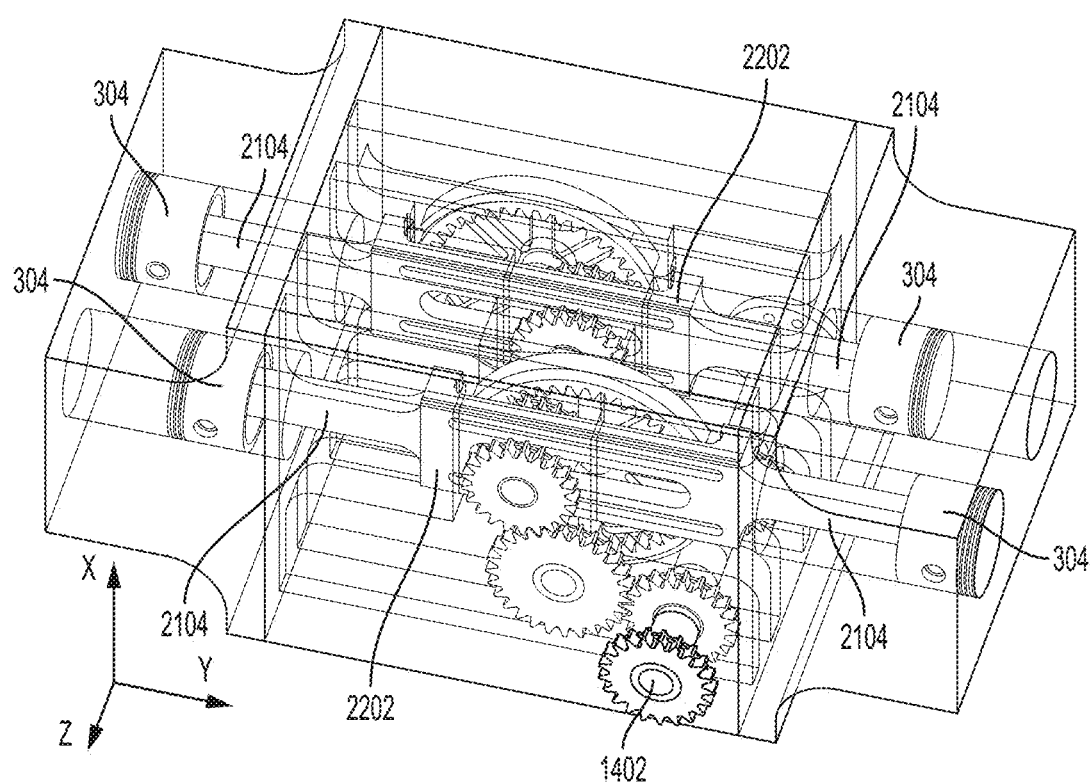
FIG. 9 is a perspective view of an example internal combustion engine having drive mechanisms in place of a conventional crankshaft, where each drive mechanism is coupled to two opposing reciprocating pistons.

Other implementations of the drive mechanism are possible. In some embodiments, a modified internal combustion engine can include drive mechanisms that are each coupled to two opposing pistons that reciprocate with one another. For example, referring to FIG. 9, an engine can include one or more drive mechanisms that include a frame 2202 that is directly connected to two pistons 304, wherein the path of motion of the pistons and the frame is generally in-line with one another. For clarity, the engine block in FIG. 9 is shown as transparent. The frame 2202 can include two opposing beam-like neck portions 2104 at opposing ends that connect to the pistons, for example, using wrist pins or similar connections. The alternating reciprocation of two pistons 304 connected to the frame 2202 can result in consistent, alternating motion of the frame 2202 to provide consistent motion of the x-axis component 1130 around the pinion gear 1304 helps to apply a force to the pinion gear 1304 that maintains a consistent moment arm throughout the reciprocation of the piston. This type of engine with opposing pistons can sometimes be referred to as a flat engine, boxer engine, or a horizontally opposed engine. In this opposed piston configuration only one frame 2202 is required for two pistons so that the overall parts count of the engine can be reduced.

A typical maximum moment arm length for conventional reciprocating engines would be the crankshaft radius or half the engine stroke; however, this may vary for various engine designs. Because conventional reciprocating engines typically have a torque moment arm length that varies from 0 length (at crankshaft angles of 0 degrees and 180 degrees ATDC) to its maximum length (at a crankshaft angle of 90 degrees ATDC), any moment arm length that varies less than this range (i.e., 0 to maximum) is expected to be an improvement for torque generation. For example, in some cases, the consistent length moment arm devices described herein can vary from about 0% to about 50% change in length (e.g., about 0% to about 40%, about 0% to about 30%, about 0% to about 20%, about 0% to about 15%, about 0% to about 10%, about 0% to about 5%, about 0% to about 2%, about 0% to about 1%, about 0% to about 0.5%, about 0% to about 0.1%, about 0% to about 0.0001%) as the pull rod reciprocates with the pistons and an improvement would be realized and noticed.

It is noted that these descriptions and geometric relationships are generally described herein for a substantially vertically aligned cylinder arranged above the centerline (e.g., axis) of the crankshaft. However, the principles described herein can also be implemented using differently configured reciprocating engines. That is, the equations presented herein that are used to describe the differences between extracting power from a crankshaft and extracting power from a separate power delivery device (e.g., drivetrain) having a constant length moment arm can be adjusted or updated based on a particular engine configuration, but the increased output of the constant moment arm engine is expected to be observed with the differently configured engines.

Additionally, while the examples herein generally relate to implementations of the drive mechanisms in which they are used to harness linear motion and convert it to rotational motion of an output shaft, other examples are possible. For example, in some cases, drive mechanisms, such as those described above as drive mechanism 1000, can additionally or alternatively be implemented to replace conventional crankshaft and connecting rod systems of reciprocating pumps and compressors. As one skilled in the art would appreciate, in such cases, the basic components of the drive mechanism 1000 could be used but convert the rotational input of a rotating shaft into a reciprocating motion of a piston assembly. Therefore, the output assembly described above (e.g., the output shaft assembly 1300) would instead serve as an input shaft assembly. Similarly, the output pinion gear 1304 would serve as an input pinion gear. In such cases, an increase in torque transfer from a driving pinion gear 1304 to a driven piston assembly through mechanism 1000 would tend to increase overall mechanical efficiency.

In some embodiments, it can be advantageous to include one or more balancing components to counteract the effects of undesired vibrational forces in the drive mechanism. As depicted in FIGS. 14-23, an oscillating assembly of the drive mechanism can include y-plate assembly 3102 (corresponding to y-axis component 1102) and an x-plate assembly 3130 (corresponding to x-axis component 1130) that is configured to interface with and move along the x-axis relative to, the y-plate assembly, as further described herein above. The oscillating assembly of the drive mechanism can include a base 3010 (corresponding to base 1010) to serve as a mounting and positioning surface for other components of the drive mechanism, as further described herein above. X-plate assembly 3130 includes internal ring gear 3132 (corresponding to outer engaging device 1132) that is configured to interface with pinion gear 3304 (corresponding to rotating pinion gear 1304), which is coupled to an output shaft (corresponding to output shaft 1302). Reference numerals throughout the example drive mechanisms shown in FIGS. 14 through 23 should be understood to refer to corresponding components in FIGS. 1 through 13 that are delineated by corresponding reference numerals, and such components should be considered to serve the same purpose and/or function and to be interchangeable across each of the embodiments.

The drive mechanism can further include an interconnecting link, depicted in FIGS. 14-23 as engagement rotor or interconnecting link 3400. Interconnecting link 3400 includes stationary shaft 3302 rotatably attached to base 3010 via a bushing, bearing, or other suitable connection means, e.g., roller bearings or ball bearings, that permits stationary shaft 3302 to be retained in place in base 3010 while still being permitted to rotate about its axis of rotation. Interconnecting link 3400 includes orbital shaft 3404 rotatably attached to x-plate assembly 3130 via a bushing, bearing, or other suitable connection means, e.g., roller bearings or ball bearings, that permits orbital shaft 3404 to be restrained from axial motion in x-plate assembly 3130 while still being permitted to rotate about its axis of rotation.

The center of rotation of interconnecting link 3400 is around stationary shaft 3302 with its axis of rotation along the central axis of stationary shaft 3302. In some embodiments, the centerline of internal ring gear 3304 and orbital shaft 3404 are coincident at the axis of rotation of the orbital ring shaft. In some embodiments, the axis of rotation of x-plate assembly 3130 is coincident with the axis of rotation of the stationary shaft 3302. The axis of rotation of the orbital shaft is off-set a distance from the stationary shaft's axis of rotation. In some embodiments, the off-set distance of the axes of rotation of the orbital shaft and the stationary shaft is substantially equal to one-half of the pitch diameter of the driving pinion gear 3304. That fixed relationship between the two shafts ensures the correct engagement and positional alignment between internal ring gear 3132 and pinion gear 3304.

Interconnecting link 3400, together with stationary shaft 3302 and orbital shaft 3304, can permit proper engagement of the component parts of the drive mechanism, for example of internal ring gear 3132 and pinion gear 3304. In this manner, proper engagement of internal ring gear 3132 and pinion gear 3304 can be accomplished without the use of gears or rollers (e.g., orbital engagement component 1202 and stationary engagement component 1204 as shown in, e.g., FIG. 1).

In some embodiments, x-plate assembly 3130 is symmetrical in the X-Y plane and the center of mass of x-plate assembly 3130 is located at the centerline of internal ring gear 3132, i.e. in the center of x-plate assembly 3130 in the X-Y plane. In some embodiments, interconnecting link 3400 has the same equivalent weight as that of x-plate assembly 3130.

During operation of the drive mechanism, x-plate assembly 3130 makes an orbiting motion around stationary shaft 3302, as further described herein above. The motion of x-plate assembly 3130 drives the motion of interconnecting link 3400. The motion of interconnecting link 3400 is driven by, and follows in the same direction as, the motion of x-plate assembly 3130.

The center of mass of interconnecting link 3400 is preferably placed at exactly the counterbalancing center of mass distance from the unbalanced force. For example, as shown in FIGS. 14-23, the center of mass of interconnecting link 3400 is placed at a fixed from the the axis of rotation of stationary shaft 3302. FIGS. 14-23 depict an embodiment where x-plate assembly 3130 (and x-plate assembly 4130, in the case of drive mechanism 4000) and interconnecting link 3400 (and interconnecting link 4400 in the case of drive mechanism 4000) have an equivalent mass, and the center of mass of x-plate assembly 3130 (and 4130) is located at the centerline of internal ring gear 3132 (and 4132). Those conditions permit the distance between the axis of rotation of stationary shaft 3302 and the axis of rotation of orbital shaft 3304 to be equal to the distance between the axis of rotation of stationary shaft 3302 and the center of mass of interconnecting link 3400. The same is true for example drive mechanism 4000, as depicted.

In some cases, the masses of x-plate assembly 3130 and interconnecting link 3400 may not be equivalent. It is nevertheless possible to implement interconnecting link 3400 to counteract and balance forces created by the reciprocating motion of x-plate assembly 3130 by ensuring that the center of mass of interconnecting link 3400 is disposed an appropriate distance away from the axis of rotation of stationary shaft 3302 and follows the same path of the center of mass of x-plate assembly 3130 but at a position in the X-Y plane so as to cancel out the effects of forces generated by the motion of x-plate assembly 3130. In this manner, the center of mass of the rotating assemblies (e.g., both x-plate assembly 3130 and interconnecting link 3400) can be caused to be located at their collective center of rotation (e.g., along the central axis of rotation of stationary shaft 3302) to reduce or eliminate undesired vibrational forces in the system.

In some embodiments, idler (e.g., engagement) assembly 1200, including orbital engagement component 1202 and stationary engagement component 1204 can be used for the function of ensuring proper engagement between internal ring gear 3132 and pinion gear 3304, while interconnecting link 3400, e.g., a counterweight rotor, can be used as a counterbalance to x-plate assembly 3130, as described above.

In some embodiments, interconnecting link 3400 can be disposed in the Y-Z plane as near to x-plate assembly 3130 as machine tolerances will permit. More specifically, the distance in the Y-Z plane of the center of mass of interconnecting link 3400 in the X-Y plane and the center of mass of x-plate assembly 3130 in the X-Y plane is advantageously minimized. Force generated from the motion of x-plate assembly 3130 and interconnecting link 3400 about the stationary shaft's axis of rotation can generate a couple about stationary shaft 3302 along its axis of rotation. The forces generated by the motion of x-plate assembly 3130 and interconnecting link 3400 is expected to be equal in magnitude where the masses of x-plate assembly 3130 and interconnecting link 3400 are equivalent. In that scenario, the magnitude of the moment couple created by those forces is equal to the magnitude of the force generated by either of the components multiplied by the distance between the components ($M=F*d$).

As a result, minimizing the distance between those centers of mass in the Y-Z plane can reduce the effects of moment couple that are formed as a result of the reciprocation of x-plate assembly 3130 and interconnecting link 3400. Where the magnitude of the couple generated as a result of the motion of x-plate assembly 3130 and interconnecting link 3400 is large in magnitude, the magnitude of undesirable vibrations in the drive mechanism can be correspondingly large in magnitude. Conversely, where the magnitude of the couple generated as a result of the motion of x-plate assembly 3130 and interconnecting link 3400 are small in magnitude, the magnitude of undesirable vibrations in the drive mechanism can be correspondingly small in magnitude. In some embodiments, the entire interconnecting link 3400 can be disposed closer to x-plate assembly 3130 in order to reduce a generated moment. In other embodiments, interconnecting link 3400 be shaped in such a manner as to cause its center of mass to be closer to the center of mass of the x-plate assembly 3130 along the Y-Z plane, for example by making a portion or section of interconnecting link 3400 protrude toward x-plate assembly 3130.

In some embodiments, the magnitudes of the forces created by motion of x-plate assembly 3130 and interconnecting link 3400 can be unbalanced. In that circumstance, the imbalance of those forces would still create a moment about the axis of rotation of stationary shaft 3302. In the manner described above, the magnitude of that moment can be advantageously reduced by assuring that the center of mass of interconnecting link 3400 is as close to the center of mass of x-plate assembly 3130 in the Y-Z plane as possible.

In some aspects, the drive mechanism can include pistons. Pistons can be implemented along with interconnecting link 3400 (or interconnecting link 4400), in the same manner as described, e.g., with reference to FIGS. 14-23 and the corresponding description herein above. In some embodiments, pistons attached directly to the y-plate assembly of the drive mechanism, including, for example, as described with respect to FIGS. 7-9. The alternating reciprocation of the two pistons can result in consistent, alternating motion to provide consistent motion of x-plate assembly 3130 around pinion gear 3304, maintaining a consistent moment arm throughout the reciprocation of the pistons.

Figure 22:
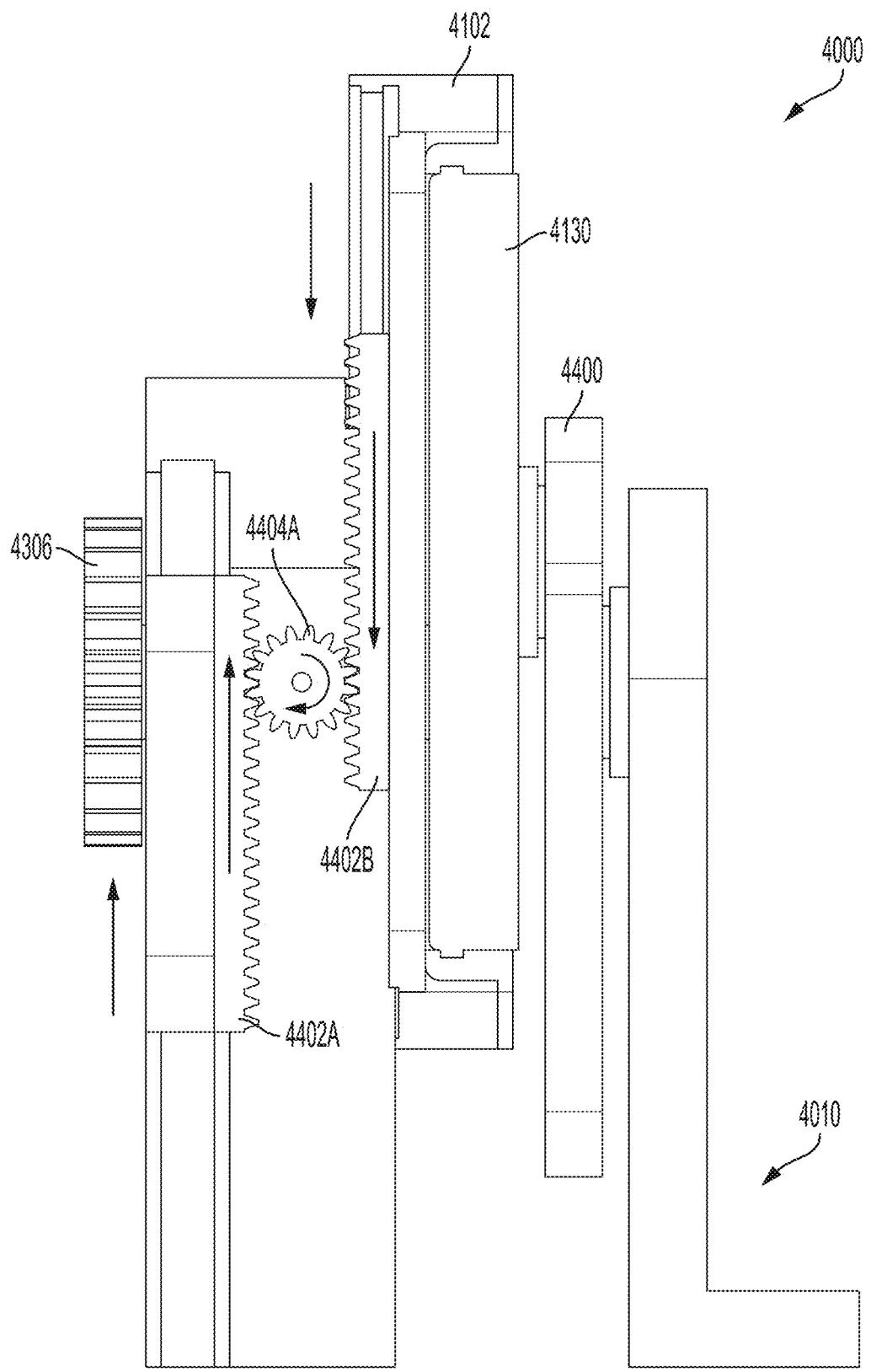
FIG. 22 is a side elevation view of an example drive mechanism, illustrating connections between the y-plate assembly and a y-plate counterweight.
Figure 23:
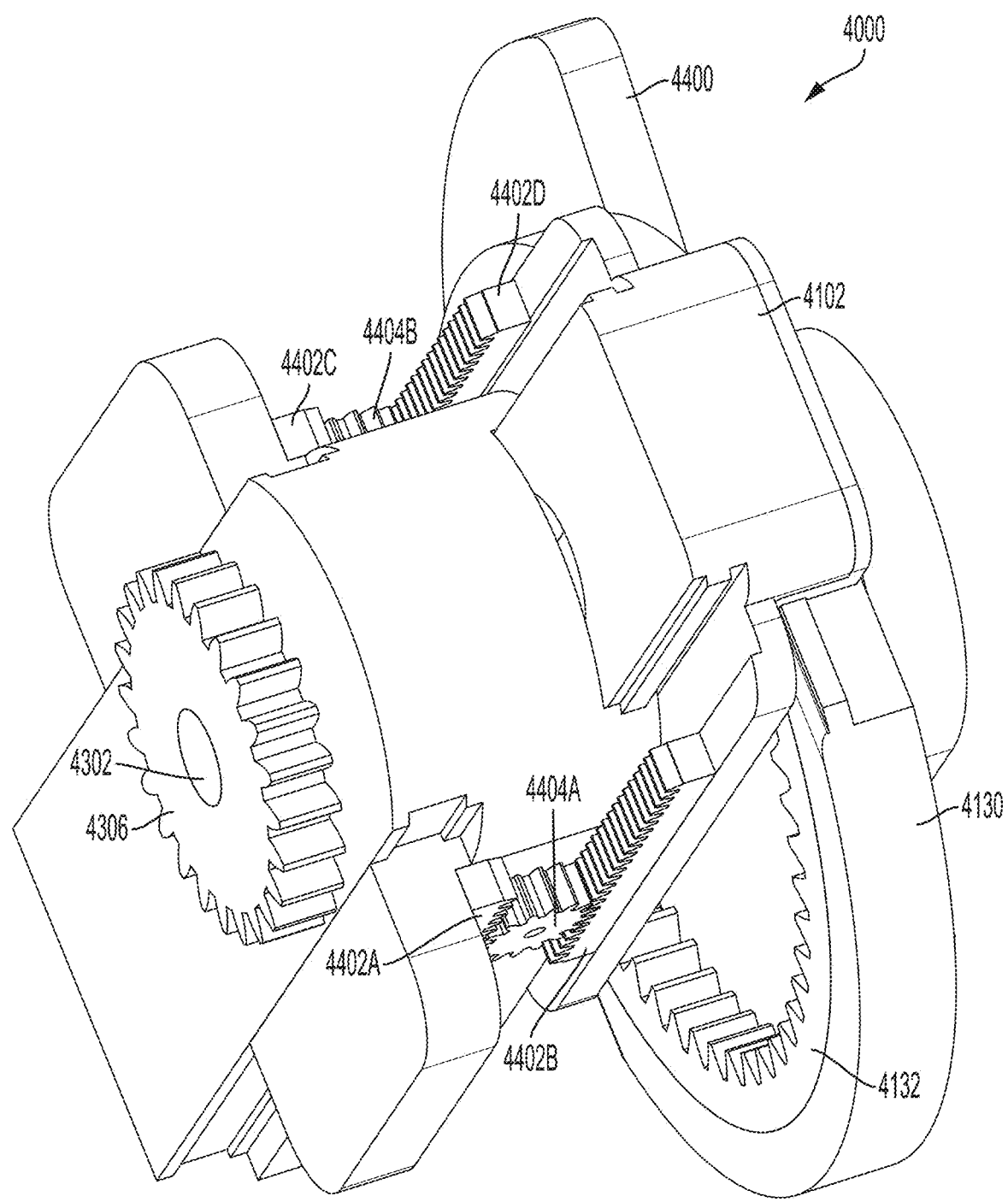
FIG. 23 is a perspective view of the example drive mechanism of FIG. 22, illustrating connections between the y-plate assembly and a y-plate counterweight.
Figure 24:
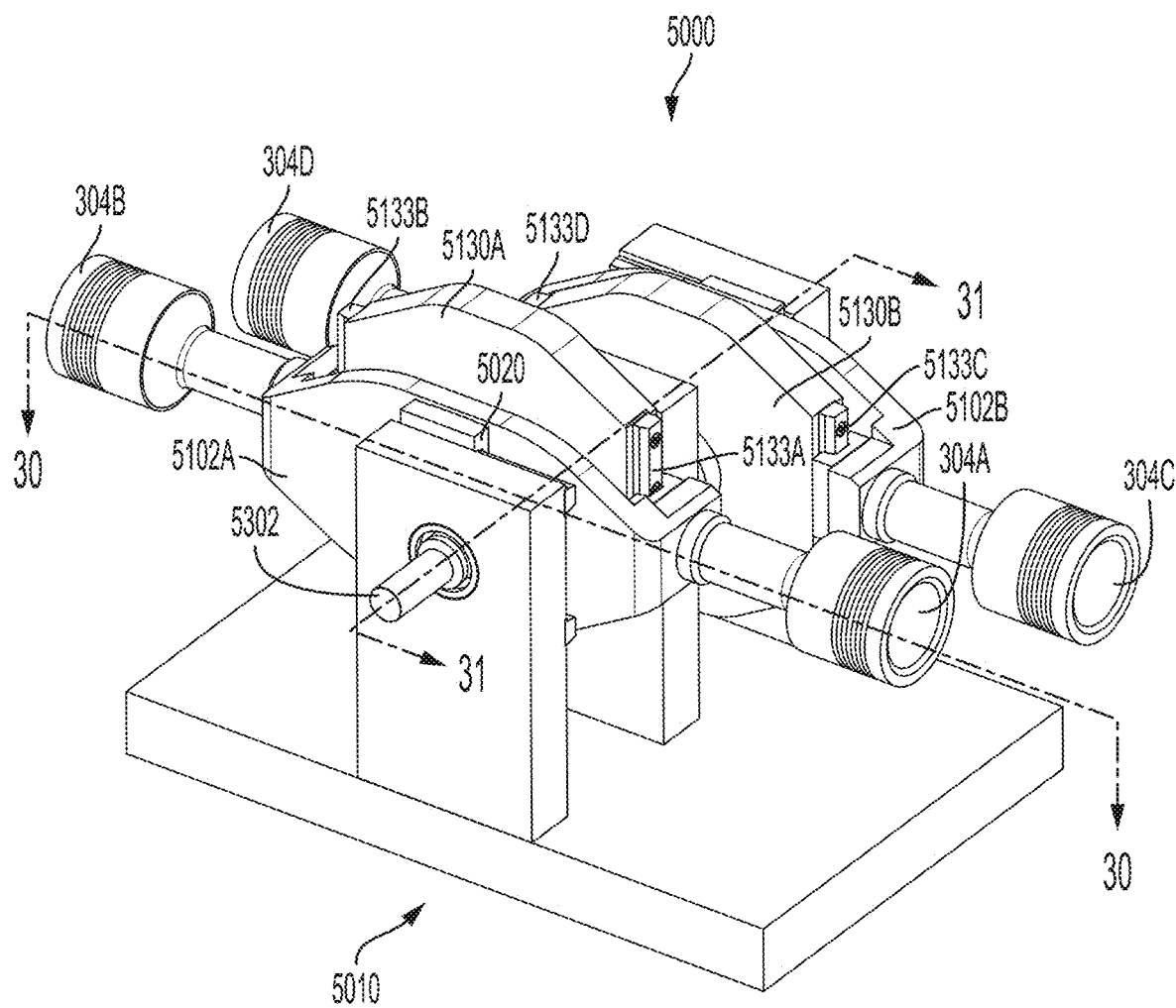
FIG. 24 is a perspective view of an example drive mechanism illustrating an embodiment with two interconnected sets of x-plate and y-plate assemblies.
Figure 25:
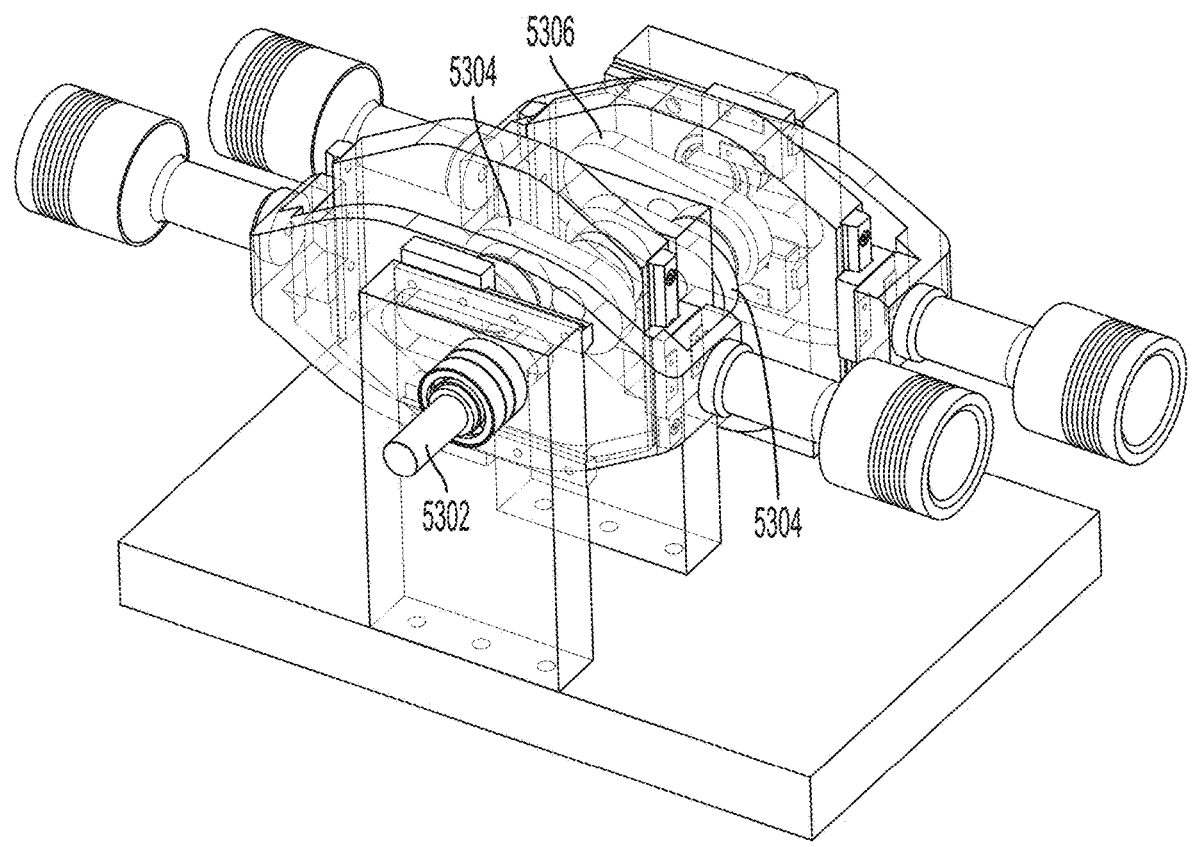
FIG. 25 is a perspective view of the example drive mechanism of FIG. 26 showing portions of the y-plate and x-plate assemblies as transparent.
Figure 26:
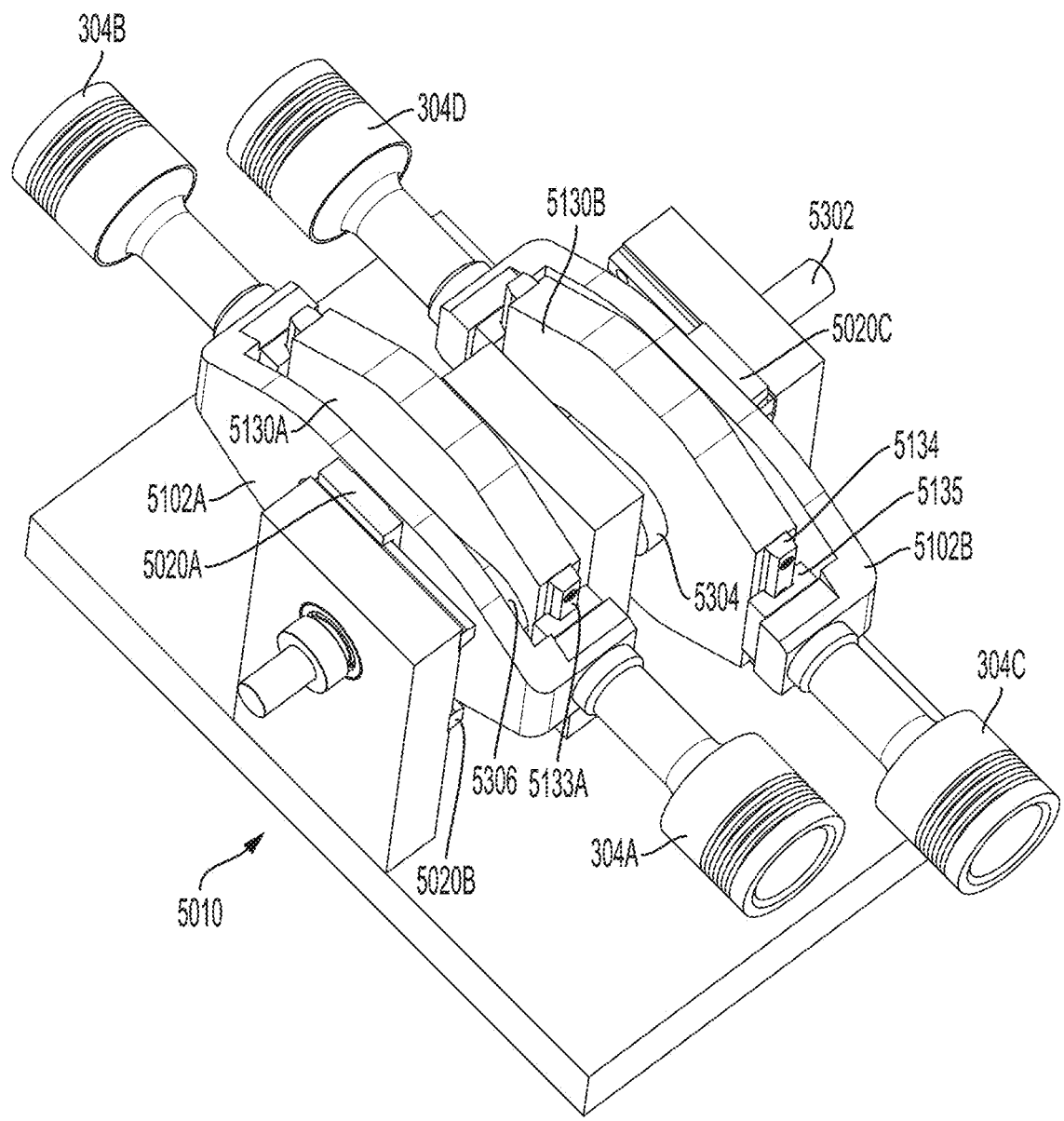
FIG. 26 is a perspective view of the example drive mechanism of FIG. 26.
Figure 27:
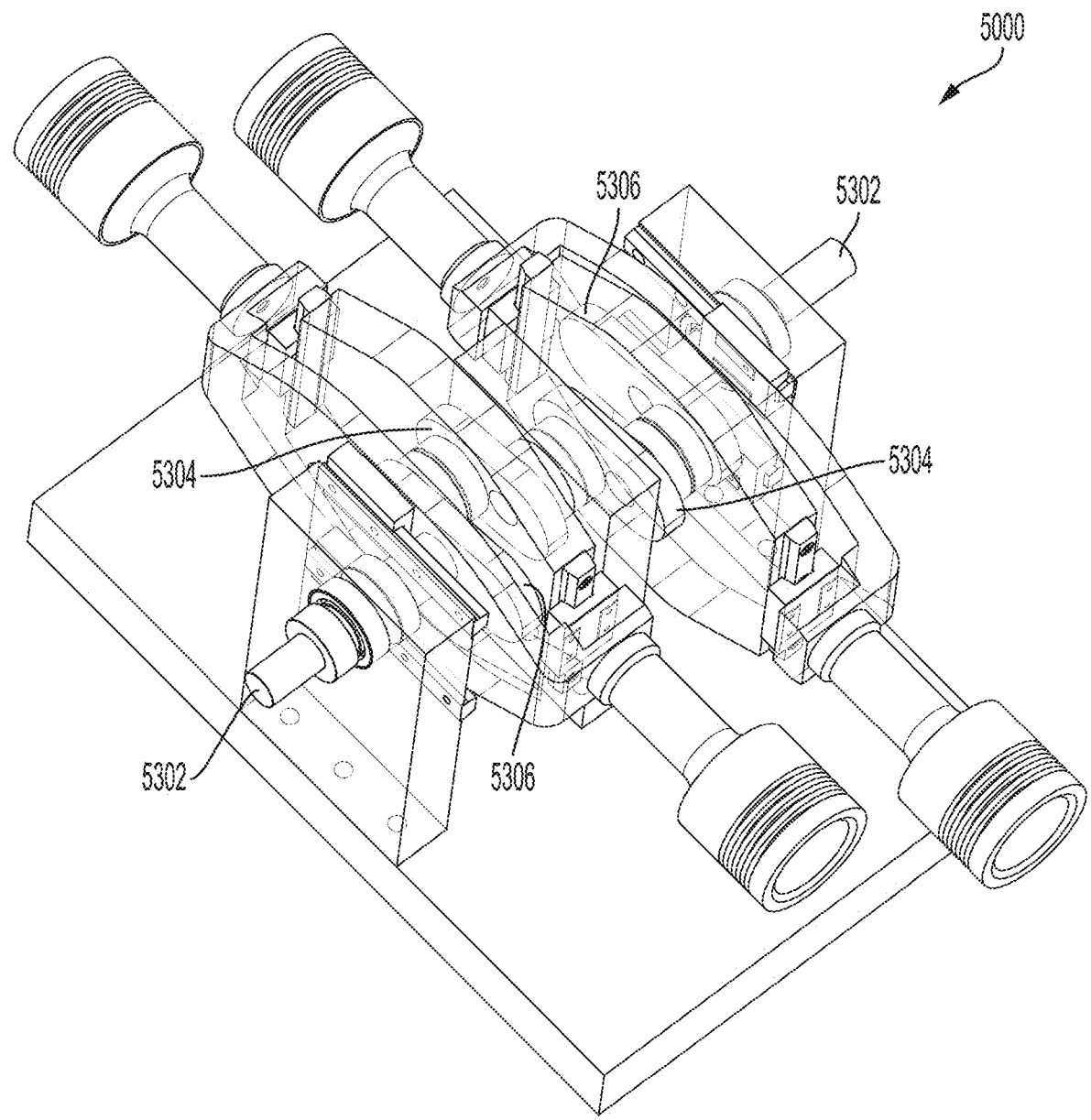
FIG. 27 is a perspective view of the example drive mechanism of FIG. 26 showing portions of the y-plate and x-plate assemblies as transparent.
Figure 28:
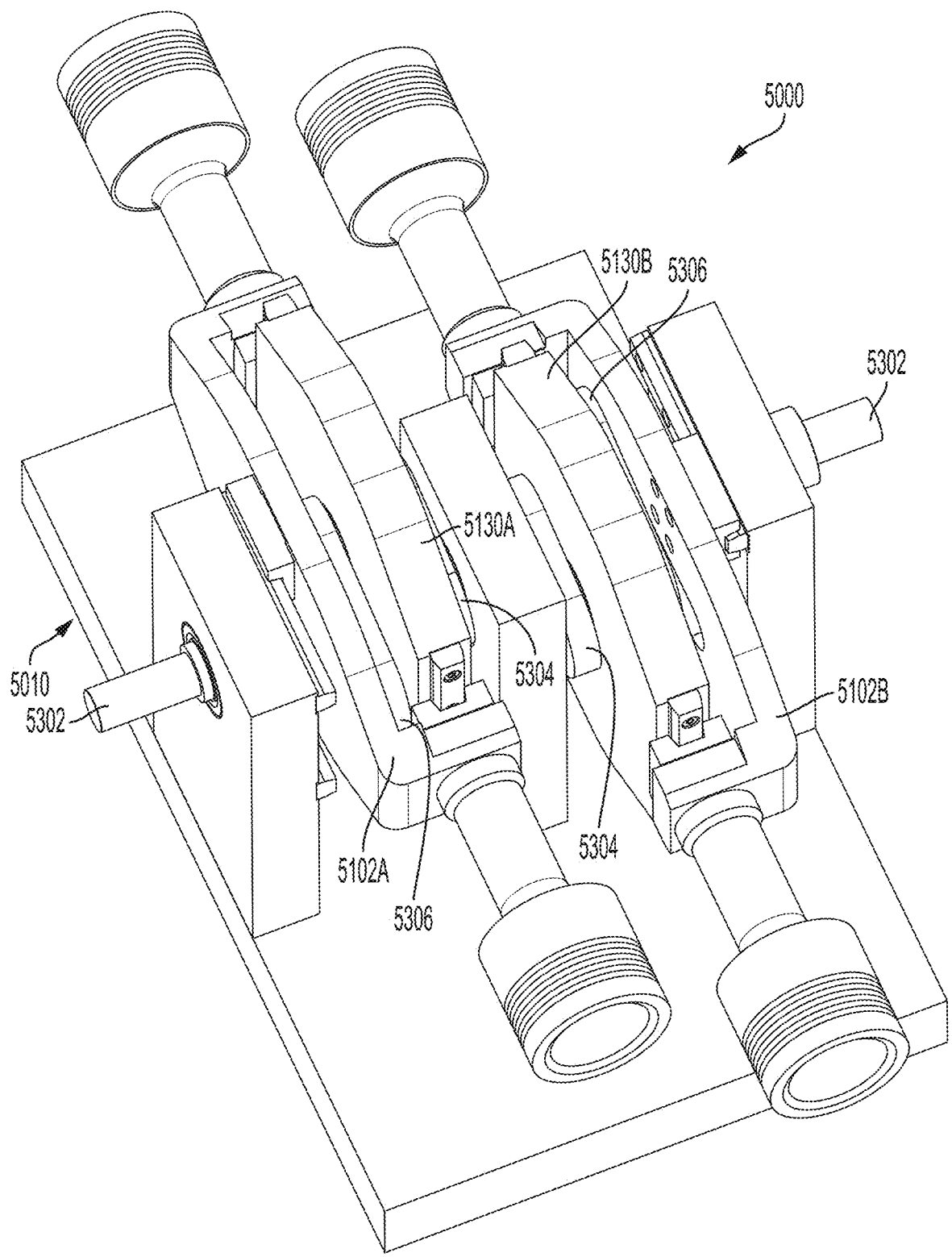
FIG. 28 is a perspective view of the example drive mechanism of FIG. 26.
Figure 29:
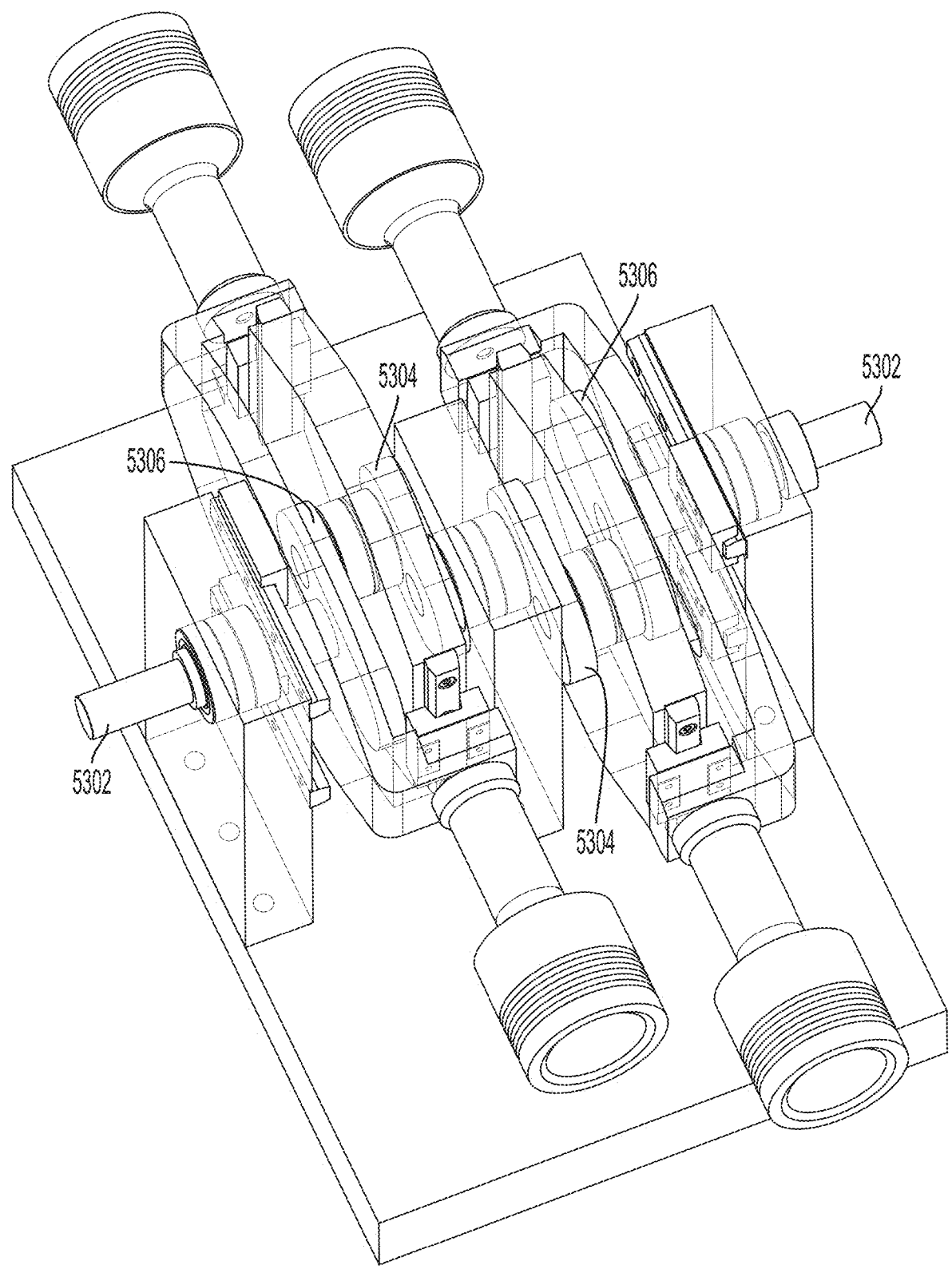
FIG. 29 is a perspective view of the example drive mechanism of FIG. 26 showing portions of the y-plate and x-plate assemblies as transparent.
Figure 30:
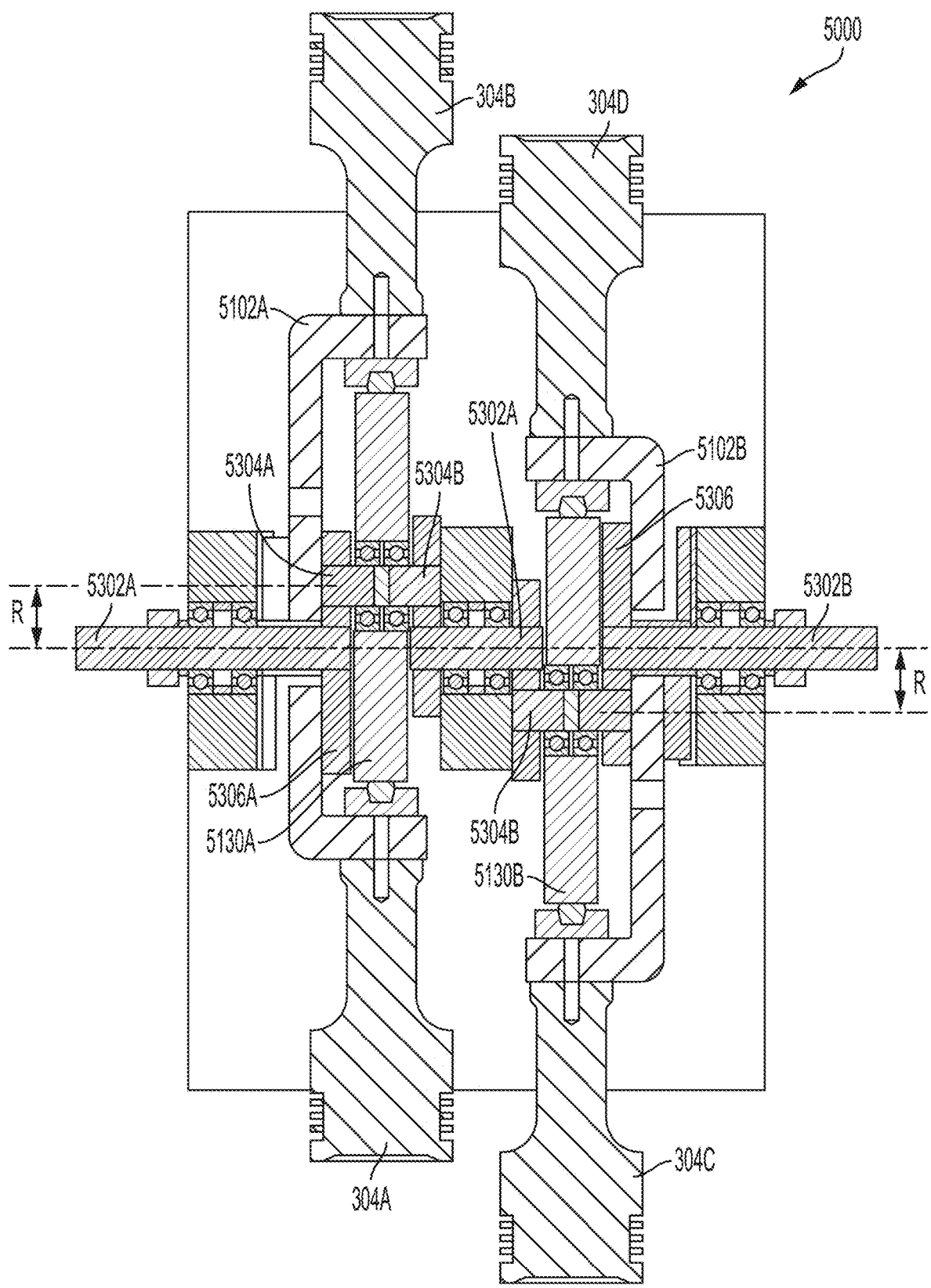
FIG. 30 is a cutaway top view of the example drive mechanism of FIG. 26.
Figure 31:
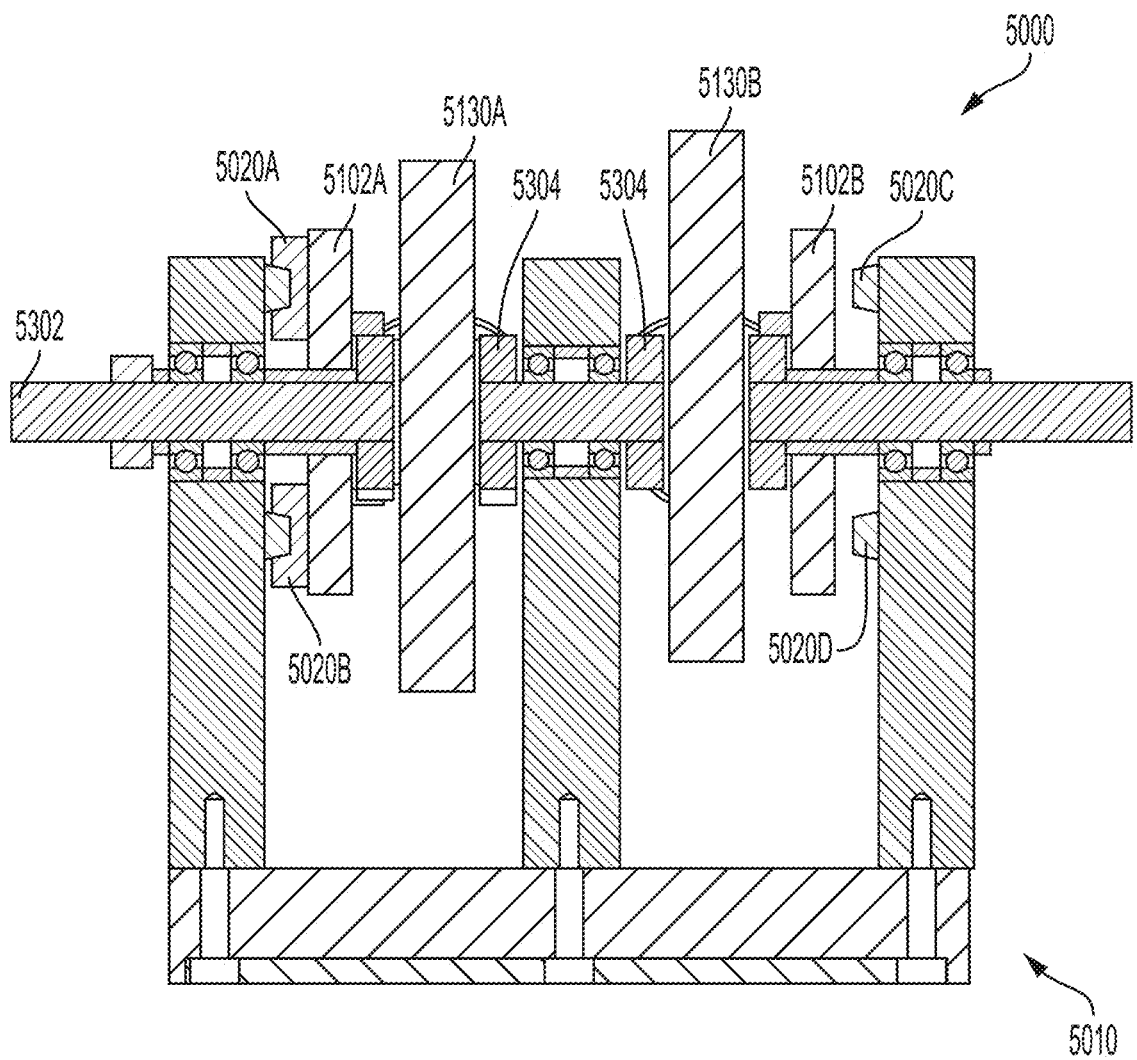
FIG. 31 is a cutaway side view of the example drive mechanism of FIG. 26.

In some embodiments, the drive mechanism can include a y-axis counterweight to counteract the effects of undesired vibrational forces in the drive mechanism. As depicted in FIGS. 22 and 23, the drive mechanism as described with respect to FIGS. 14-21 and elsewhere herein can further be configured to include slide weight 4015 (e.g., y-plate counterweight). Slide weight 4015 can be slidably attached to base 4010 such that it is permitted to move only up or down in one direction. In some embodiments, depending on the orientation of the drive mechanism, slide weight 4015 can be permitted to move in either the x-direction or the y-direction. As depicted in FIGS. 22 and 23, slide weight 4015 is configured to move only in the y-direction.

Slide weight 4015 can be drive by reciprocating motion of the y-plate assembly via a geared relationship with the y-plate assembly. In some embodiments, slide weight 4015 is driven by a rack and pinion system, as depicted in FIGS. 22 and 23. Two corresponding racks, 4402A and 4402B, can be disposed on slide weight 4015 and on y-plate assembly 4102, respectively. The racks interact through a connection facilitated by pinion gear 4404A. In some embodiments, racks 4402A and 4402B can be disposed on alternative components of drive mechanism 4000. Pinion gear 4404A can be disposed on a surface of the base of the drive assembly (e.g., 4010), of an appropriate size and shape to interact with the opposing racks on slide weight 4015 and y-plate assembly 4102. In some embodiments, including as depicted in FIG. 23, a corresponding rack and pinion system can be disposed on an opposite side of drive mechanism 4000, that rack and pinion system including racks 4402C and 4402D and pinion 4404B.

In some embodiments, the mass of slide weight 4015 is selected such the force exerted by slide weight 4015 on y-plate assembly 4012 (through, e.g., a rack and pinion gear system or another suitable gearing system to transfer force between the components) matches the magnitude of any undesired forces experienced or created by the y-plate assembly in the y-direction. In some embodiments, other weighted components can be disposed along other axes of the system for the purpose of counteracting undesired forces experienced or created along those other axes.

Although several of the key mechanical components of the power delivery device have been depicted above as gear types such as a ring gear or a pinion gear, other mechanical elements can be used in this invention. In some embodiments, gears can be replaced by combinations of interconnected components such as, crank arm links, rollers, crankshafts, shafts, linear bearings, bearings, etc. As depicted in FIGS. 26-35, the drive mechanisms of the current invention are capable of being coupled and driven without the use of any gearing.

Certain characteristics of the power delivery device provide for certain invariable constraints between the various components that permit great flexibility in the choice of component hardware. Those invariable constraints permit improvements over previously-available power delivery devices, including through better efficiency in the transfer of torque and the conversion of reciprocating motion into circular motion (and vice versa). Among the invariable constraints are: (i) the x-plate component being slidingly attached to and varied perpendicularly by the y-plate component, which provides a constant relationship between the center-points of those two components; (ii) the y-plate component being constrained to move only in the y-axis direction, which provides the x-y frame of reference; (iii) the x-plate component being constrained to a circular orbit about the output shaft axis at a constant torque arm distance of approximately one-half ($\frac{1}{2}$) the mechanism stroke, which provides a constant relationship between the center-point of the x-plate component and the output shaft axis. These invariable constraints enable great flexibility in the choice of component hardware, including, e.g., the direct coupling of components to one another, the elimination or reduction in the number or type of geared components that are used in the system, and/or the combination of one or more separate components into a single integral component.

FIGS. 24-31 show a power delivery device with two coupled identical tangent drive mechanisms driving four pistons, without the use of gearing. Power delivery device 5000 includes x-plate assembly 5130A slidingly attached to y-plate assembly 5102A in a perpendicular fashion via linear bearings, those components making up one of the two coupled tangent drive mechanisms, which drive two pistons 304A and 304B. Likewise, power delivery device 5000 includes x-plate assembly 5130B slidingly attached to y-plate assembly 5102B, those components making up one of the two coupled tangent drive mechanisms, which drive two pistons 304C and 304D. X-plate assemblies 5130A and 5130B are attached to y-plate assemblies 5102A and 5102B, respectively, by linear bearings 5133A, 5133B, 5133C, and 5133D, respectively, while y-plate assemblies 5102A and 5102B are attached to base 5010 via linear bearings 5020A, 5020B, 5020C, and 5020D, respectively, which constrain the motion of the y-plate assemblies to the y-axis, similar to the manner described herein with respect to FIGS. 14-23.

Linear bearings 5133A, B, C, D and 5020A, B, C, D are each typically composed of a rail part 5134 and a slide part 5135. In some embodiments, the rail part 5134 guides and/or supports the moving slide part 5135. Some linear bearings have slide part 5135 composed of lubricated ball type or roller type bearings which in turn make contact with the rail part 5134. Some types of linear bearings have a lubricated metal or plastic slide part 5135 which is guided and/or supported by rail part 5134.

In some embodiments, power delivery device 5000 can include only one tangent drive system. That is, the power delivery device can include, e.g., x-plate assembly 5130A and y-plate assembly 5102A (and associated components) without also including the components of the second tangent drive system, e.g., x-plate assembly 5130B and y-plate assembly 5102B. In some embodiments, power delivery device 5000 can include three or more tangent drive systems connected in series, each with corresponding interconnected x- and y-plate assemblies and driving pistons associated with each of the tangent drive systems. As described herein, references to features, characteristics, or the operation of various components of one of the tangent drive systems, e.g., x-plate assembly 5130A, should be understood to be applicable to and/or translate to the corresponding or similar component of another of the tangent drive systems, e.g., x-plate assembly 5130B. The center of x-plate assembly 5130A, as identified by the x-plate axis, is located at the center of the x-plate of that assembly. As described herein, in some embodiments, a ring gear can be disposed at the center of the x-plate, to engage with and drive the output shaft components of the systems. Here, the internal ring gear and its driving pinion gear are replaced with a linking assembly.

Figure 32A:
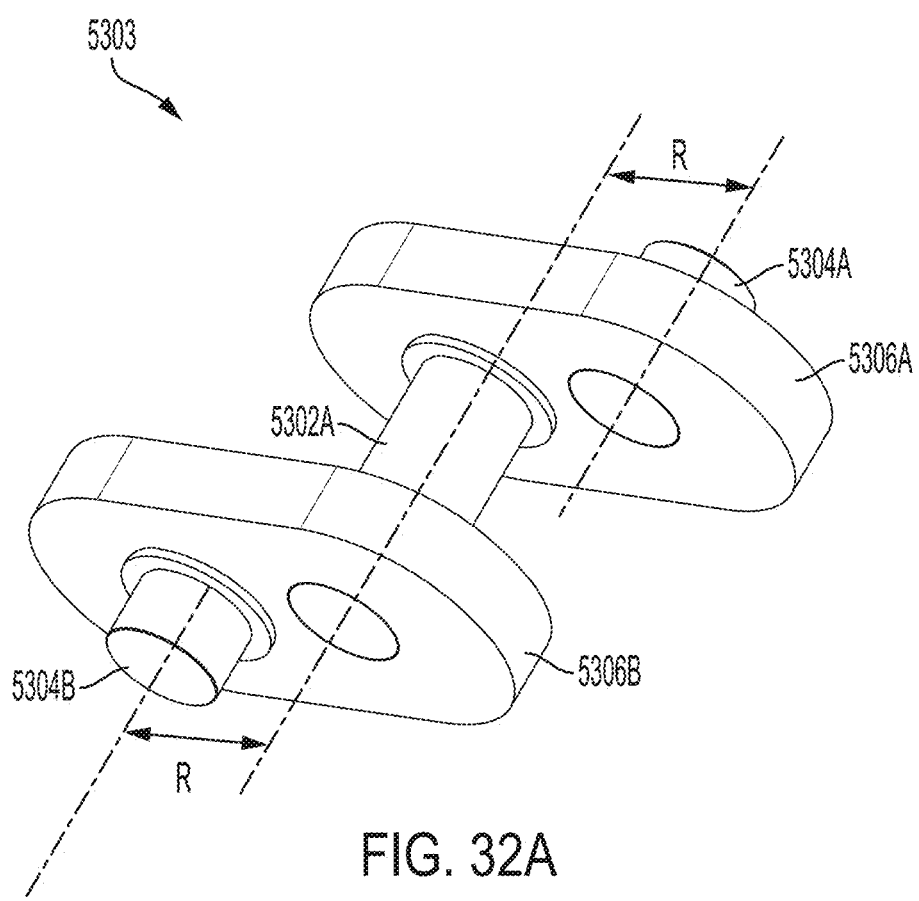
FIG. 32A is a perspective view of an example linking assembly according to an embodiment of the invention.
Figure 32B:
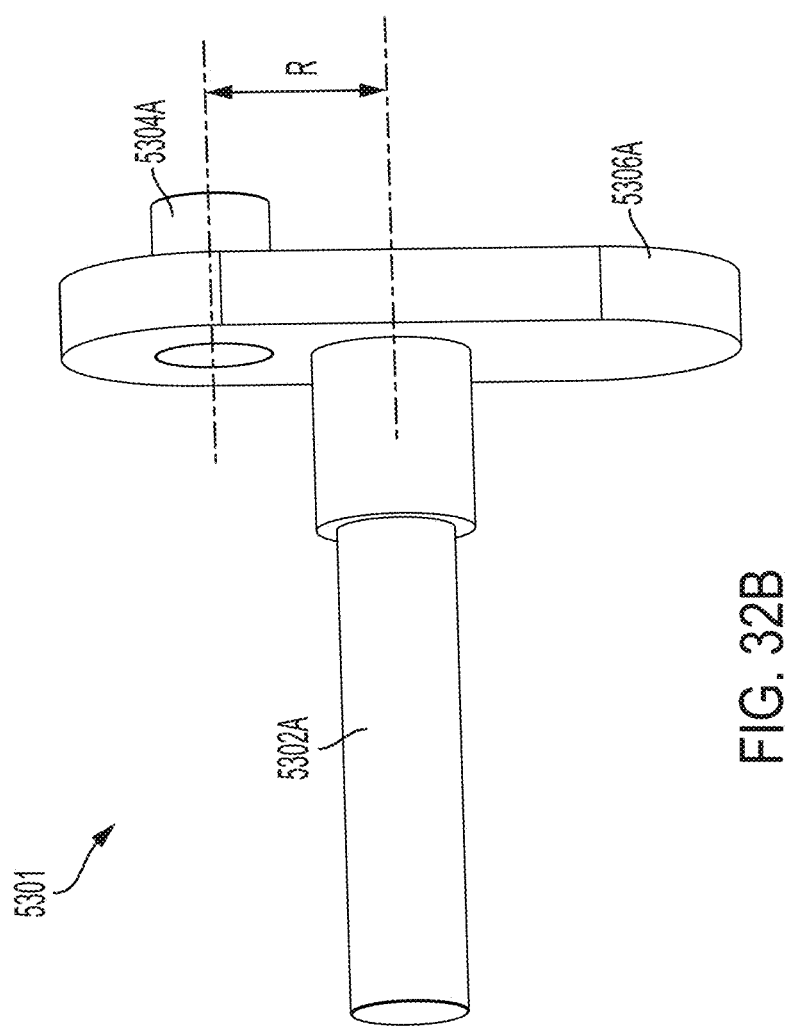
FIG. 32B is a perspective view of an example drive link assembly according to an embodiment of the invention.

FIGS. 32A, 32B, and 32C depict an example linking assembly, drive link assembly, and output link assembly, respectively, that can be used in a power delivery device and/or reciprocating mechanism. The linking assembly can include drive link assembly 5301 comprising parallel shafts, a circular output shaft 5302A, and a circular orbital output shaft 5304A and being separated a distance R by an integral link arm 5306A. Circular output shaft 5302A can be rotatably attached to base 5010 via bearings. In some embodiments, circular output shaft 5302A can be disposed at a distance R which is one-half the stroke length from the centerline of the circular orbital output shaft 5304A (which is coincident to the central axis of x-plate assembly 5130) by an integral linking crank arm 5306A. The crank arm is fixedly attached to the rotatable circular output shaft 5302A on one end and rotatably attached via an orbital output shaft 5304A and/or bearings on the other end to the central axis of the x-plate.

In some embodiments, the engagement pinion gear set for driving a power delivery device and/or reciprocating mechanism described herein can be replaced with linking assembly 5303 or output link assembly 5305. Linking assembly 5303 and output link assembly 5305 each include parallel shafts, a circular output shaft 5302B and a circular orbital linking shaft 5304B. The circular output shaft 5302B can be rotatably attached to the base 5010 via bearings. In some embodiments, the circular output shaft 5302B can be disposed at a distance R which is one-half the stroke length from the centerline of the circular orbital linking shaft 5304B (which is coincident to the central axis of x-plate assembly 5130 and concentric to the orbital output shaft 5304A) by integral linking crank arm 5306B. Crank arm 5306B is fixedly attached to rotatable circular output shaft 5302A on one end and rotatably attached via bearings on the other end to x-plate x-axis orbital linking shaft 5304B.

Figure 33:
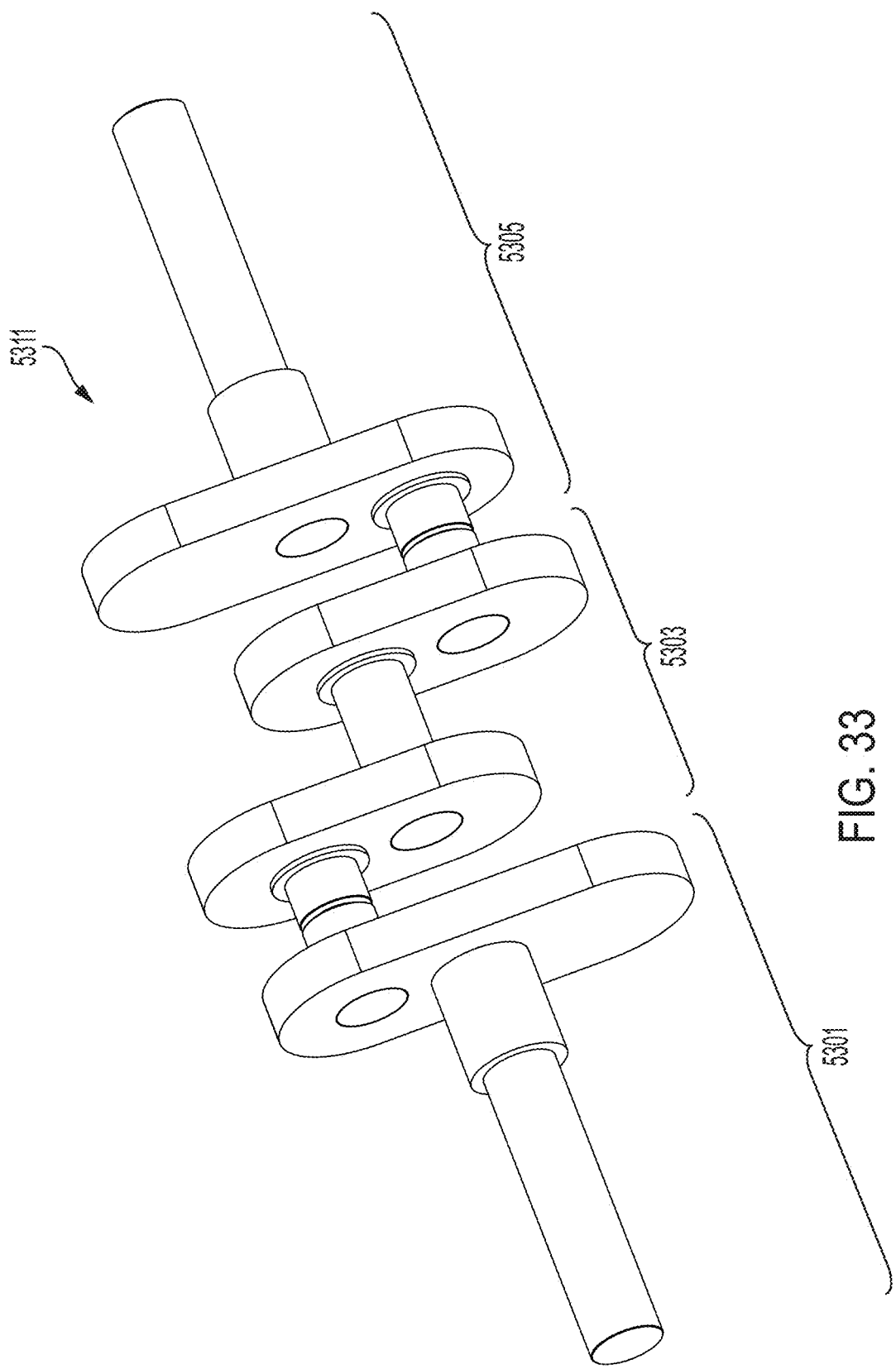
FIG. 33 is a perspective view of an example continuous crank shaft, which can, for example, be made up of various interconnecting links that are depicted in FIGS. 32A, 32B, and 32C, according to an embodiment of the invention.
Figure 34:
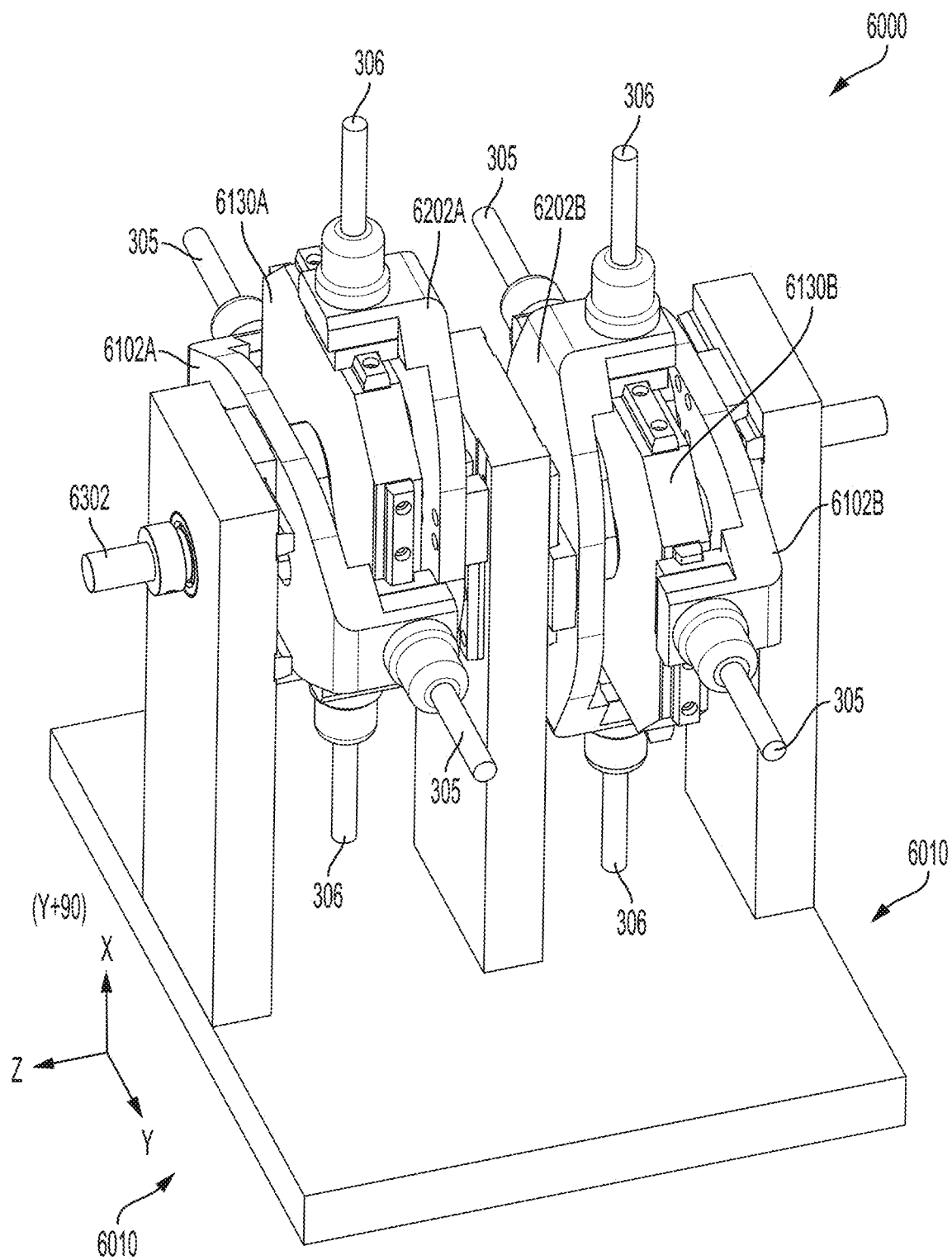
FIG. 34 is a perspective view of an example drive mechanism illustrating an embodiment with two interconnected sets of x-plate and y-plate assemblies, each assembly having two sets of two pistons.

In some embodiments the three linking assemblies 5301, 5303, and 5305 can be combined into an integral unit crankshaft 5311 as depicted in FIG. 33. By combining the linking assemblies into one continuous solid crankshaft manufacturing tolerances are reduced and a more precision assembly may be possible. In some embodiments, components of the device, including, e.g., the x-axis component or the base of the reciprocating mechanism or power delivery device can be manufactured in such a way, including by being formed as two pieces that are later combined into one, in order to permit for improved manufacturing of the reciprocating mechanism making use of an integral crankshaft. It should be understood that the precise geometry of any of the linking assemblies shown in FIGS. 32A, 32B, and 32C, or a variation serving the same functional purpose, can be used as an (or multiple) interconnecting link(s) between the various components of the one or more reciprocating mechanisms making up a power delivery device. One or more of the interconnecting links shown in FIGS. 32A, 32B, and 32C can be used to connect one (or more) reciprocating mechanisms to one (or more) other reciprocating mechanisms, as well, to combine to form a power delivery device with multiple linked reciprocating mechanisms as described herein. In this manner, it is possible to decrease the number of differently-geometried components in a reciprocating mechanism or system made up of multiple reciprocating mechanisms, which can advantageously reduce imbalance in the system and improve manufacturing tolerances and efficiency.

Linking assembly 5303 connects the reciprocating action of the first drive mechanism of power delivery device 5000 to the second drive mechanism of power delivery device 5000. In the same manner that orbital linking shaft 5304B connects to the center-point of x-plate assembly 5130A, orbital linking shaft 5304A connects to the center-point of x-plate assembly 5130B as interconnected along the same central rotating axis as (or by) circular shaft 5302A, linking together the two drive mechanisms and permitting the reciprocating action of either of the drive assemblies to drive the other assembly. The reciprocating action of the drive assemblies can be caused by work put into the system through either end of circular shaft 5302A. In some embodiments, circular shaft 5302A can be an interconnected series of shafts that operates in the same manner as if circular shaft 5302A was a contiguous, integral shaft. In some embodiments, work can be put into the system through the depicted pistons and can be extracted from the system through an input/output shaft (along the central axis of rotation of circular shaft 5302A), including as described herein.

The coupling-together of first drive mechanism and second drive mechanism can enable reductions in undesirable vibrational forces in the system. As described above, counterbalance components can be provided in the drive system that counteract vibrational forces generated by the reciprocating action of the components of the drive mechanism. However, the embodiment depicted in FIGS. 24-31 can obviate the need for those counterbalance components by counterbalancing the vibrational forces of one drive mechanism with the vibrational forces generated by the second drive mechanism. That is, as depicted in FIGS. 24-31, the first drive mechanism and second drive mechanism of power delivery device 5000 are disposed such that their reciprocating motion is driven in equal and opposite directions from one another, such that, e.g., where y-plate assembly 5102A reciprocates in a leftward direction, y-plate assembly 5102B reciprocates in a rightward direction. The motion of x-plate assemblies 5130A and 5130B similarly moves in opposite directions. In this manner, forces generated by first drive mechanism and second drive mechanism, other than the force driving an input/output shaft and the individual pistons, cancel each other out and vibrational and other undesirable forces occurring within the system can be reduced and/or eliminated.

First and second interconnecting links, 5306B and 5306A, respectively, of linking assembly 5303 can be disposed at an orientation 180 degrees from one another, e.g., extending along the same axis in opposite directions perpendicularly to drive shaft 5302A. Orientation of the first and second interconnecting links 180 angular degrees from one another helps to balance the system by ensuring that first and second drive mechanisms are reciprocating in opposite directions at all times that the system is in motion.

In some embodiments, more than two reciprocating mechanisms can be coupled together along a single drive shaft. Each reciprocating mechanism can be connected to the drive shaft by a corresponding interconnecting link attached to the x-plate assembly. The implementation of multiple reciprocating mechanisms can increase the force generated by the system. In some embodiments, the reciprocating mechanisms can be included, e.g., as part of a drive mechanism, in one or more of, or a combination of, i) an engine, ii) a pump, or iii) a compressor. In some embodiments, the interconnecting links can be disposed at an angle other than 180 degrees to one another, e.g., to balance the system for a given particular application or where there are more than two reciprocating mechanisms.

FIGS. 34-37 depict power delivery device 6000 that includes two tangent drive mechanisms with two corresponding sets of four pistons 305 and 306. In the embodiment depicted in FIGS. 34-37, the sets of pistons 305 and 306 in each tangent drive assembly are driven by the orbiting motion of x-plate assembly 6130A, the reciprocating y-plate assembly 6102A and the reciprocating (y+90)-plate assembly 6202A. The same is true for the second depicted tangent drive mechanism of power delivery device 6000, the components of which are referred to with corresponding reference numerals. Y-plate assembly 6102A and (y+90)-plate assembly 6202A are offset substantially 90 degrees from one another, such that x-plate assembly 6130A is slideably connected to y-plate assembly 6102A and (y+90)-plate assembly 6202A on four sides of x-plate assembly 6130A. All four pistons are substantially positioned in the same plane. In some embodiments, the two sets of pistons are positioned in the x-y plane. The drive mechanism depicted in FIG. 34-37 includes a set of two opposing y-pistons 305 that are attached directly to y-plate assembly 6102A of power delivery device 6000, in the same manner as discussed above with respect to FIGS. 24-31. The embodiment depicted in FIGS. 34-37 also includes second set of pistons 306 that are attached to (y+90)-plate assembly 6202A of power delivery device 6000, those components together (with y-plate assembly 6012A) and their associated components making up one drive mechanism of power delivery device 6000. The set of (y+90)-pistons 306 are preferably disposed at a 90 degree angle from the y-pistons 305 as depicted in FIGS. 34-37. FIGS. 34-37 depict pistons 305 attached to y-plate 6102A which is slidingly attached to base 6010 and is permitted to move only in the y-direction. FIGS. 34-37 depict pistons 306 attached to (y+90) plate 6202A which is slidingly attached to base 6010 and is permitted to move only in the x or (y+90) direction. Both y-pistons 305 are slidingly attached to x-plate assembly 6130A via (y+90)-plate 6202A, similarly both (y+90)-pistons 306 are slidingly attached to x-plate assembly 6130A via (y+90)-plate 6202A, such that motion of x-plate assembly 6130A will force y-pistons 305 to reciprocate relative to the base in the y-direction and force (x+90)-pistons 306 to reciprocate relative to the base in the x or (y+90)-direction. In some embodiments, there may be only one y-piston 305 and one (y+90)-piston 306. In some embodiments there can be two y-pistons 305 as shown and only one (y+90)-piston 306.

The number and configuration of pistons can be varied without departing from the spirit of the invention, including to meet the needs and/or requirements of a specific application, including, e.g., by using more or fewer pistons, rotating the axes upon which the pistons are permitted to reciprocate while maintaining the relationship between the pistons and the x-plate assembly 6130A and (y+90)-plate 6202a, for reasons including, e.g., modifying the amount of work in and/or out of the system, changing the location that work in and/or out of the system is transferred, or fitting the geometry of the power delivery device to a specific application, among various other similar modifications.

Each of the four pistons of the first tangent drive mechanism reciprocates through a complete cycle from top-dead-center to bottom-dead-center and repeats that cycle as driven by the drive gear of the drive mechanism. The second tangent drive mechanism of power delivery device 6000, which is made up of, e.g., x-plate assembly 6130B, y-plate assembly 6102B, and (y+90)-plate assembly 6202B, operates in the same manner as described herein with respect to the other tangent drive mechanism assembly. The two drive mechanisms are connected via a linking assembly similar to the one depicted in FIG. 32, where the first 5306B and second 5306A interconnecting link arms of the linking assembly 5303 can be disposed at an orientation 180 degrees from one another, e.g., extending along the same axis in opposite directions perpendicularly to the drive shaft 5302A. This arrangement leads to a natural balancing of the movement of the two tangent drive mechanisms as described elsewhere herein.

The addition of (y+90)-pistons 306 to a tangent drive mechanism permit improvements in increased torque generated by the drive mechanism. (Y+90)-pistons 306 are configured to capture torque generated by x-direction (or (y+90)-direction) movement of (y+90)-plate assembly 6202A. In some embodiments, the addition of the set of (y+90)-pistons 306 permit for an improvement of, e.g., up to and over 30% torque, e.g., about 30% torque. In some embodiments, the set of y-pistons and the set of (y+90)-pistons are driven by an input shaft connected to a pinion gear, e.g., in the same manner as pinion gear 3304 and as elsewhere described herein. Torque can be applied to the pinion gear and transmitted to the internal ring gear of the x-plate assembly to drive reciprocating motion of the (y+90)-plate assembly and the y-plate assembly. In some embodiments, the set of (y+90)-pistons and the set of y-pistons are driven by a motor.

As described herein with respect to FIGS. 24-33, the tangent drive mechanisms of power delivery device 6000 (or a single or three or more linked tangent drive systems making up the power delivery device) can operate through the use of a drive shaft 6302. The components, e.g., the x-plate and y-plate assemblies, can be linked through the use of orbital linking shafts and crank arms, a plurality of which can make up the drive shaft or which can all be formed as an integral shaft performing the same function, as escribed herein, including with respect to power delivery device 5000. The embodiment depicted in FIGS. 38 through 41 enables two of the eight pistons to force fluid through the system every 90 degrees of rotation of the drive arm.

It should be understood that the mass of an orbital linking shaft in any of the embodiments depicted herein can be selected in such a manner to further reduce undesirable vibrational forces in the power delivery device, including in the manner as described with respect to interconnecting link 3400 or interconnecting link 4400. In some embodiments, the components of power delivery devices 5000 or 6000 are spaced as close together as tolerances will permit, in order to further reduce undesirable vibrational forces in the system.

FIGS. 38 through 41 depict an alternative embodiment of the invention shown inside a compressor block 7000. It should be understood that any of the power delivery devices (e.g., 3000, 4000, 5000, or 6000) could be implemented for application inside a compressor block as depicted in FIGS. 38 through 41, and would operate in the same manner as described herein with respect to those embodiments. That is, the drive mechanism can make use of any one or more of the geared components, counterbalance components, or linking components described with respect to any of the embodiments of the invention described herein. As depicted, power delivery device inside compressor block 7000 includes x-plate assembly 7130 which is slideably attached to y-plate assembly 7102 by sliders 7133A and 7133B. The reciprocating motion of x-plate assembly 7130 and y-plate assembly 7102 drives the motion of piston 307, or vice-versa. The tangent drive mechanism depicted also includes interconnecting link 7400 configured to counteract undesirable vibrational forces in the system in the same manner as described herein with respect to interconnecting links 3400 and/or 4400.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A reciprocating engine comprising:
a first reciprocating mechanism comprising:
an axially translating y-axis component configured to reciprocate substantially along a y-axis with a reciprocating motion of a piston assembly relative to a base to which the y-axis component is slidingly attached;
an x-axis component slidingly coupled to and translating with the y-axis component along the y-axis, the x-axis component being: i) configured to reciprocate substantially perpendicularly to the y-axis relative to the y-axis component, ii) comprising an orbital output component, and iii) comprising an orbital linking component disposed substantially concentric with the orbital output component;
a stationary output component rotatably attached to the base in a direction that is substantially perpendicular to both the x-axis and the y-axis, the stationary output component engaging with the orbital output component via a first integral interconnecting output link; and
a stationary linking component rotatably attached to the base in a direction that is substantially concentric with the stationary output component, the stationary linking component engaging with the orbital linking component of the x-axis component via a first integral interconnecting link.

2. The reciprocating engine of claim 1 wherein the stationary linking component includes a second integral interconnecting link configured to engage with a second orbital output component of a second x-axis component of a second reciprocating mechanism.

3. The reciprocating engine of claim 2 wherein the second integral interconnecting link is disposed at an orientation 180 degrees from the first integral interconnecting link.

4. The reciprocating engine of claim 1 wherein the first integral interconnecting output link is an output pinion gear and an internal ring gear gearset, the stationary output component is a rotatable output pinion gear and shaft set and the orbital output component is an internal ring gear.

5. The reciprocating engine of claim 1 wherein the first integral interconnecting output link is an integral crank arm, the stationary output component is a first output shaft and the orbital output component is a second output shaft.

6. The reciprocating engine of claim 1 wherein the first integral interconnecting output link is a crank arm, the stationary output component is a first output shaft and the orbital output component is a second output shaft.

7. The reciprocating engine of claim 1 wherein the first integral interconnecting link is a set of engaged pinion gears, the stationary linking component is a first pinion gear and the orbital linking component is a second pinion gear.

8. The reciprocating engine of claim 1 wherein the first integral interconnecting link includes a weight configured to counterbalance rotational forces of the link and movement of the x-axis component.

9. The reciprocating engine of claim 4 wherein a pitch diameter of the output pinion gear is substantially equal to a stroke length of the reciprocating engine and a pitch diameter of the internal ring gear is substantially equal to two times the stroke length of the reciprocating engine and a distance between centerlines of the orbital linking component and the stationary linking component is substantially equal to one-half a stroke length of the reciprocating engine.

10. The reciprocating engine of claim 1 wherein the distance between centerlines of the orbital output component and the stationary output component is substantially equal to one-half a stroke length of the reciprocating engine.

11. The reciprocating engine of claim 1 wherein the distance between centerlines of the orbital linking component and the stationary linking component is substantially equal to one-half a stroke length of the reciprocating engine.

12. The reciprocating engine of claim 4 wherein the sum of the pinion gear radii is substantially equal to one-half a stroke length of the reciprocating engine.

13. The reciprocating engine of claim 7 wherein the set of engaged pinion gears is a set of rollers.

14. The reciprocating engine of claim 2 wherein the first reciprocating mechanism and the second reciprocating mechanisms are included in one or more of, or a combination of, i) an engine, ii) a pump, or iii) a compressor.

15. The reciprocating engine of claim 1 wherein the x-axis component drives a (y+90)-axis component disposed 90 degrees from the y-axis component.

16. A drive mechanism for generating a rotational motion output from a reciprocating motion input of an assembly of a reciprocating device and/or for generating reciprocating motion output from a rotational motion input, the drive mechanism comprising:
an axially translating y-axis component configured to reciprocate substantially along a y-axis with the reciprocating motion of the assembly of the reciprocating device relative to a base to which the y-axis component is attached;
an x-axis component slidingly coupled to and translating with the y-axis component substantially along the y-axis, the x-axis component being: i) configured to reciprocate substantially perpendicularly to the y-axis relative to the y-axis component, ii) comprising an orbital output component, and iii) comprising an orbital linking component disposed substantially concentric with the orbital output component; and
a stationary output component rotatably attached to the base in a direction that is substantially perpendicular to both the x-axis and the y-axis, the stationary output engaging with the orbital output component of the x-axis component via a first integral interconnecting link, and
a stationary linking component rotatably attached to the base in a direction that is substantially concentric with the stationary output component, the stationary linking component interfacing and rotatably engaging with the orbital linking component of the x-axis component via a second integral interconnecting link.

17. The drive mechanism of claim 16 wherein the stationary linking component includes a second integral interconnecting link configured to engage with a second orbital output component of a second x-axis component of a second reciprocating mechanism.

18. The drive mechanism of claim 17 wherein the second integral interconnecting link is disposed at an orientation 180 degrees from the first integral interconnecting link.

19. The drive mechanism of claim 17 wherein the drive mechanism is included in one or more of, or a combination of, i) an engine, ii) a pump, or iii) a compressor.

20. The drive mechanism of claim 16 wherein the x-axis component drives a (y+90)-axis component disposed 90 degrees from the y-axis component.

21. A method of converting an axial force from a reciprocating motion input of a reciprocating element to a torque applied to an output shaft assembly and/or converting a torque applied from the output shaft assembly to an axial force to the reciprocating motion of the reciprocating element, the method comprising:
- applying an axial force to move an axially translating y-axis component configured to reciprocate along a y-axis with the reciprocating motion input of a piston assembly relative to a base to which the y-axis component is slidingly attached;
- transmitting the axial force through an x-axis component which is slidingly coupled to and translating with the y-axis component substantially along the y-axis, the x-axis component being: i) configured to reciprocate substantially perpendicularly to the y-axis relative to the y-axis component, ii) comprising an orbital output component;
- transmitting the axial force from the x-axis component to the output shaft assembly via a first interconnecting link integral to the output shaft and rotatably connected to the orbital output component of the x-axis component, transmitting consistently applied torque and vice versa.

22. The method of claim 21 further comprising:
transmitting the axial force from the x-axis component to a second x-axis component which is slidingly coupled to and translating with a second y-axis component.

23. The method of claim 21 further comprising:
driving the motion of a (y+90) axis component with the motion of the x-axis component, the (y+90) axis component disposed 90 degrees from the x-axis component.

\* \* \* \* \*